(12) United States Patent
Srinivasan et al.

(10) Patent No.: US 9,417,759 B1
(45) Date of Patent: Aug. 16, 2016

(54) SYNCHRONIZING DATA ACROSS MULTIPLE BROWSER TABS OR WINDOWS

(75) Inventors: Balaji Srinivasan, Fremont, CA (US);
Sandeep Kumar Reddy Mopuru, Sunnyvale, CA (US); Ivan Shing Yau Lee, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 164 days.

(21) Appl. No.: 13/527,308

(22) Filed: Jun. 19, 2012

Related U.S. Application Data

(60) Provisional application No. 61/501,587, filed on Jun. 27, 2011.

(51) Int. Cl.
*G06F 3/0481* (2013.01)
*G06F 3/048* (2013.01)
*G06F 3/0482* (2013.01)
(Continued)

(52) U.S. Cl.
CPC .............. *G06F 3/0481* (2013.01); *G06F 3/048* (2013.01); *G06F 3/0482* (2013.01); *G06F 9/4443* (2013.01); *G06F 17/3089* (2013.01);
(Continued)

(58) Field of Classification Search
CPC .......... G06F 17/30873; G06F 17/3089; G06F 17/30899; G06F 17/30905; G06F 9/4443
USPC ......... 715/203, 705, 736, 738, 753, 758, 760, 715/764, 777, 792, 793, 805, 806, 859
See application file for complete search history.

(56) References Cited

U.S. PATENT DOCUMENTS 5,579,472 A * 11/1996 Keyworth, II ......... G06F 3/0481
340/7.29
5,852,717 A * 12/1998 Bhide et al. .................... 709/203
(Continued)

FOREIGN PATENT DOCUMENTS

WO    WO02079984    10/2002

OTHER PUBLICATIONS eBook: Pro HTML5 Programming, Lubbers et. al. Copyright 2010, ISBN: 978-1-4302-2791-5, Chapter 9, retrieved from http://link.springer.com/chapter/10.1007/978-1-4302-2791-5_9#.*

(Continued)

*Primary Examiner* — Tadeese Hailu
*Assistant Examiner* — Shangao Zhang
(74) *Attorney, Agent, or Firm* — Patent Law Works LLP

(57) ABSTRACT

A system for synchronizing data across multiple browser tabs or windows includes a synchronization module and shared synchronization storage. The shared synchronization storage is local storage of the browser and is utilized by a plurality of browser windows, a plurality of tabs or a browser window and tab. The shared synchronization storage is used to store information about notifications and a timestamp as to when that information was retrieved from the notification server. The synchronization module is responsive to requests for updates from the notification client module. The synchronization module accesses the shared synchronization storage to determine whether notification information stored there is current and if so provides that notification information from the shared synchronization storage to the notification client module. If notification information stored locally is not current, the synchronization module cooperates with the notification server to retrieve current notification information.

24 Claims, 42 Drawing Sheets

(51) Int. Cl.
    *G06F 17/30* (2006.01)
    *G06F 9/44* (2006.01)
(52) U.S. Cl.
    CPC ..... *G06F17/30876* (2013.01); *G06F 17/30899* (2013.01); *G06F 17/30905* (2013.01)

(56) References Cited

U.S. PATENT DOCUMENTS

| | | | |
|---|---|---|---|
| 6,130,938 | A | 10/2000 | Erb |
| 6,192,119 | B1 | 2/2001 | Wilson |
| 6,697,478 | B1 | 2/2004 | Meldrum et al. |
| 6,754,322 | B1 | 6/2004 | Bushnell |
| 7,106,848 | B1 | 9/2006 | Barlow et al. |
| 7,366,990 | B2 | 4/2008 | Pitroda |
| 7,555,110 | B2 | 6/2009 | Dolan et al. |
| 7,610,287 | B1 | 10/2009 | Dean et al. |
| 7,742,468 | B2 | 6/2010 | Vagelos |
| 8,117,171 | B2* | 2/2012 | Hackworth ........... 707/689 |
| 2002/0137490 | A1 | 9/2002 | Gallant |
| 2002/0143874 | A1 | 10/2002 | Marquette et al. |
| 2004/0258220 | A1 | 12/2004 | Levine et al. |
| 2005/0152521 | A1 | 7/2005 | Liljestrand |
| 2005/0229188 | A1* | 10/2005 | Schneider ........... 719/328 |
| 2006/0026288 | A1 | 2/2006 | Acharya et al. |
| 2006/0077957 | A1 | 4/2006 | Reddy et al. |
| 2006/0206604 | A1 | 9/2006 | O'Neil et al. |
| 2007/0127631 | A1 | 6/2007 | Difiglia |
| 2007/0171898 | A1 | 7/2007 | Salva |
| 2007/0173236 | A1 | 7/2007 | Vishwanathan et al. |
| 2007/0248077 | A1 | 10/2007 | Mahle, Jr. et al. |
| 2007/0288591 | A1* | 12/2007 | Wong et al. ........... 709/217 |
| 2008/0056475 | A1 | 3/2008 | Brannick et al. |
| 2008/0192656 | A1 | 8/2008 | Vagelos |
| 2010/0235321 | A1* | 9/2010 | Shukla et al. ........... 707/610 |
| 2010/0268584 | A1* | 10/2010 | Pullur et al. ........... 705/14.16 |
| 2011/0054776 | A1* | 3/2011 | Petrov et al. ........... 701/201 |
| 2011/0098156 | A1 | 4/2011 | Ng et al. |
| 2011/0289191 | A1* | 11/2011 | Gordon et al. ........... 709/219 |
| 2012/0102433 | A1* | 4/2012 | Falkenburg ........... 715/835 |
| 2012/0150796 | A1* | 6/2012 | Martick ........... 707/610 |

OTHER PUBLICATIONS

Adamic et al., "A Social Network Caught in the Web," Internet Journal, First Monday, Jun. 2, 2003, vol. 8, No. 6, pp. 1-22.
Agarwal et al., "Enabling Real-Time User Interests for Next Generation Activity-Oriented Social Networks," Thesis submitted to the Indian Institute of Technology Delhi, Department of Computer Science & Engineering, 2005, 70 pgs.
Anwar et al., "Leveraging 'Social-Network' Infrastructure to Improve Peer-to Peer Overlay Performance: Results from Orkut," University of Illinois at Urbana-Champaign USA, 2005, 9 pgs.
AT&T Personal Reach Service: Benefits and Features, Mar. 29, 2010, 7 pgs.
AT&T Personal Reach Service: Personal Reach Service, Mar. 29, 2010, 2 pgs.
Baird et al., "Neomillennial User Experience Design Strategies: Utilizing Social Networking Media to Support "Always On" Learning Styles," J. Educational Technology Systems, vol. 34(1), 2005-2006, Baywood Publishing Co., Inc., pp. 5-32.
Boyd, et al., "Social Network Sites: Definition, History, and Scholarship," Journal of Computer-Mediated Communication, International Communication Association, 2008, pp. 210-230.
Churchill et al., "Social Networks and Social Networking," IEEE Computer Society, Sep.-Oct. 2005, pp. 14-19.

Cohen et al., "Social Networks for Creative Collaboration," C&C '05, Apr. 12-15, 2005, London, United Kingdom, pp. 252-255.
Decker et al., "The Social Semantic Desktop," Digital Enterprise Research Institute, DERI Galway, Ireland, DERI Innsbruck, Austria, DERI Technical Report, May 2, 2004, 7 pgs.
Dukes-Schlossberg et al., "Battlefield Awareness and Data Dissemination Intelligent Information Dissemination Server," Air Force Research Laboratory, Rome Research Site, Rome, NY, Nov. 1, 1999, 31 pgs.
Eagle et al., "Social Serendipity: Proximity Sensing and Cueing," MIT Media Laboratory Technical Note 580, May 2004, 18 pgs.
Erickson et al., "Social Translucence: Using Minimalist Visualizations of Social Activity to Support Collective Interaction," Designing Information Spaces: The Social Navigation Approach, Springer-verlag: London, 2003, pp. 1-19.
Gross et al., "Information Revelation and Privacy in Online Social Networks," WPES '05, Alexandria, Virginia, Nov. 7, 2005, pp. 71-80.
Hammond et al., "Social Bookmarking Tools (I)," D-Lib Magazine, Apr. 2005, vol. II, No. 4, ISSN 1082-9873, 23 pgs.
Heer et al., "Vizster: Visualizing Online Social Networks," University of California, Berkeley, Oct. 23, 2005, 8 pgs.
International Search Report, International Application No. PCT/US2008/005118, Sep. 30, 2008, 2 pgs.
Leonard, "You Are Who You Know," Internet, retrieved at http://www.salon.com, Jun. 15, 2004, 15 pgs.
LiveJournal, "FAQ #163: How Do I Find a Syndicated Account?" Last Updated: thebubba, Jan. 6, 2004, 2 pgs.
Marwick, "Selling Your Self: Online Identity in the Age of a Commodified Internet," University of Washington, 2005, 192 pgs.
MediaSift Ltd., DataSift: Realtime Social Data Mining Platform, Curate and Data Mine the Real Time Web with DataSift, Dedipower, Managed Hosting, [Retrieved on May 13, 2011], 1 pg.
Metcalf et al., "Spatial Dynamics of Social Network Evolution," 23rd International Conference of the System Dynamics Society, Jul. 19, 2005, pp. 1-13.
Mori et al., "Real-world Oriented Information Sharing Using Social Networks," Group '05, Sanibel Island, Florida, USA, Nov. 6-9, 2005, pp. 81-84.
Nardi et al., "Blogging as Social Activity, or, Would You Let 900 Million People Read Your Diary?" CSCW'04, Nov. 6-10, 2004, vol. 6, Issue 3, Chicago, Illinois, pp. 222-231.
Neumann et al., "Semantic social network portal for collaborative online communities," Journal of European Industrial Training, 2005, Emerald Group Publishing, Limited, vol. 29, No. 6, pp. 472-487.
O'Murchu et al., "Online Social and Business Networking Communities," Digital Enterprise Research Institute DERI Technical Report, National University of Ireland, Aug. 11, 2004, 22 pgs.
Ring Central, Inc., Internet, retrieved at http://www.ringcentral.com, Apr. 19, 2007, 1 pg.
Singh et al., "CINEMA: Columbia InterNet Extensible Multimedia Architecture," Department of Computer Science, Columbia University, May 2002, pp. 1-83.
Steen et al., "Development of we-centric, context-aware, adaptive mobile services requires empathy and dialogue," Freeband FRUX, Oct. 17, 2005, Internet Journal, Netherlands, pp. 1-4.
Superfeedr Track, Internet, retrieved at http://blog.superfeedr.com/track/filter/xmpp/pubsubhubbub/track, May 13, 2011, 8 pgs.
Twitter Blog: Tracking Twitter, Internet, retrieved at http://blog.twitter.com/2007/09/tracking-twitter.html, May 13, 2011, 2 pgs.
Twitter Announces Fire Hose Marketplace: Up to 10K Keyword Filters for 30 Cents, Internet, retrieved at http://www.readywriteweb.com/archives/twitter_announces_fire_hose_marketplace_up_to_10k.php, May 13, 2011, 7 pgs.
Van Eijk et al., "We-centric, context-aware, adaptive mobile service bundles," Freeband, Telematica Instituut, TNO telecom, Nov. 30, 2004, 48 pgs.
Wenger et al., "Technology for Communities," CEFRIO Book Chapter v 5.2, Jan. 18, 2005, pp. 1-15.

* cited by examiner

756

| 0 |

< Back                                                                        <Prev | Next>

User 2 commented on a post that you also commented on    11 minutes ago

User 7
2 hours ago | From Chat to 🌐 Public

I love tacos!

+1   User 3 and 22 others +1'd this post

User 4 – I agree tacos are good   +1

User 5 – I beg to differ   +1

Add a comment…

View all activity on my posts        Hide this notification

*Possible errors in the current detail view*

766

*Possible errors in the current detail view, content is visible*

SYNCHRONIZING DATA ACROSS MULTIPLE BROWSER TABS OR WINDOWS

CROSS REFERENCE TO RELATED APPLICATIONS

This application claims the benefit under 35 U.S.C. §119 (e) of U.S. Provisional Application No. 61/501,587, entitled "SYNCHRONIZING DATA ACROSS MULTIPLE BROWSER TABS OR WINDOWS" filed on Jun. 27, 2011, the entire contents of which are incorporated herein by reference.

BACKGROUND

The present disclosure relates to electronic messaging and user interfaces. In particular, the present disclosure relates to synchronizing data across multiple browser tabs or windows.

While users once operated their computing devices with a single browser showing a single webpage, the use of web browsers, the Internet and other types of electronic messaging has changed dramatically. For example, many ordinary users often have several different tabs showing web pages open at a given time. For power users, the number of tabs open at a given time can be greater than 20. Furthermore, no longer is the web browser solely used for retrieving information from the Internet and displaying static web pages. Now the web browser is used as an interface to manage e-mail, social networking, blogging, posting photos, watching videos, editing documents, and any number of additional activities. Therefore, it is important for users to be able to manage these different types of messaging and switch between them.

With the browser being used for so many different activities, the speed at which the browser can retrieve and present information from a server is impaired. Additionally, many users have installed extensions or plug-ins to their web browser and this also impacts how quickly the browser can retrieve and display information. When information is not shown and displayed quickly enough this degrades the user experience and in the more problematic cases causes users to reload or re-fetch information. This causes unnecessary network traffic and additional load on web servers.

As noted above, users no longer have only a single browser tab or window with only one page being viewed at a time. In some cases, the information being delivered to multiple different tabs or windows is the same. For companies that deliver significant amounts of web content, the more requests that are sent to the servers, the more response bandwidth and processing power are required to service these requests. In some cases, this means that they have installed additional web servers to provide adequate bandwidth and processing power to respond to the requests for information.

SUMMARY

According to one innovative aspect of the subject matter described in this disclosure, a system for synchronizing data across multiple browser tabs or windows includes a notification server, a notification client module, a synchronization module and shared synchronization storage. The shared synchronization storage is local storage of the browser and is utilized by a plurality of browser windows, a plurality of tabs or a browser window and tab. The shared synchronization storage is used to store information about notifications and a timestamp as to when that information was retrieved from the notification server. The synchronization module accesses the shared synchronization storage to determine whether notification information stored there is current and if so provides that notification information from the shared synchronization storage to the notification client module. If notification information stored locally is not current, the synchronization module cooperates with the notification server to retrieve current notification information.

In general, another innovative aspect of the subject matter described in this disclosure may be embodied in methods that include retrieving information and a timestamp from a local storage; determining whether the timestamp is recently updated; updating a browser tab with the retrieved information if the timestamp was recently updated; and if the timestamp was not recently updated: requesting new information from a server; storing the new information and a second timestamp in the local storage; and updating the browser tab with the new information.

Other implementations of one or more of these aspects include corresponding systems, apparatus, and computer programs, configured to perform the actions of the methods, encoded on computer storage devices.

These and other implementations may each optionally include one or more of the following features. For instance, the features include: the information is a number of unread notifications for a user; the timestamp was recently updated if less than 30 seconds have elapsed since the timestamp; the local storage is shared and synchronized storage; initializing the local storage; a shared storage for storing information and timestamps; a first synchronization module for retrieving information from a server, retrieving information from the shared storage, and storing information to the shared storage, the first synchronization module coupled for communication with the shared storage; a second synchronization module for retrieving information from the server, retrieving information from the shared storage, and storing information to the shared storage, the second synchronization module coupled for communication with the shared storage; the first synchronization module is operable in a first browser window and the second synchronization module is operable in a second browser window; the first synchronization module is operable in a first tab of a web browser, and the second synchronization module is operable in a second tab of the web browser; a notification client module coupled for receiving notifications from the server, the notification client module providing the notifications to the first synchronization module; the first synchronization module stores the information in the shared storage with a timestamp; and the first synchronization module retrieves information and a time stamp from the shared storage and determines if the timestamp is recently updated. For instance, the operations further include: requesting the information from a server; storing the information in the local storage; assigning the information the timestamp; storing the time stamp in the local storage; and providing an updated user interface showing the information from the server.

The present disclosure is particularly advantageous because the number of requests to the notification server is minimized because notification information is stored locally in the shared synchronization storage. If the information in the shared synchronization storage is not current, the synchronization module requests the information from the notification server. Thus, the present disclosure reduces the number of requests to the notification server. The present disclosure also includes a number of novel methods including initializing the shared synchronization storage and processing requests for notification information.

BRIEF DESCRIPTION OF THE DRAWINGS

The disclosure is illustrated by way of example, and not by way of limitation in the figures of the accompanying drawings in which like reference numerals are used to refer to similar elements.

FIGS. 7A-7I are graphic representations of example user interfaces for presenting a detailed notification.

DETAILED DESCRIPTION

Figure 1A:
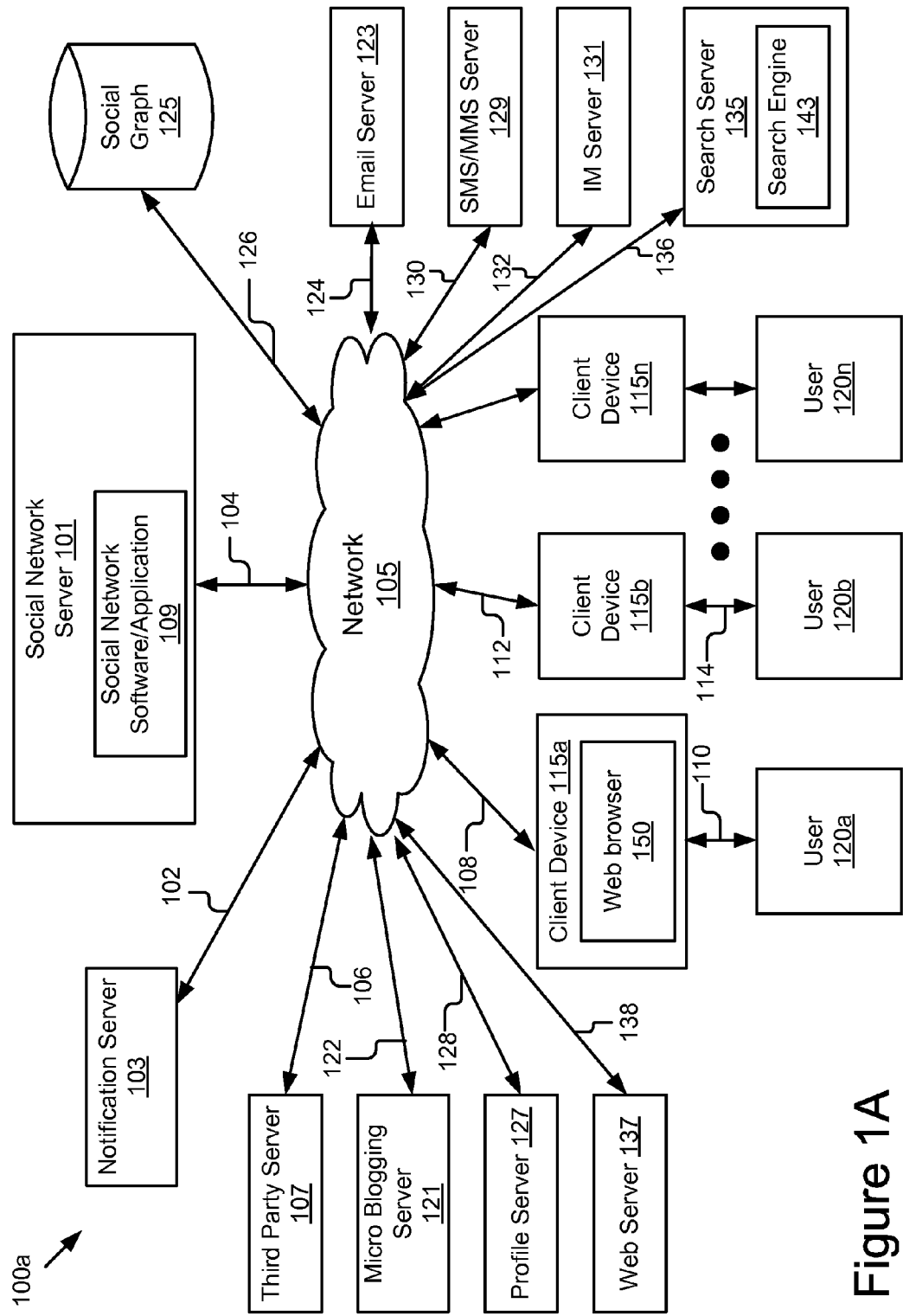
FIGS. 1A and 1B are high-level block diagrams illustrating an example system for generating notifications.

FIG. 1A illustrates a block diagram of a system 100a (also referred to herein individually and collectively as 100) for generating and presenting notifications, processing cursor movements for predictive fetching, and synchronizing data across multiple browser tabs or windows according to some implementations of the present disclosure. The illustrated system 100a for generating and presenting notifications includes client devices 115a, 115b, 115n (also referred to herein individually and collectively as 115) that are accessed by users 120a, 120b, 120n (also referred to herein individually and collectively as 120), a social network server 101 and a notification server 103. In the illustrated implementation, these entities are communicatively coupled via a network 105. Although only three client devices 115 are illustrated, it should be recognized that any number of client devices 115n are available to any number of users 120n. Moreover, it should be understood that while the present disclosure is described below primarily in the context of notifications, the present disclosure is applicable to any type of online messaging.

The client devices 115a, 115b, 115n in FIG. 1A are used by way of example. While FIG. 1A illustrates three devices, the present disclosure applies to any system architecture having one or more client devices 115. Furthermore, while only one network 105 is coupled to the client devices, 115a, 115b, 115n, the social network server 101, the notification server 103 and a third party server 107, in practice any number of networks 105 can be connected to the entities. Furthermore, while only one third party server 107 is shown, the system 100a could include one or more third party servers 107.

In some implementations, the social network server 101 is coupled to the network 105 via signal line 104. The social network server 101 also includes a social network software/application 109. Although only one social network server 101 is shown, multiple servers may be present. A social network is any type of social structure where the users are connected by a common feature. The common feature includes relationships/connections, e.g., friendship, family, work, an interest, etc. The common features are provided by one or more social networking systems, for example, those included in the system 100, including explicitly-defined relationships and relationships implied by social connections with other online users, where the relationships form a social graph 125. In some examples, the social graph 125 can reflect a mapping of these users and how they are related. Furthermore, it should be understood that social network server 101 and social network software/application 109 are representative of one social network and that there may be are multiple social networks coupled to the network 105, each having its own server, application and social graph. For example, a first social network is more directed to business networking, a second is more directed to or centered on academics, a third is more directed to local business, a fourth is directed to dating and others of general interest or a specific focus.

While shown as stand-alone server in FIG. 1A, in some implementations all or part of the notification server 103 could be part of the third party server 107 that is connected to the network 105 via signal line 106. The notification server 103 interacts with the other servers, 101, 107, 121, 123, 127, 129, 131, 135, 137 via the network 105. The notification server 103 is also coupled for communication with the client device 115a, which is connected to the network 105 via signal line 108. The user 120a interacts with the client device 115a via signal line 110. Similarly, the client device 115b is coupled to the network 105 via signal line 112 and the user 120b interacts with the client device 115b via signal line 114. The notification server 103 can be stored in any combination of the devices and servers, or in only one of the devices or servers.

The network 105 is a conventional type, wired or wireless, and may have any number of configurations, for example, a star configuration, token ring configuration or other configurations. Furthermore, the network 105 may include a local area network (LAN), a wide area network (WAN) (e.g., the Internet), and/or any other interconnected data path across which multiple devices may communicate. In some implementations, the network 105 may be a peer-to-peer network. The network 105 may also be coupled to or includes portions of a telecommunications network for sending data in a variety of different communication protocols. In some implementations, the network 105 includes Bluetooth communication networks or a cellular communications network for sending and receiving data, for example, via short messaging service (SMS), multimedia messaging service (MMS), hypertext transfer protocol (HTTP), direct data connection, WAP, email, etc.

The notification server 103 interacts with other systems 107, 115a-n, 121, 123, 125, 127, 129, 131, and 135 to retrieve/receive activity information or an activity stream and generate notifications. The notification server 103 cooperates with the client devices 115 to generate and present user interfaces that allow the user to view the number of notifications, list of notifications, detail about notifications and take action on notifications. In some implementations, the notification server 103 receives activity information from the other systems 107, 121, 123, 125, 127, 129, 131 and 135. The notification server 103 processes this information to generate a number of notifications, a list of notifications, and detail about notifications. The notification server 103 interacts with the user 120 via client devices 115 to present the notification information. In particular, the notification server 103 interacts with the web browser 150 of the client devices 115 to receive inputs and generate user interfaces as will be described in more detail below. In some implementations, the notification server 103 also cooperates with the email server 123 to generate notifications and respond to e-mail messages. In some implementations, the notification server 103 also generates notifications and sends replies or commands to the related electronic messages from a Short Message Service (SMS)/Multimedia Messaging Service (MMS) server 129, an instant messaging (IM) server 131, a web server 137, and/or the third party server 107. In some implementations, the notification server 103 also receives data related to electronic messaging from a search server 135 that includes a search engine 143 and is coupled to the network 105 via signal line 136. In some implementations, the search server 135 includes the search engine 143 for retrieving results that match search terms from the Internet. The web browser 150 and the notification server 103 are used to manage and send data to and from the third party server 107 via signal line 106, the micro-blogging server 121 via signal line 122, the profile server 127 via signal line 128, the client devices 115 via signal lines 108 and 112, the e-mail server 123 via signal line 124, the social graph 125 via signal line 126, the SMS/MMS server 129 via signal line 130, the IM server 131 via signal line 132 and the web server 137 via signal line 138.

In some implementations, the social network server 101, the third party server 107, the micro-blogging server 121, the e-mail server 123, the profile server 127, the SMS/MMS server 129, the IM server 131, the search server 135 and the web server 137 are hardware servers including a processor, memory, and network communication capabilities.

Figure 1B:
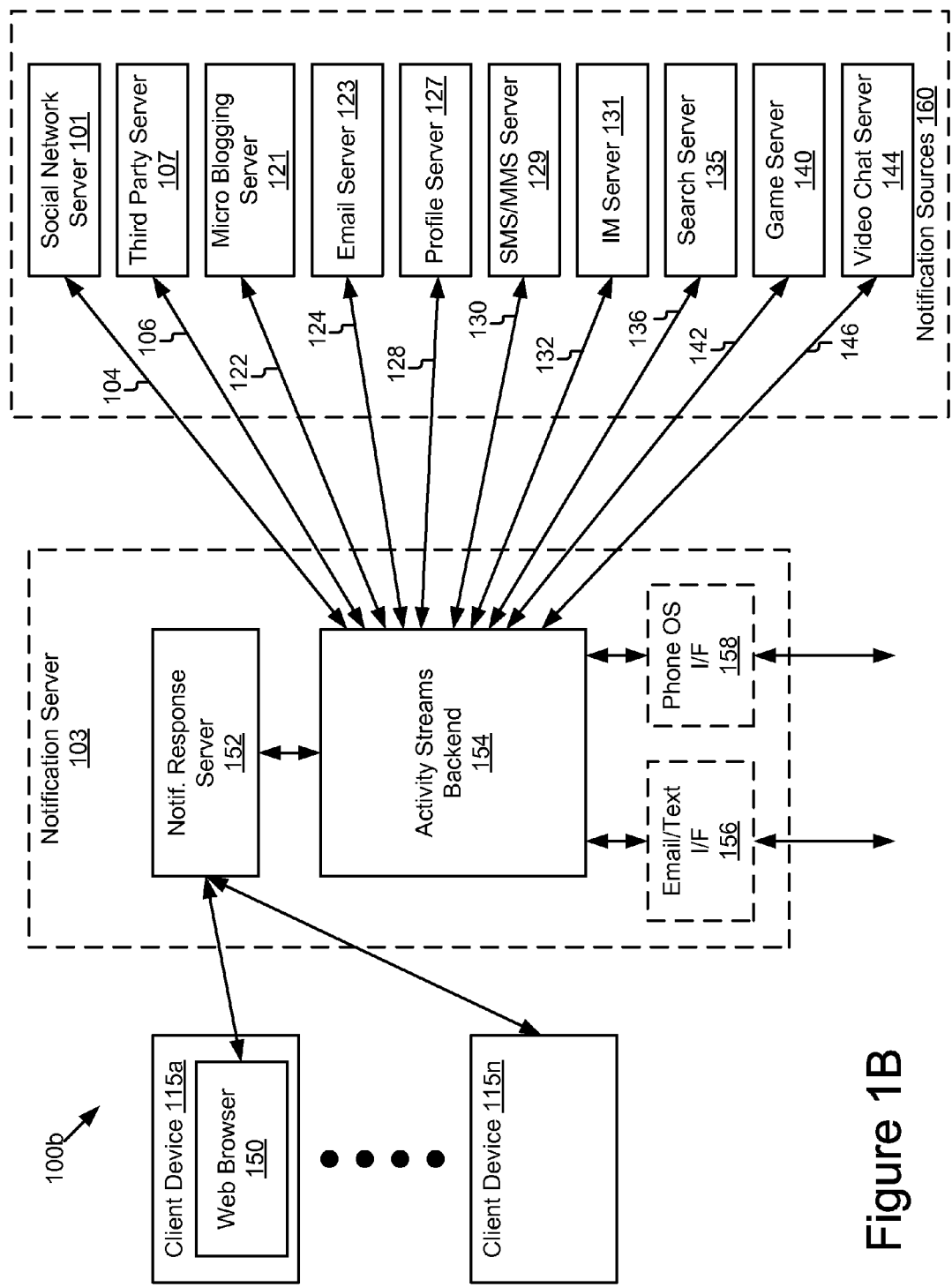

Referring now to FIG. 1B, some implementations for the system 100b (also referred to herein individually and collectively as 100) with the notification server 103 shown in more detail will be described. As shown, the system 100b includes a plurality of client devices 115a-115n, a notification server 103 and a plurality of notification sources 160. In some implementations, each of the plurality of client devices 115a-115n includes the web browser 150 and is coupled for communication with the notification server 103, in particular a notification response server 152. The notification server 103 and the web browsers 150 cooperate to generate and present for the user of the novel user interface of the present disclosure. The notification server 103 includes the notification response server 152, an activity streams backend 154, an e-mail/text interface (I/F) 156, and a phone operating system interface (OS I/F) 158. The operation of the notification server 103 and its components will be described in more detail below with reference to FIG. 2. The activity streams backend 154 is coupled to the notification response server 152 to send notification information to the web browsers 150. The activity streams backend 154 is also coupled to the notification sources 160 to receive activity information which it translates into notifications. In some implementations, the notification server 103 also includes the e-mail/text interface 156 and the phone operating system interface 158 to which the activity streams backend 154 is coupled. The notification sources 160 include one or more from the group of the social network server 101, the third party server 107, the micro-blogging server 121, the e-mail server 123, the profile server 127, the SMS/MMS server 129, the IM server 131, the search server 135 and the web server 137, which have been described above. The notification sources 160 may also include: a game server 140 for sending information related to an online game and receiving commands related to that game, and a video chat server 144 for sending information related to a video chat and receiving commands related to that video chat. The game server 140 is coupled to the activity streams backend 154 by signal line 142. The video chat server 144 is coupled to the activity streams backend 154 by signal line 146.

Figure 2:
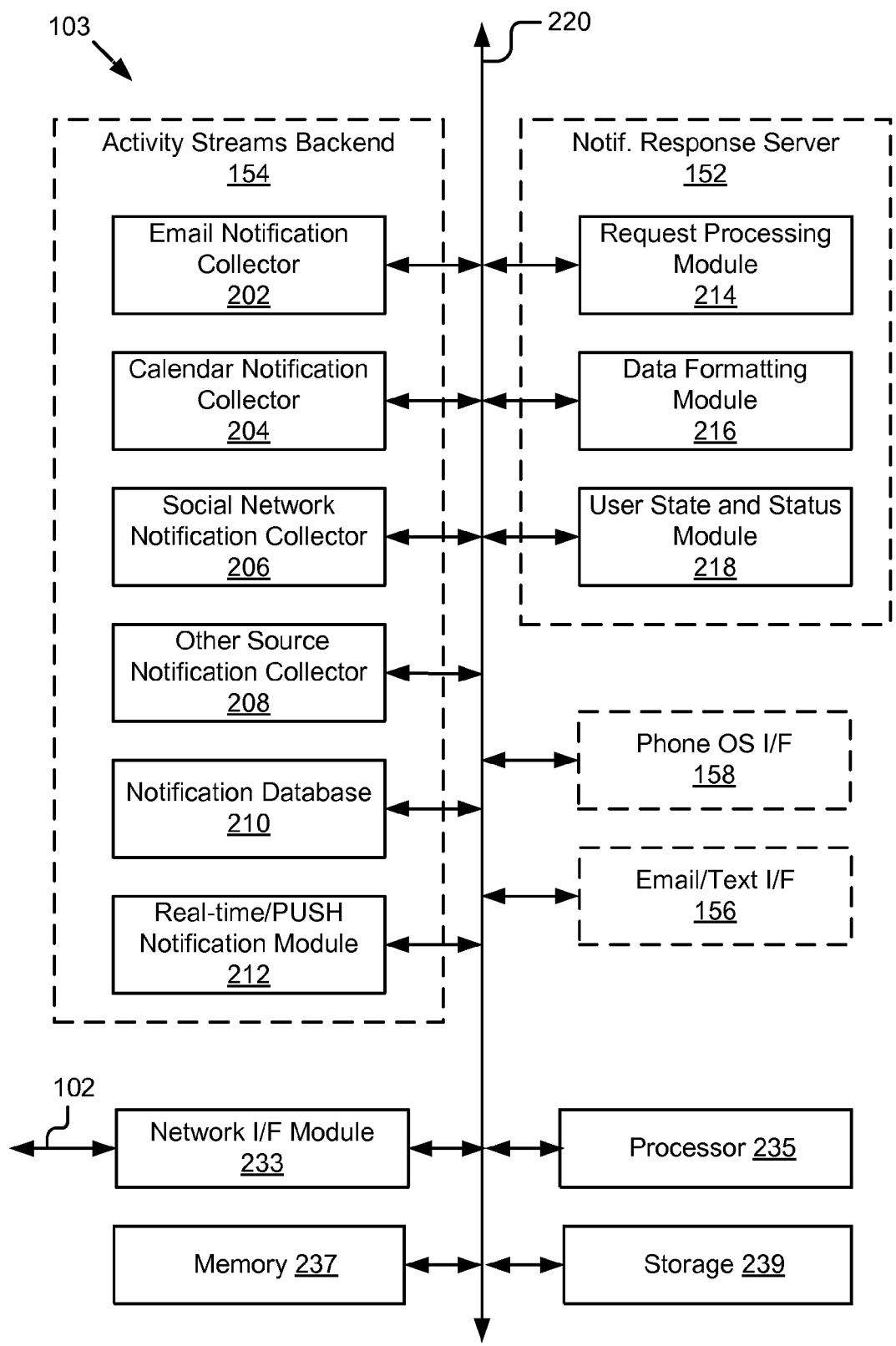
FIG. 2 is a high-level block diagram illustrating an example notification server.

FIG. 2 is a block diagram of some implementations of the notification server 103. In this implementation, the notification server 103 includes: a network interface module 233, a processor 235, a memory 237, storage 239, the notification response server 152 and the activity streams backend 154.

The network interface module 233 can be coupled to network 105 by signal line 102 and bus 220. The network interface module 233 includes ports for wired connectivity, for example, but not limited to USB, SD, or CAT-5, etc. The network interface module 233 links the processor 235 to the network 105 that may in turn be coupled to other processing systems. The network interface module 233 provides other conventional connections to the network 105 using standard network protocols, for example, TCP/IP, HTTP, HTTPS and SMTP. In some implementations, the network interface module 233 includes a transceiver for sending and receiving signals using WiFi, Bluetooth® or cellular communications for wireless communication.

The processor 235 can include an arithmetic logic unit, a microprocessor, a general purpose controller or some other processor array to perform computations and provide electronic display signals to a display device. The processor 235 is coupled to the bus 220 for communication with the other components. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. Other processors, operating systems, sensors, displays and physical configurations are possible.

The memory 237 can stores instructions and/or data that may be executed by processor 235. The memory 237 is coupled to the bus 220 for communication with the other components. The instructions and/or data may include code for performing any and/or all of the techniques described herein. The memory 237 may be a dynamic random access memory (DRAM) device, a static random access memory (SRAM) device, flash memory or some other memory device known in the art.

In some implementations, storage 239 stores data, information and instructions used by the notification server 103. The stored information includes information about users, information about messages, and other information retrieved by activity streams backend 154, in particular, collector modules 202, 204, 206, 208, the notification database 210 and the real-time/push notification module 212. In some implementations, the storage 239 also stores data and other information utilized by the notification response server 152. Storage 239 can be a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis. The storage 239 is coupled by the bus 220 for communication with other components 152, 154, 156, 158, 233, 235 and 237 of the notification server 103.

As shown in FIG. 2, the notification response server 152 includes a request processing module 214, a data formatting module 216 and a user state and status module 218. Each of these modules 214, 216 and 218 is coupled to the bus 220 for communication with each other and other components of the notification server 103. At a general level, the notification response server 152 is responsible for communication with the client devices 115. The notification response server 152 receives requests from the client devices 115 which can be a request for notification information or an input command to take a particular action with regard to a notification. The notification response server 152 is also coupled for communication with the activity streams backend 154. The notification response server 152 retrieves information from the activity streams backend 154 and also sends commands to the activity streams backend 154 for execution by the notification sources 160.

The request processing module 214 can be software and routines for processing requests that are received from the client devices 115. The request processing module 214 is coupled for communication with the client devices 115, in particular, the web browser 150. The request processing module 214 receives and processes requests from the client devices 115 for more information or requests to execute a command. The request processing module 214 serves as a controller to process requests including sending notification information, formatting information, or state information back to the client devices 115. The request processing module 214 is coupled to receive data formatting instructions from the data formatting module 216 and to retrieve user state and status information from the user state and status module 218. In some implementations, the request processing module 214 uses both information from the data formatting module 216 and data from the user state and status module 218 to generate the novel user interfaces of the present disclosure as will be described below with reference to FIGS. 3-12B. The request processing module 214 is also coupled for communication with the activity streams backend 154. The request processing module 214 retrieves information about notifications, notification lists and notification detail from the activity streams backend 154. The request processing module 214 also passes on commands to the activity streams backend 154 for transmission to and execution by the notification sources 160. In some implementations, some commands do not pass through the activity streams backend 154, but instead go directly from the client devices 115 to the notification sources 160.

The data formatting module 216 can be software and routines for determining the proper format for notification information (the number of notifications, the notification list and the notification detail). The data formatting module 216 is coupled to receive requests from the request processing module 214 and state information from the user state and status module 218. The data formatting module 216 prepares the data and specifies the format for presentation of the data. For example, the data formatting module 216 may reorder the notifications for presentation to the user based on various factors, for example, time, relevance, freshness, communication type, interest level to the user, popularity, etc. Particular examples will be described below with reference to FIGS. 8A and 8B, for example, the data formatting module 216 re-ordering the names of other users that are part of a notification. In some implementations, the data formatting module 216 only presents a predetermined number of notifications, for example, the top nine notifications ranked by a combination of relevance and time. In some implementations, the data formatting module 216 coalesces or groups multiple notifications into a single notification when they relate to the same topic, photo or have some other common characteristic. For example, a photo may be posted and there may be 13 other actions associated with that photo including tagging, posting, sharing etc. The data formatting module 216 determines a type of the notification, then determines the entity that the notification refers to (in this case the photo ID). Then the data formatting module 216 retrieves the activities related to that photo. The activities are sorted from most recent to the original. Since the notifications are related to the same type and entity they are coalesced or grouped into a single notification item. This notification item is then formatted for presentation to the user. The formatting includes putting in bold the names of any users that have performed an activity that has been unread or un-reviewed by the user. An example of this process is shown below with reference to FIGS. 8A and 8B.

The user state and status module 218 can be used to keep records as to the user state and status of each user. In some implementations, the user state and status module 218 can be a storage device capable of storing numerous records. For example, the user state and status module 218 keeps a record of which notifications have been reviewed by the user, which notifications have not been reviewed by the user and how many un-reviewed or unread notifications that the user has. Similarly, the user state and status module 218 records the state of the web browser 150 being used by the user 120, for example, selection of the notification button, the notifications that are being presented to the user in the list, or the selection of more detail for any particular notification. In some implementations, the request processing module 214 provides notification information in stages, for example, first only the number of notifications, then the list of notifications, and finally the details about individual notifications. This advantageously minimizes the amount of data that needs to be transferred from the notification server 103 to the client devices 115. Depending on the state of the user, this information will be pre-fetched from the activity streams backend 154 and sent to the user's web browser 150 in these three steps thereby minimizing perceived user latency.

In some implementations, the activity streams backend 154 includes an e-mail notification collector 202, a calendar notification collector 204, a social network notification collector 206, an other source notification collector 208, a notification database 210 and a real-time/push notification module 212. These components 202, 204, 206, 208, 210, and 212 are coupled to the bus 220 for communication with each other and other components of the notification server 103. The bus 220 can be any type of conventional communication bus.

The e-mail notification collector 202 can be software and routines for interacting with e-mail systems coupled to the activity streams backend 154 via the network 105. In some implementations, the e-mail notification collector 202 interacts with the e-mail server 123 to retrieve e-mail information, for example, messages that have been received and sent, the status of messages as to whether they read, unread, forward, replied to, etc. For example, the e-mail server 123 can be an e-mail service. The e-mail notification collector 202 in some implementations interacts with a credentials module (not shown) to retrieve the user's login name and password as well as any other information necessary to access the e-mail server 123. The e-mail notification collector 202 also stores information that has been retrieved in the notification database 210. The e-mail notification collector 202 is coupled for communication with other e-mail servers 123 and the storage 239. It should be understood that even though the e-mail notification collector 202 has been described above as connecting and extracting information from a single e-mail system, the e-mail notification collector 202 may perform the same operation for a plurality of e-mail systems that are utilized by a particular user. For example, users often have several different e-mail accounts. In some implementations, the e-mail notification collector 202 connects and collects information from two or more of these several different e-mail accounts. The e-mail notification collector 202 also interacts with the e-mail server 123 to take action with regard to e-mails that have been received for the user. For example, if a user is notified of an unread e-mail, and then reviews the e-mail using the user interface that will be described below with reference to FIGS. 4-8B; the user may respond, forward or take some other action with regard to the e-mail in the user interface. This action is transmitted from the web browser 150 to the notification response server 152 then to the e-mail notification collector 202 to deliver to the e-mail server 123.

The calendar notification collector 204 can be software and routines for interacting with the profile server 127 coupled to the activity streams backend 154 via the network 105. In some implementations, the calendar notification collector 204 interacts with the profile server 127 to retrieve profile information, for example, calendar events. In some implementations, the profile server 127 can be a free time management web applications, for example, a calendar application. The calendar notification collector 204 also stores received calendar notification information in the notification database 210. The calendar notification collector 204 also sends commands and instructions to the profile server 127 to change calendar events, add calendar events, modify parties associated with events, delete events, etc.

The social network notification collector 206 can be a module for interacting with one or more social network servers 101 or systems. In some implementations, the social network notification collector 206 is coupled by network 105 for communication and interaction with the social network server 101, social network software/application 109 and social graph 125. The social network notification collector 206 can be similar to the e-mail notification collector module 202 except that it collects notification information related to a user's interaction and use of a social network. The social network notification collector 206 interacts with a credentials module to retrieve the user's login and password as well as other information necessary to access the social network software/application 109 and social graph 125. The social network notification collector 206 retrieves and collects notification information about messages sent, messages received, information posted, posted information reviewed, change in status of friends, the addition of connections, removal of connections, and any other activity that can be undertaken by the user on the social network. The social network notification collector 206 also collects information from other individuals that are important or linked to the user. In some implementations, the application interface (API) of the social network is used by the social network notification collector 206 and extracts information. Thus, it should be understood that the social network notification collector 206 can retrieve any information related to the user from the social network. The social network notification collector 206 stores the information it collects in the notification database 210. The social network notification collector 206 is coupled by the bus 220 to the storage 239. Example notifications include friend requests, a post to a source being processed, or any other activity on the social network of importance to the user. The social network notification collector 206 also interacts with the social network to respond to any notifications, for example, accepting the friend request, replying to a post or any other action on the social network that is possible in response to the notification.

The other source notification collector 208 can be software and routines for interacting with and extracting information from any other electronic messaging system or any other notification source 160. The other source notification collector 208 has the credentials and the application interface for interacting with the other notification sources 160. The other source notification collector 208 processes the other notification sources 160 for activities of which the user wants to be notified and also can take any action with regard to the activities that is allowed by the other sources. The other source notification collector 208 collects information related to the user's interaction with those other systems. The other source notification collector 208 stores the information collected in the notification database 210. Example other sources include the third party server 107, the micro-blogging server 121, the SMS/MMS server 129, the IM server 131, the search server 135 and the web server 137.

The notification database 210 can be data storage for storing information received from any of the notification sources 160. In some implementations, the notification database 210 can be a database organized by user. For each user, the notification database 210 stores any activity information received from any of the notification sources 160. For example, this can include e-mails details (e.g., header, sender, date, subject, etc.), social network activity, for example, posts, shares, invitations, status changes, etc. The notification database 210 is coupled for communication with the notification collectors 202, 204, 206 and 208. The notification database 210 is also coupled to the notification response server 152 to provide notification information responsive to queries by the request processing module 214.

The real-time/push notification module 212 can be software and routines for responding to notification sources 160 that push notification data to the activity streams backend 154. For most of the notification sources 160, the notification collectors 202, 204, 206 and 208 retrieve the notification information from the notification sources 160 by polling, or on a periodic basis as has been described above. However, for some data, the notification sources 160 push the data in real time to the activity streams backend 154. In such cases, the real-time/push notification module 212 is coupled for communication with those notification sources 160 that push data in real time. In some implementations, the real-time/push notification module 212 has a persistent connection or browser channel with the notification sources 160 that are pushing data. The real-time/push notification module 212 receives the pushed information, stores the pushed information in the notification database 210 and also sends a signal to the notification response server 152 to update the user interface and web browser 150 of the user corresponding to pushed information, in other words process the pushed activity information by generating and sending a new notification to the client devices 115. One example of notification information pushed in real time is a request for a video chat from the video chat server 144. Another example of notification information pushed in real time is an invitation to hang out at a location in the social network.

One or more of the e-mail notification collector 202, the calendar notification collector 204, the social network notification collector 206, the other source notification collector 208, the real-time/push notification module 212, the request processing module 214, the data formatting module 216, and the user state and status module 218 are executable on the processor 235. In some implementations, the e-mail notification collector 202, the calendar notification collector 204, the social network notification collector 206, the other source notification collector 208, the real-time/push notification module 212, the request processing module 214, the data formatting module 216, and the user state and status module 218 store data that, when executed by the processor 235, causes the collectors/modules to perform the operations described below. In some implementations, one or more of the e-mail notification collector 202, the calendar notification collector 204, the social network notification collector 206, the other source notification collector 208, the real-time/push notification module 212, the request processing module 214, the data formatting module 216, and the user state and status module 218 are instructions executable by the processor 235 to provide the functionality described below with reference to FIGS. 4-17. In some implementations, one or more of the e-mail notification collector 202, the calendar notification collector 204, the social network notification collector 206, the other source notification collector 208, the real-time/push notification module 212, the request processing module 214, the data formatting module 216, and the user state and status module 218 are stored in the memory 237 of the notification server 103 and are accessible and executable by the processor 235.

In some implementations, the notification server 103 includes the e-mail/text interface 156 and the phone operating system interface 158. It should be understood that these interfaces 156, 158 are optional and shown with dashed lines in FIGS. 1B and 2. The e-mail/text interface 156 allows the notification server 103 to be coupled and interact directly with e-mail servers 123 and SMS/MMS servers 129 owned and operated by other parties. In some implementations, the e-mail/text interface 156 allows these systems direct communication with the real-time/push notification module 212. Similarly, the phone operating system interface 158 allows mobile handsets operating a phone operating system, for example, Android to interact with the notification server 103. These interfaces 156, 158 allow more direct interaction between the notification server 103 and these other systems. This is advantageous to reduce latency and increase functionality.

Figure 3:
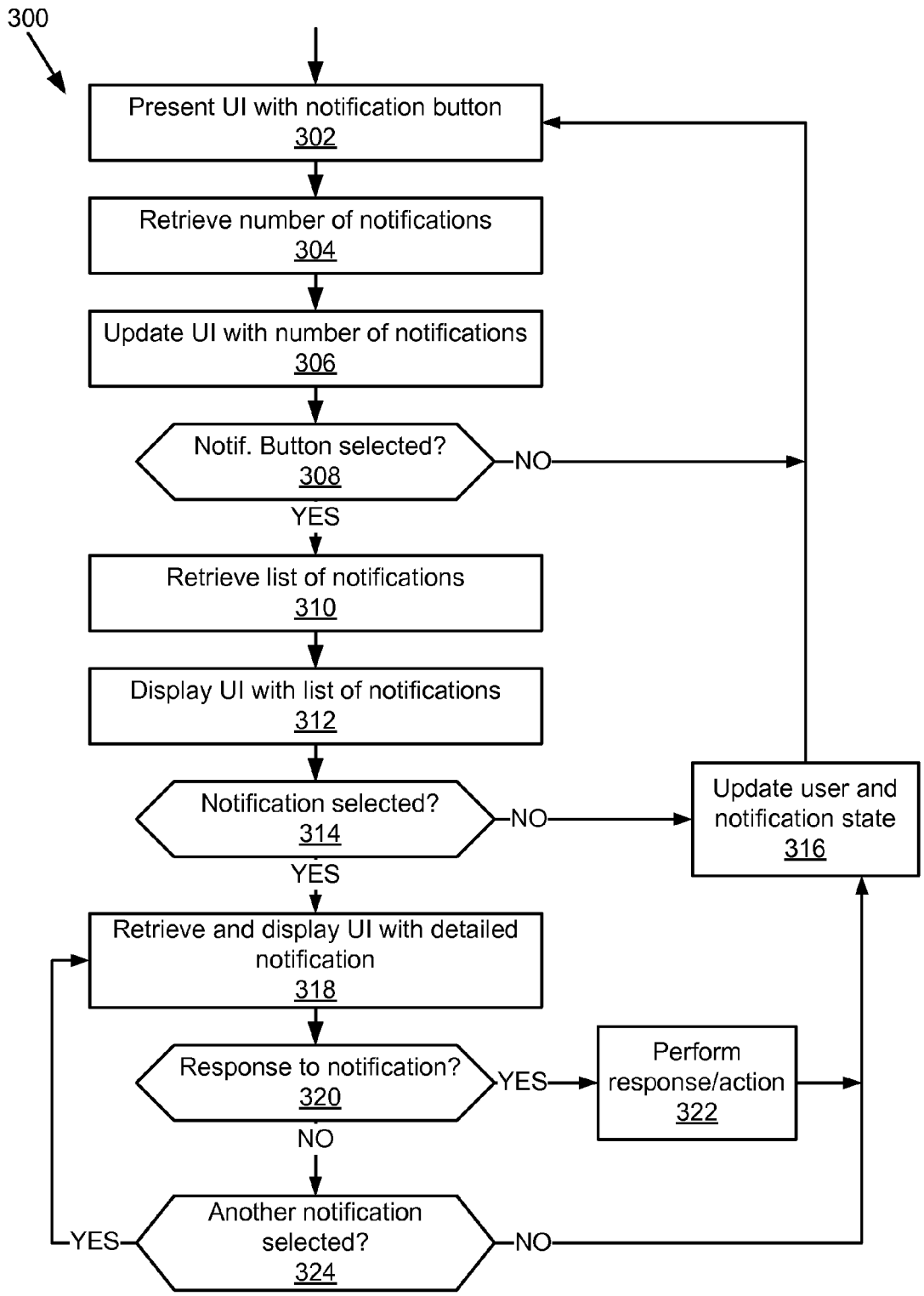
FIG. 3 is a flowchart of an example method for providing notifications.
Figure 6A:
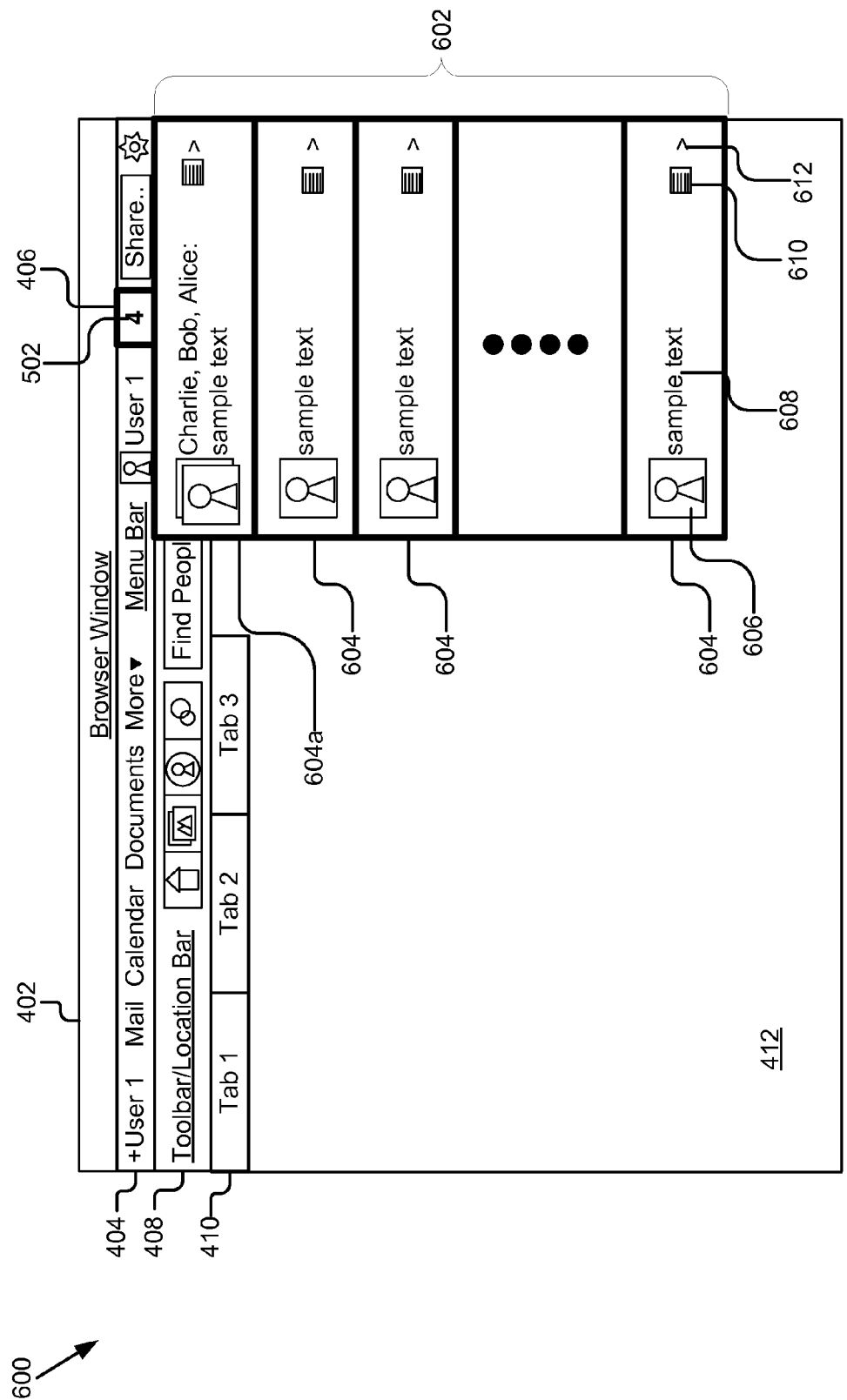
FIGS. 6A-6F are graphic representations of example user interfaces for presenting a notification list.
Figure 7A:
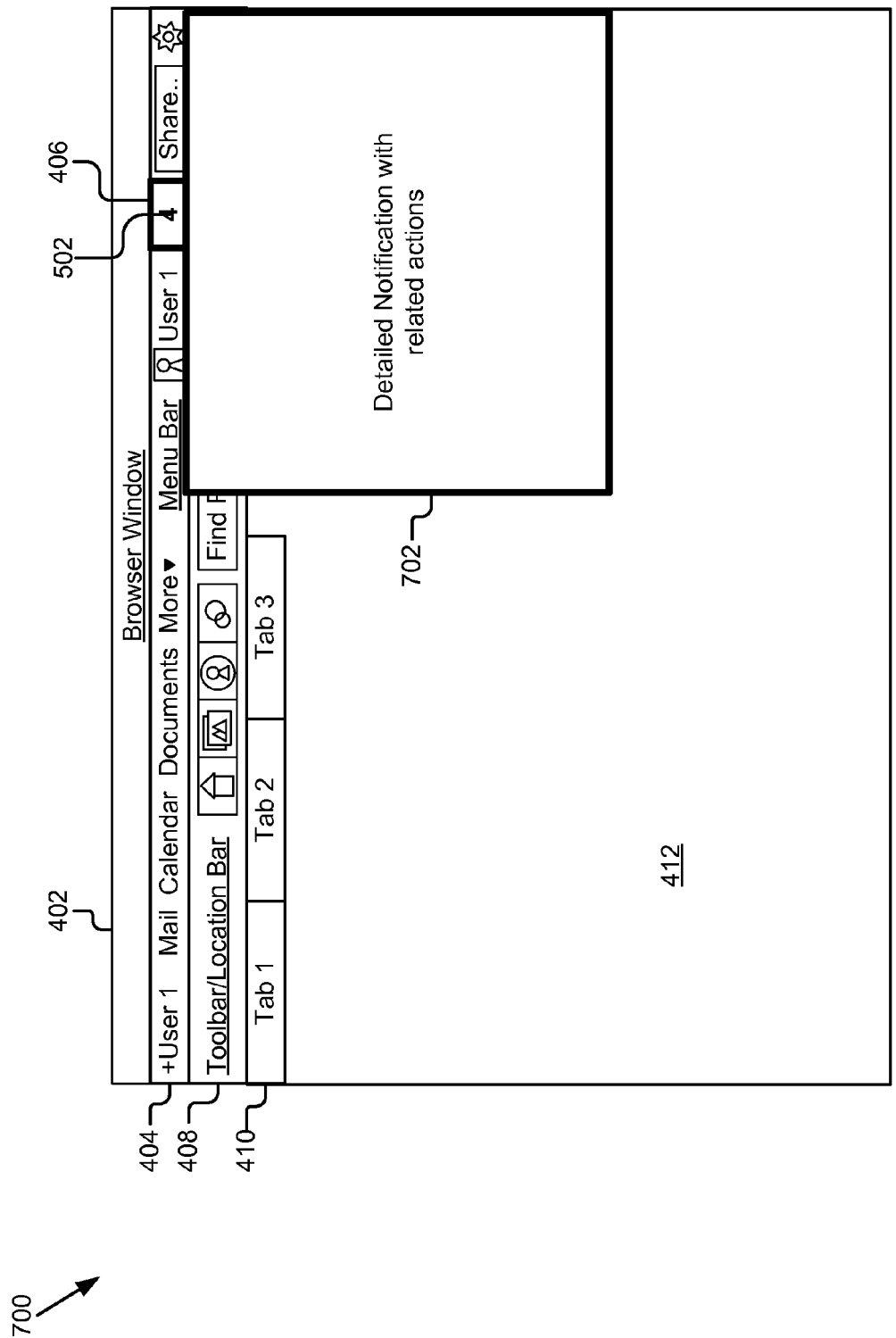

Referring now to FIG. 3, a method 300 for providing notifications according to some implementations of the present disclosure will be described. The method can include presenting 302 a user interface with a notification button 406 as will be described in more detail below with reference to FIG. 4. The method includes retrieving 304 the number of notifications that are unread for this user. For example, the request processing module 214 retrieves this information from the notification database 210. The method can continues by updating 306 the user interface with the number of notifications. For example, the request processing module 214 sends the number of notifications to the client device 115a and the client device 115a updates the user interface. An example of this is shown with the differences between FIGS. 4 and 5A as will be described below in more detail. The method can include determining 308 whether the user has selected the notification button 406. For example, the user 120a inputs a selection of the notification button at the web browser 150 of the client device 115a. In some implementations, the method determines whether there is an indication of user interest in the notification button. This indication of user interest in the notification button may be selection of the notification button, movement of a cursor over the notification button or movement of the cursor proximate the notification button. The client device 115a sends this selection to the notification server 103, in particular the request processing module 214 of the notification response server 152. If not, the method can wait a predetermined amount of time and loops back to step 302. However, if the user has selected the notification button 406, the method can proceed to retrieve 310 a list of notifications. Again, in some implementations the request processing module 214 retrieves this information from the notification database 210. The method can include displaying 312 a new user interface showing the list of notifications. An example of an interface 600 is shown in FIG. 6A and will be described in more detail below. The method can determine 314 whether the user requested more detail about a notification. If not, the user and notification states are updated 316 after which the method returns to step 302. In some implementations, if the user has viewed a list of notifications, those notifications are changed in status from unread to read. The state as to the time at which the user reviewed notifications can also be recorded. On the other hand, if it is determined in step 314 that the user has requested more detail about a notification, the method can continue in step 318 by retrieving and displaying a new user interface with detailed information about the notification selected from the list. An example of an interface 700 is shown in FIG. 7A and will be described in more detail below. The method can include determining 320 whether the user is taking an action or responding to the notification. The user interface 700 of the present disclosure advantageously provides a way in which to seamlessly reply to notifications without having to open additional windows, tabs or applications, etc. The user interface 700 allows the user to input actions responsive to the notification, and in some implementations, includes only those actions or responses that are appropriate and most likely to be taken by the user for the given type of notification. If the user inputs a response or action for the notification, the method can perform 322 that response or action after which the method continues in step 316 to update the user and notification states. The action can be sent from the client devices 115 to the notification server 103 and then to the notification sources 160. On the other hand, if the user is not responding to the notification, the method can determine 324 whether the user has requested more information about another notification. If so, the method returns to step 318, retrieves details about another notification and updates the user interface. If the user has not requested more information, the method returns to step 316 to update the user and notification states. The method of the present disclosure is particularly advantageous because it minimizes the amount of information that the notification server 103 must provide to the client devices 115. It does this by first providing the number of notifications (a very small amount of data and easily computed), by providing only the list of notifications (an additional amount of data but still relatively small), and providing full detail about only those notifications that are selected by the user. Thus, only if the user is actually interested in the information will it be sent from the notification server 103 to the client devices 115.

Figure 4:
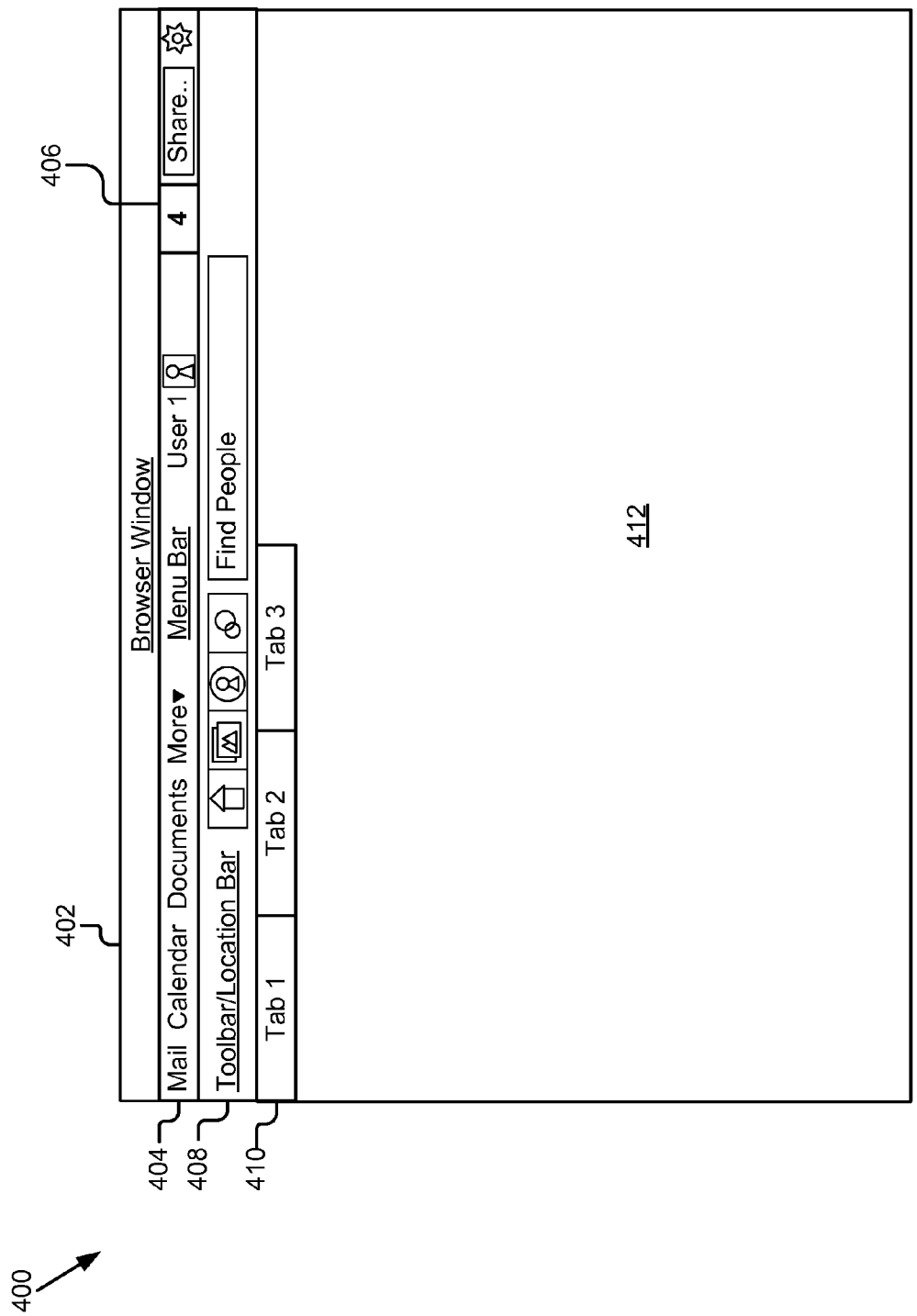
FIGS. 4 and 5A-5G are graphic representations an example user interface for presenting notifications.

Referring now to FIG. 4, an implementation of a user interface 400 for presenting notifications according to the present disclosure is described. The user interface 400 includes a browser window 402 having a number of components including a top label, a menu bar 404, a notification button 406, a tool bar/location bar 408, one or more tabs 410 and a display area 412. The top label, the menu bar 404, the tool bar/location bar 408, the one or more tabs 410 and the display area 412. For example, the menu bar 404 provides menus to access browser functionality. The tool bar/location bar 408 provides tools, for example, buttons for moving to a prior webpage, a next webpage, refreshing a webpage, etc. as well as the address of the webpage being shown in the display 412. The tabs 410 are provided to access one or more web pages simultaneously. There can be any number of tabs from one to n at a specified time. The present disclosure advantageously provides a new notification button 406 to provide feedback to the user as to any notifications specific to the user that are available on the notification server 103. In this implementation, the notification button 406 is advantageously positioned near the top of the browser window 402 proximate the menu bar 404. In this example, the notification button 406 is a square button; however, it should be understood that it could also be any other shape or symbol. Furthermore, the notification button 406 could also be of a different color, have shading, or be highlighted in various other ways to be presented in a visually distinct manner from the top label, menu bar 404, and tool bar/location bar 408 or other components of the browser window 402. In some implementations, the notification button 406 is of a first color (e.g., gray) when there are no unread notifications and the user interface is updated to a second color (e.g., red) when there are unread notifications. The same effect could be achieved by transitioning between shapes and symbols. The implementation shown in FIG. 4 is only one example for the user interface. The notification button 406 as well as the other components of the browser window 402 may be organized in different arrangements with different shades and different visual formatting.

Figure 5A:
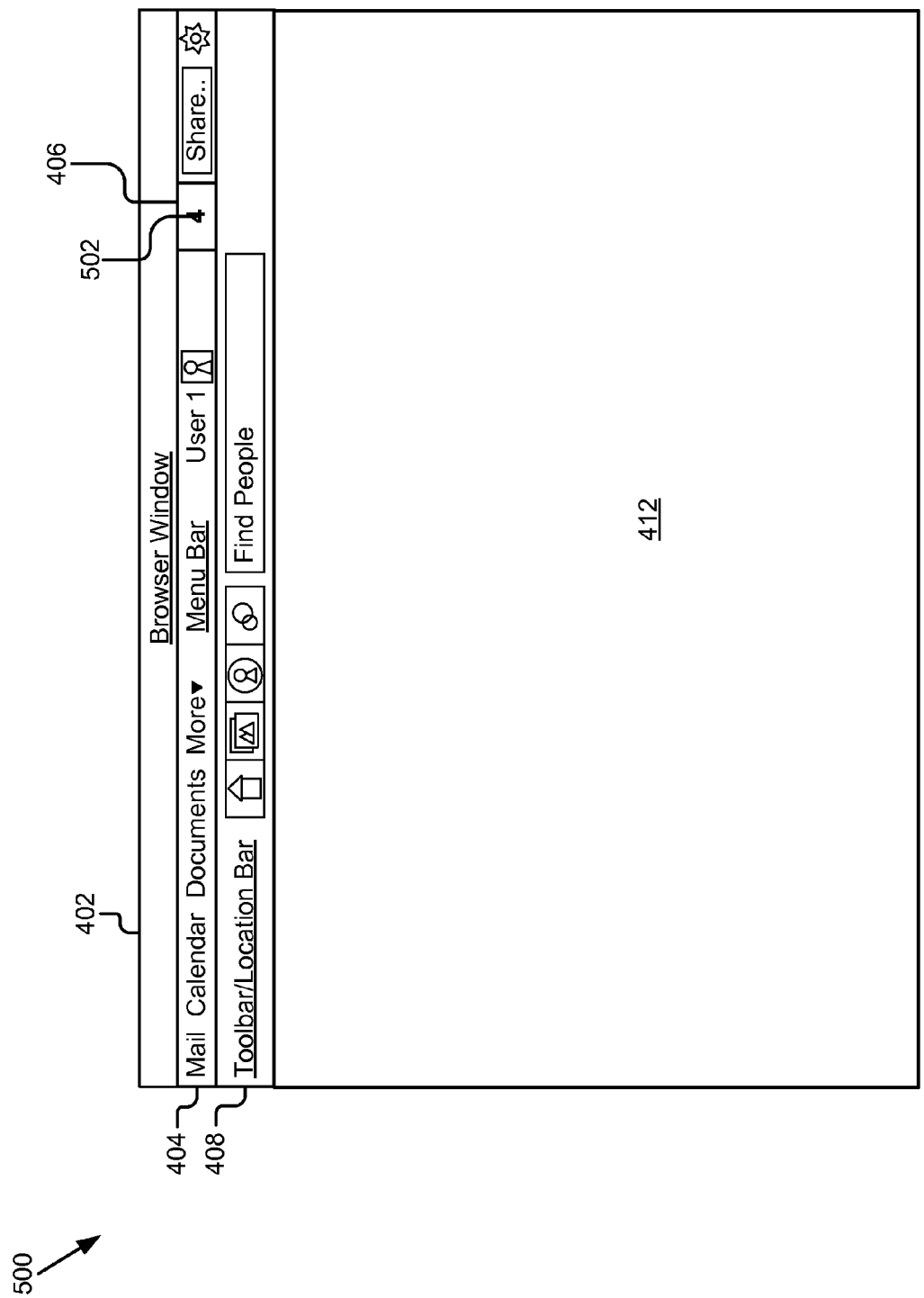

Referring now to FIG. 5A, an implementation of the user interface 500 for presenting notifications when there are unread notifications is shown. In this implementation, the user interface 500 includes an updated notification button 406 that includes a visual indication 502 as to the number of unread notifications that are available for this user. In this example, the visual indication 502 is a number that is positioned within the notification button 406. There are other various ways to provide a visual indication that there are unread messages which are included and encompassed within the scope of the present disclosure. Additionally, as the number of unread notifications increases, the number will increment. In addition to the number incrementing, the notification button 406 could animate in any of number of ways in order to draw the user's eye to the new information. This animation could be in place, or if the user has scrolled past the notification badge, the badge could peek from above the scrollable area into the scrollable area for a brief period of time. For example, the notification button 406 may be shown in a different color as discussed above or a portion of the notification button 406 may be shaded or shown in a visually distinct manner to indicate a percentage of additional notifications that are unread, where the percentage of the notifications button with a different color or format indicates the percentage of notifications that are unread.

Referring now to FIGS. 5B-5G, additional implementations of the user interface 550-560 for interaction with different types of notification sources 160 are shown. The notification system 100 is particularly advantageous because it provides a uniform interface independent of the type of messaging that the user is undertaking. For example, regardless of whether the user is interacting with any e-mail program, calendar program, a social network, a document program or Internet search program, the browser window 402 and the relative position of the notification button 406 remain the same. This is more clearly shown by a comparison of the position of the notification button 406 in FIGS. 5B-5G.

Figure 5B:
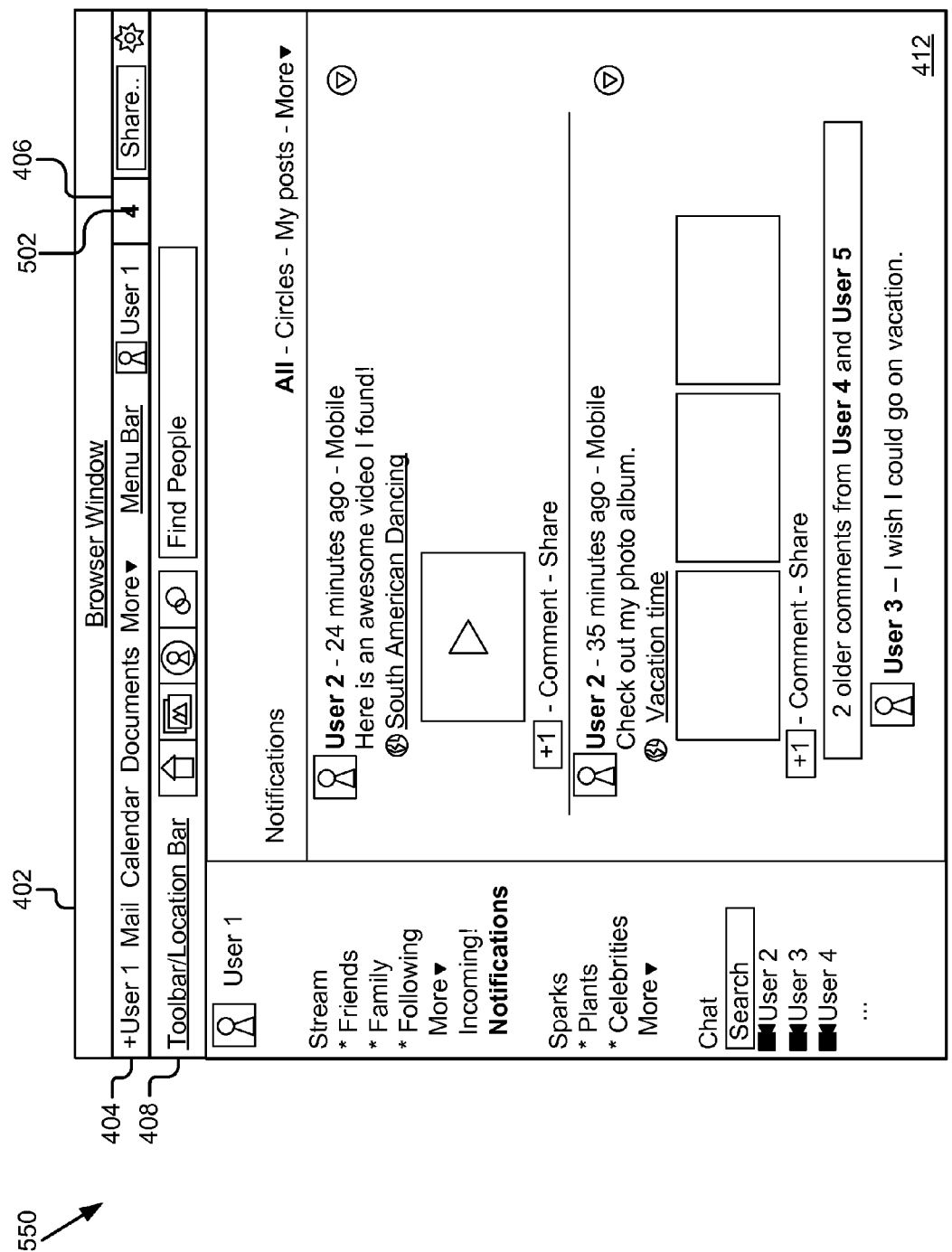

FIG. 5B shows an implementation of the notifications user interface 550 on a web browser.

Figure 5C:
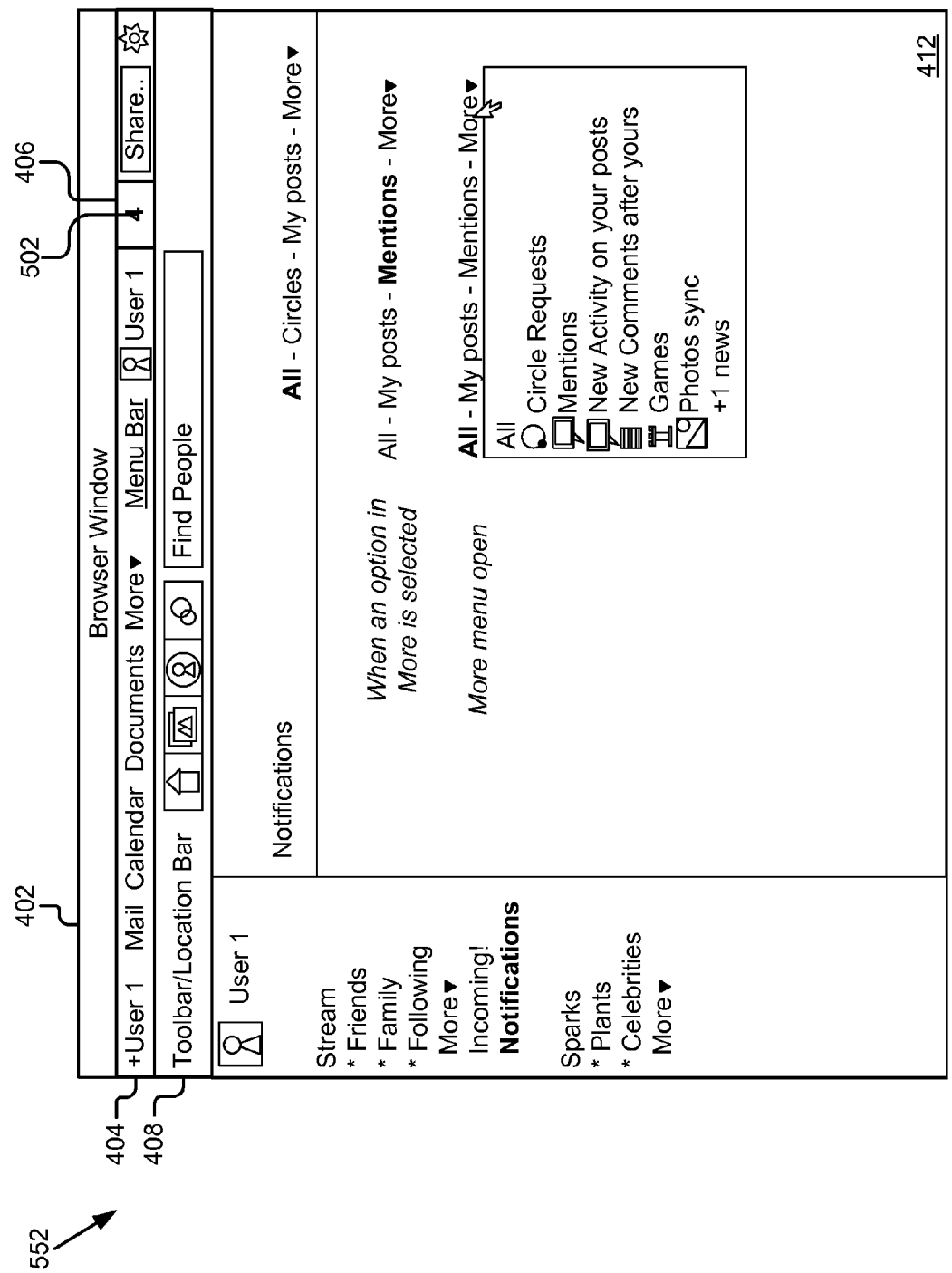

FIG. 5C shows an implementation of the notifications user interface 552 on a web browser with the notifications filtered.

Figure 5D:
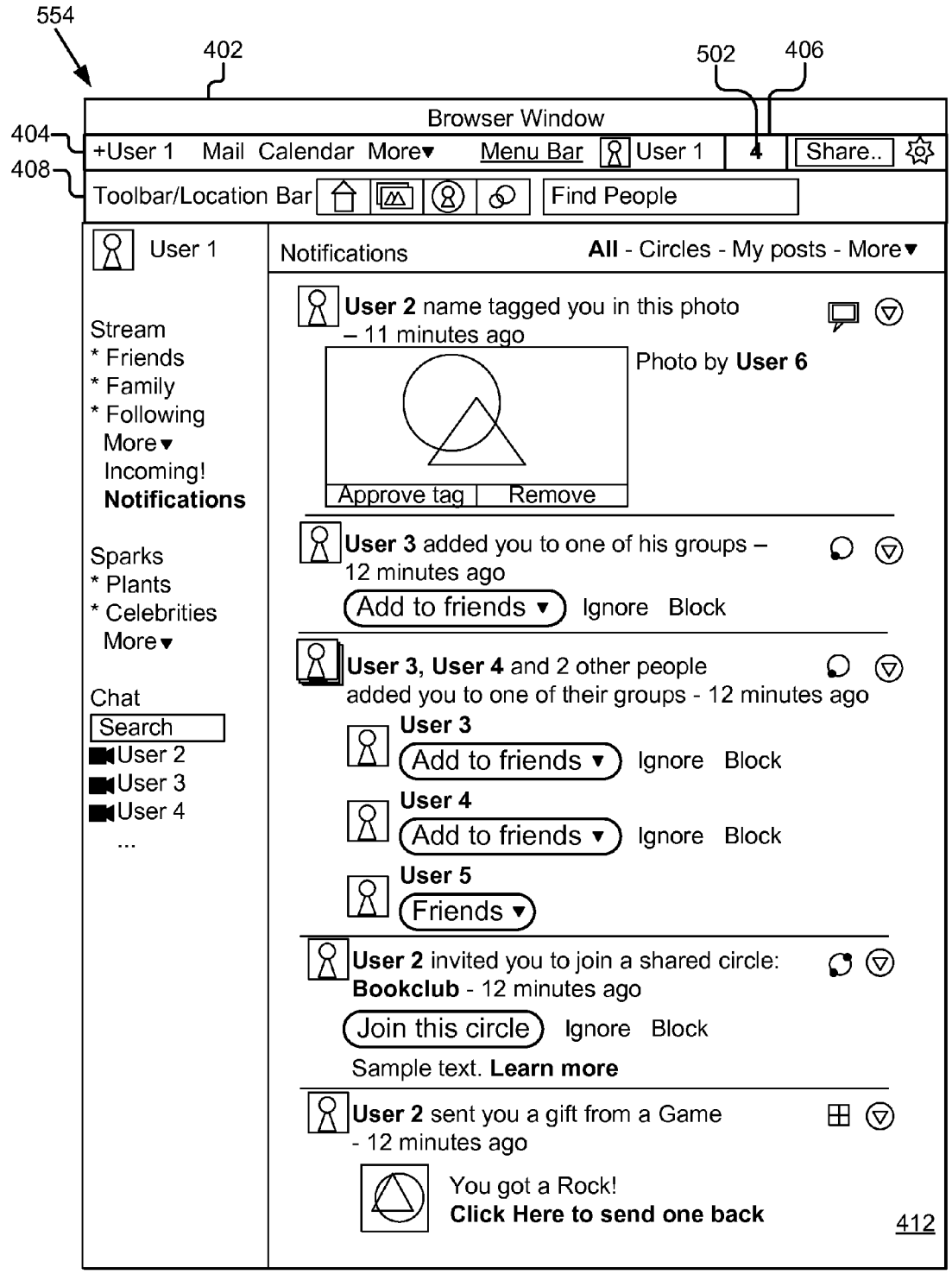

FIG. 5D shows a first implementation of the notifications user interface 554 on an example social network feed.

Figure 5E:
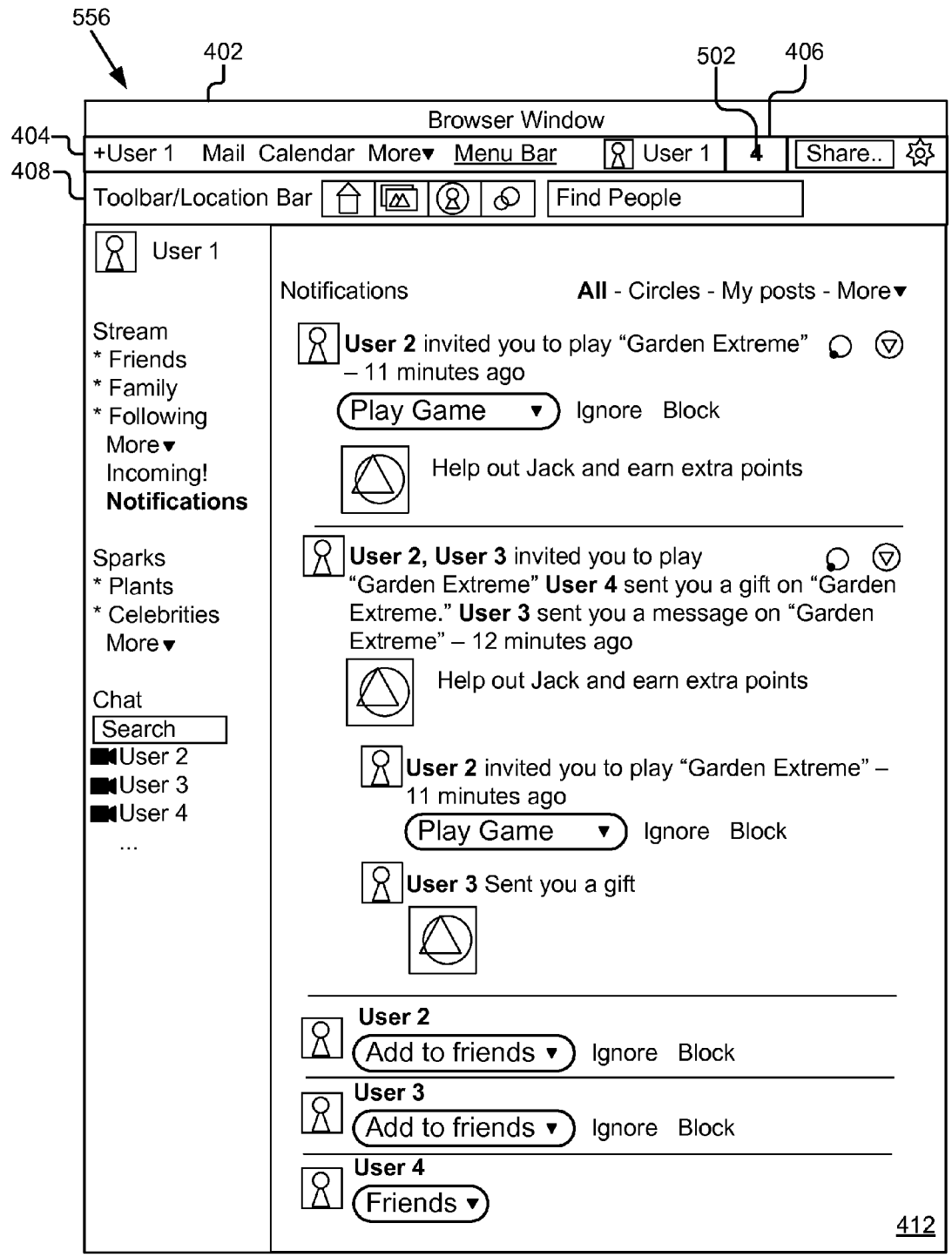

FIG. 5E shows an implementation of the notifications user interface 556 on a game window.

Figure 5F:
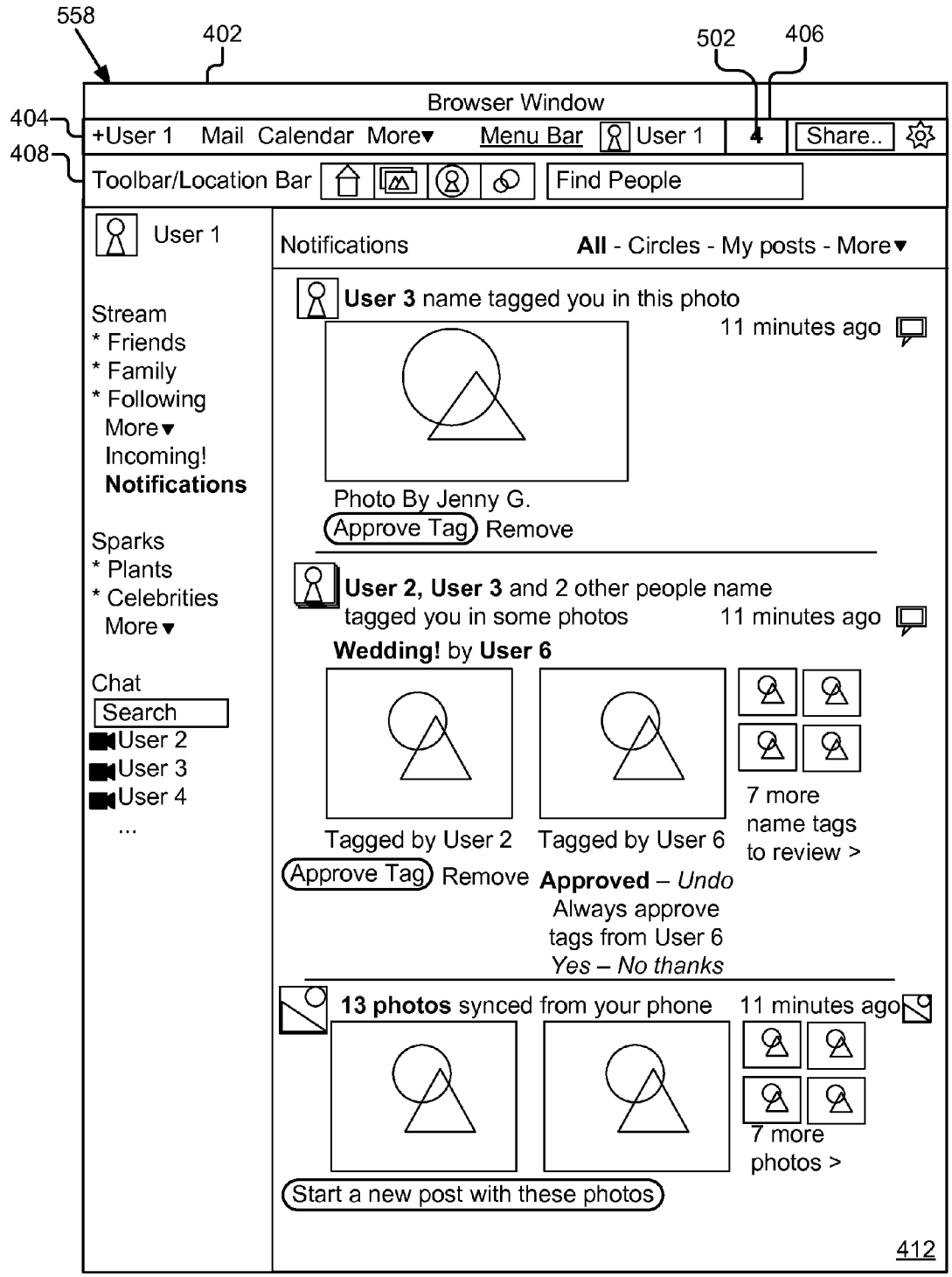

FIG. 5F shows an implementation of the notifications user interface 558 on a photo window.

Figure 5G:
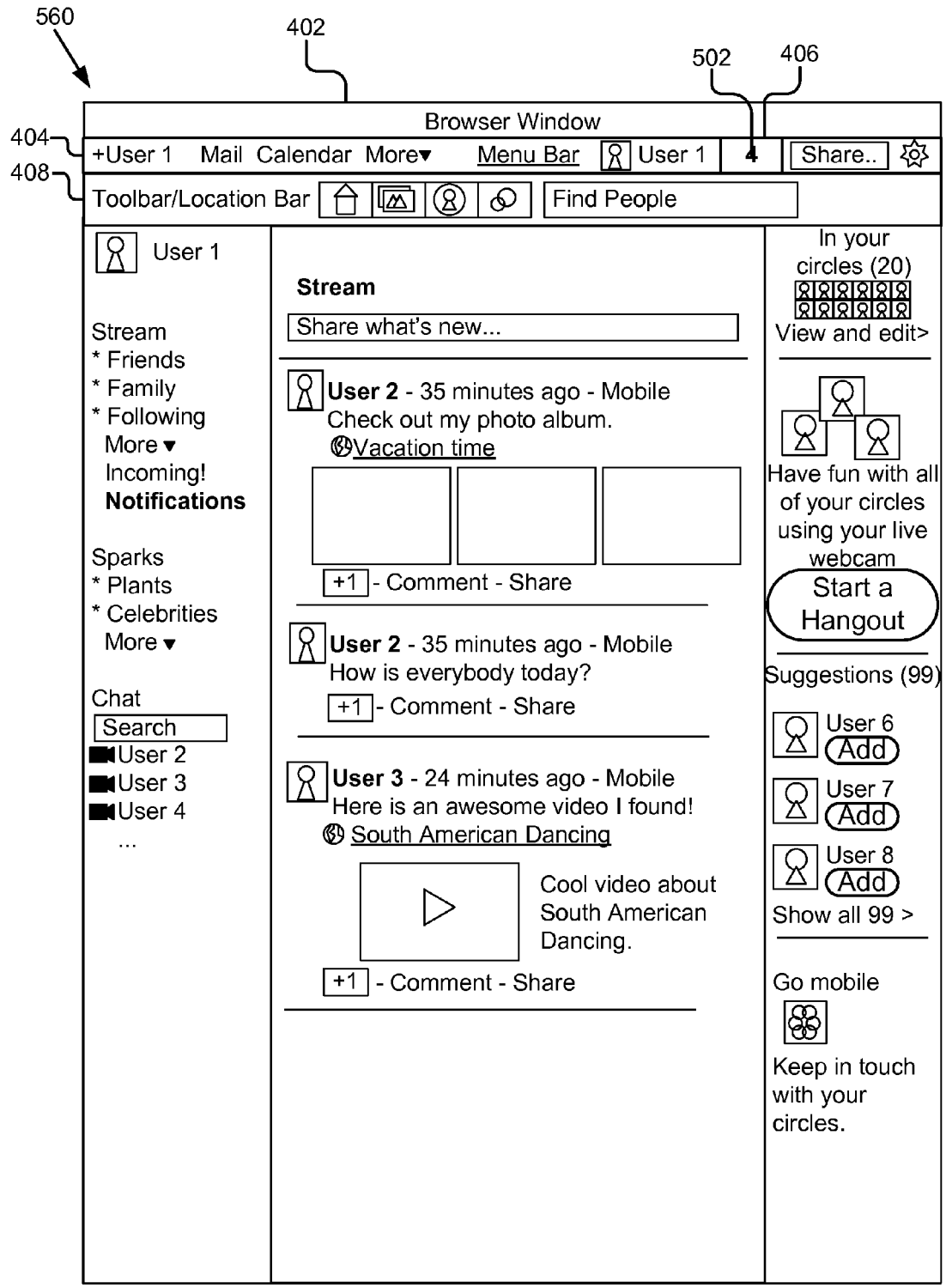

FIG. 5G shows a second implementation of the notifications user interface 560 as part of a social network interface.

Referring now to FIG. 6A, the user interface 600 for presenting a notification item list 602 according to the present disclosure will be described. The notification button 406 is included on a header bar that is present across multiple systems and has been described above with reference to FIG. 5. When the user selects the notification button 406, the user interface transitions from that of FIG. 4 or 5A to that of FIG. 6A. The user interface 600 displays a notification item list 602 that shows recent notifications of different types (e.g., users that have added you to their social graph, posts where people mention you, etc.). These notifications are coalesced together by type, and/or by the post that they hang off of, and users can respond to these notifications without having to navigate away from the notification item list 602 (e.g., user can add people to their social graph and respond to posts in this box without having to navigate to the social network's homepage).

The user interface 600 includes the browser window 402 having similar components as described above with reference to FIGS. 4 and 5A. Additionally, the user interface 600 presents a notification item list 602 with a plurality of menu/notification items 604. Each menu/notification item 604 includes an identifier or profile 606 of the user, abstracted users and content information 608, an icon 610 indicating notification types and a link 612 to transition to another interface that shows the full detail of the notification item 604. In some implementations, this user interface 600 is created by code that creates an i-frame within the browser window 402, and the data for the menu is fetched from the notification server 103.

One advantage of the present disclosure is that notification server 103 filters the notifications and presents the notifications that are of greatest interest to the user. In one example, only the top nine menu/notification items 604 are shown in the notification item list 602. This number can vary between two and n and in some cases may even be customizable by the user to any number desired by setting the user preference. In some implementations, the menu/notification items 604 are ordered in the notification item list 602 according to relevance to the user. In some implementations, the menu/notification items 604 are ordered in the notification item list 602 according to chronological order. In some implementations, the menu/notification items 604 are ordered in the notification item list 602 based on priority of whether a specific response by the user is required. In some implementations, the menu/notification items 604 are ordered in the notification item list 602 based on implied importance to the user based on their social graph. Finally, in some implementations, the menu/notification items 604 are ordered in the notification item list 602 according to a combination of the above factors.

Furthermore, it should be noted that the notification server 103 also coalesces or groups individual notifications to minimize the number of items 604 that are in the notification item list 602. In one example, the notifications are grouped according to type so that e-mail notifications are grouped together as one notification item 604, calendar notifications are grouped together as one notification item 604, social network notifications are grouped together as one notification item 604, etc. It should be understood that the notifications can also be grouped by type, subtype and topic. For example, there might be three notification items 604 in the notification item list 602 for social networking: one notification item 604 for posts on the social network, one notification item 604 for friend requests on the social network, and one notification item for sharing of photos on the social network. In the above example, the type is social networking, the subtype is posts, friend requests, or photo sharing, and these pairings of type and subtype can be further grouped or coalesced by topic. In some implementations, the menu/notification items 604 are displayed in visually distinct manners based upon whether they are read or unread.

The identifier or profile 606 of the user is information that the user can quickly view to ascertain the user that generated the notification. In some implementations, the identifier or profile 606 is a photo of the user. In some implementations, the identifier or profile 606 can be the name or system login of the user.

The abstracted users and content information 608 can be abstracted information about users that are related to the notification and the content of the notification. In some implementations, this includes different usernames and some sample text. For example, the abstracted users and content information 608 could be the last three people that responded to the post and the topic of the post. Even more specifically, for the first menu/notification item 604a, the users that have commented on the post are Charlie, Bob and Alice and the sample text is an abstract of the topic of the post. In some implementations, this abstracted users and content information 608 can be stored in the notification database 210 so that it can easily be fetched by the notification response server 152 for inclusion in the notification item list 602.

The icon 610, indicating notification type, can be some symbol or text identifying the notification type. In some implementations, each of the notification sources 160 has a visually distinct symbol. This symbol is used for the icon 610. For example, there might be a first symbol for e-mail, a second symbol for social networking, a third symbol for a calendar notification, a fourth symbol for instant messages, etc. In some implementations, the number of icons 610 is less than 10 and therefore some of the notification sources 160 share the same icon even though being a different type of notification.

The link 612 can be provided to allow the user to transition to another interface (see e.g. FIG. 7A) that shows the full detail of the notification item 604. In this implementation, the link is shown as a greater than symbol, however, various other types of visual indications, for example, underlining the abstracted users and content information 608 could be used.

In some implementations, the user interface shown in FIG. 6A can be also integrated with the web browser 150 so that it is interoperable for easy navigation using the direction keys. More specifically, if the user selects the up or down direction keys the notification item 604 selected in the notification item list 602 moves upward or downward, respectively. Similarly, the left and right direction keys are used to transition between the user interface of FIG. 6A and the user interface of FIG. 7A in terms of getting less or more detail about a notification. For example, if the notification item list 602 is shown and the user selects the right direction key, the user interface 600 transitions from FIG. 6A to the user interface 700 of FIG. 7A. Similarly, if the user interface 700 of FIG. 7A is shown and the user selects the left arrow, the user interface 700 transitions from that of FIG. 7A to the user interface 600 of FIG. 6A. In some implementations, the left and right direction keys are also used to transition between different notifications in the detailed notification view of FIG. 7A-7I.

Figure 6B:
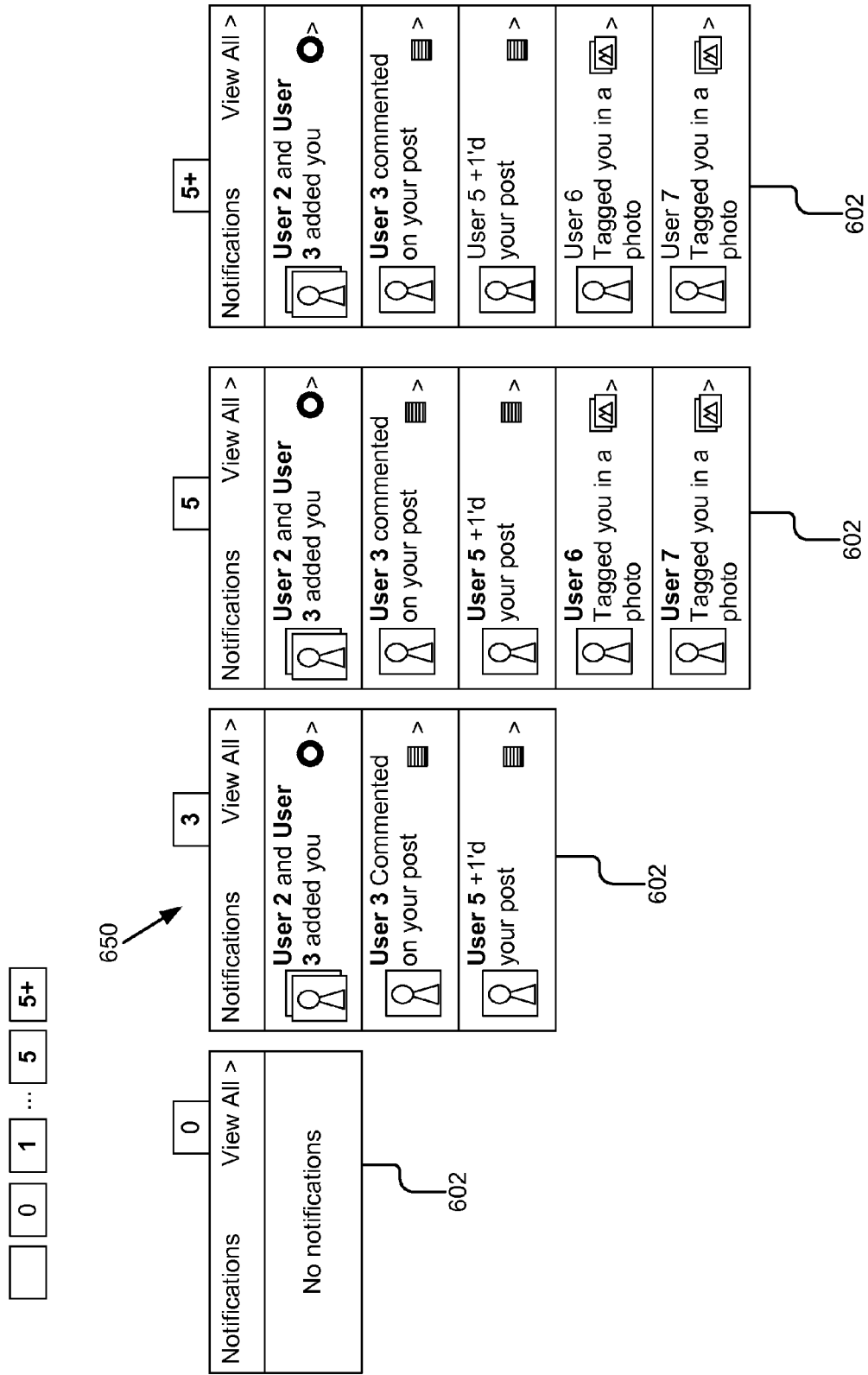

Referring now to FIG. 6B, another implementation of notification item lists 602 in a list view user interface 650 is shown.

Figure 6C:
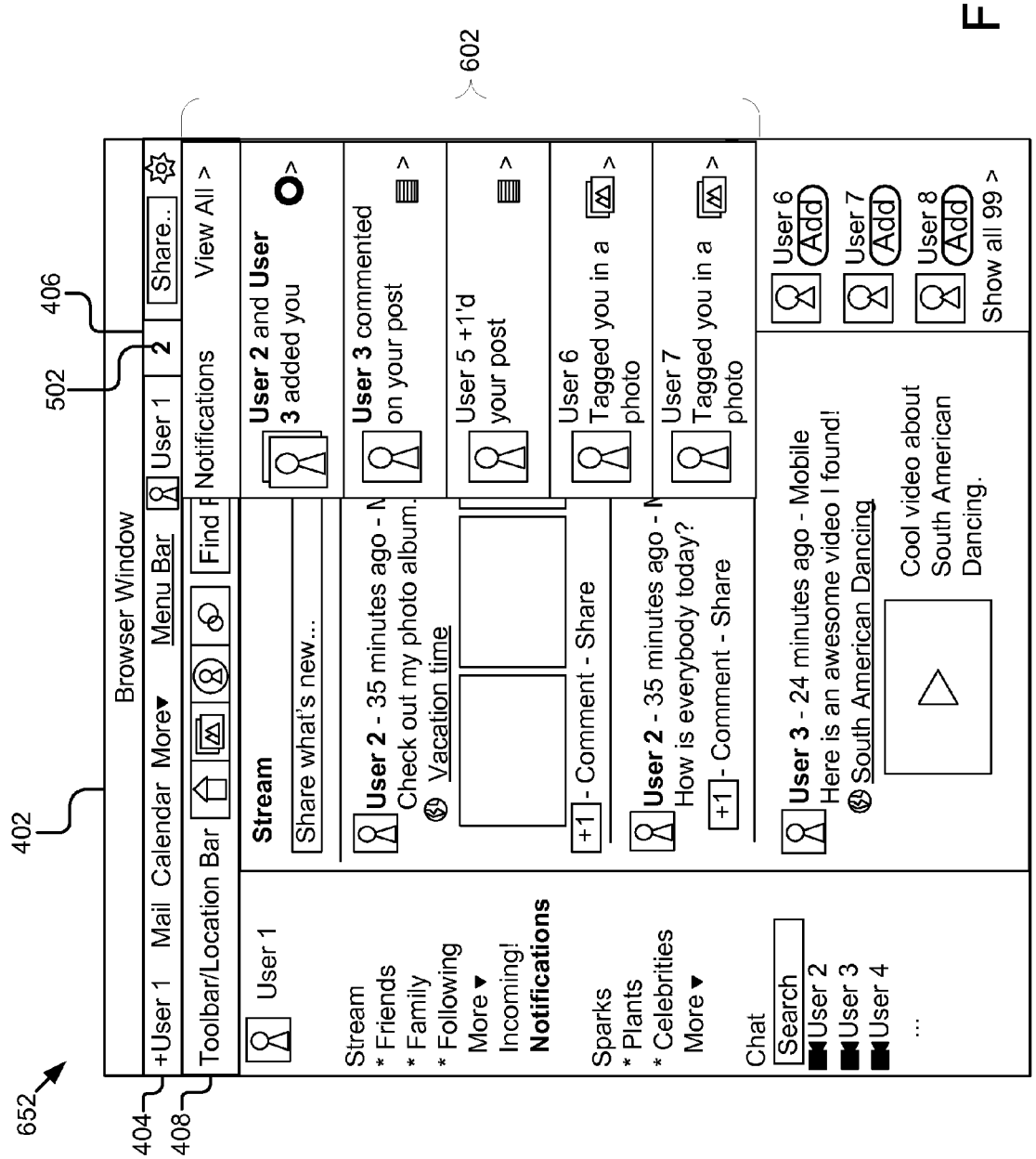

Referring now to FIG. 6C, another implementation of the list view user interface 652 over a social network interface is shown.

Figure 6D:
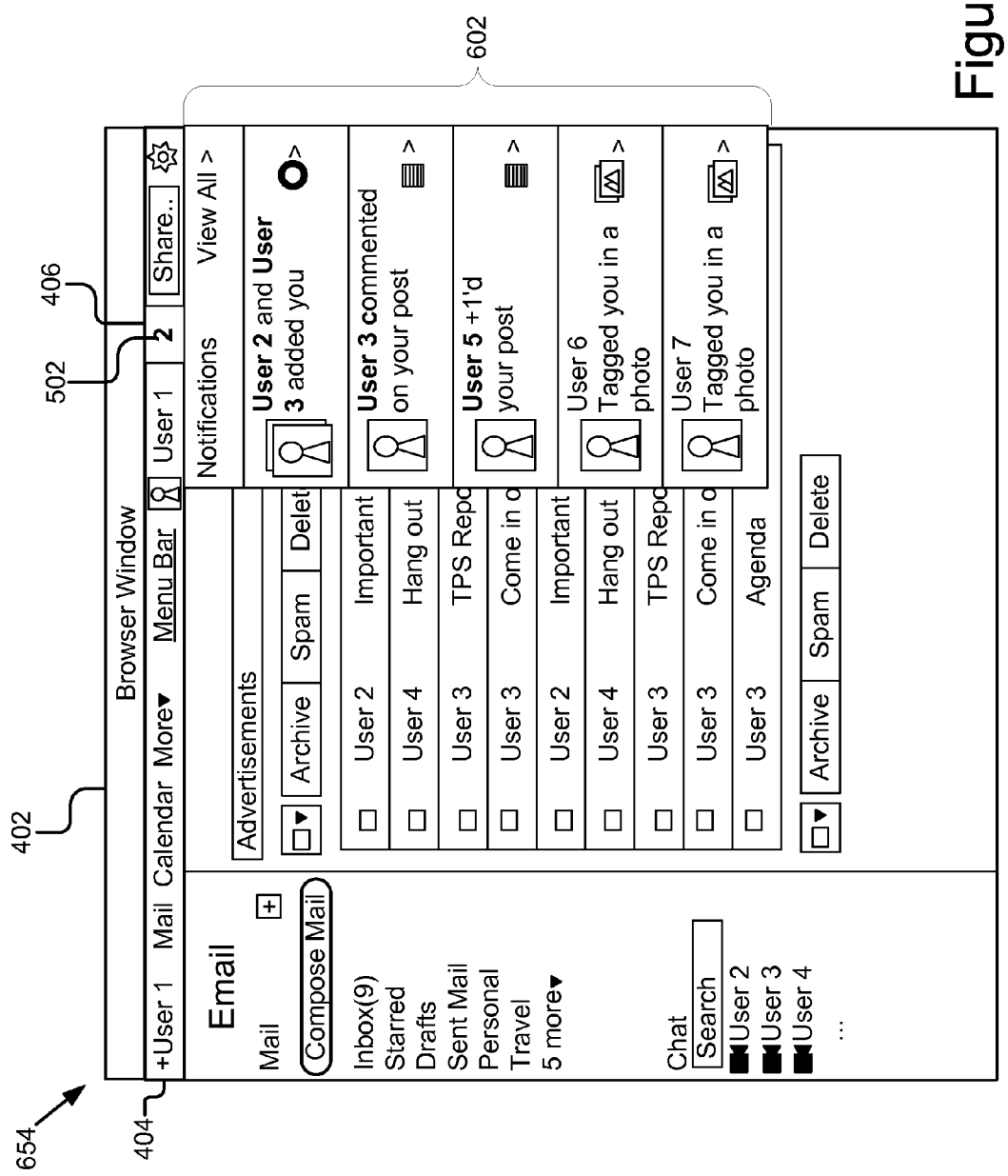

Referring now to FIG. 6D, another implementation of the list view user interface 654 over an e-mail client is shown.

Figure 6E:
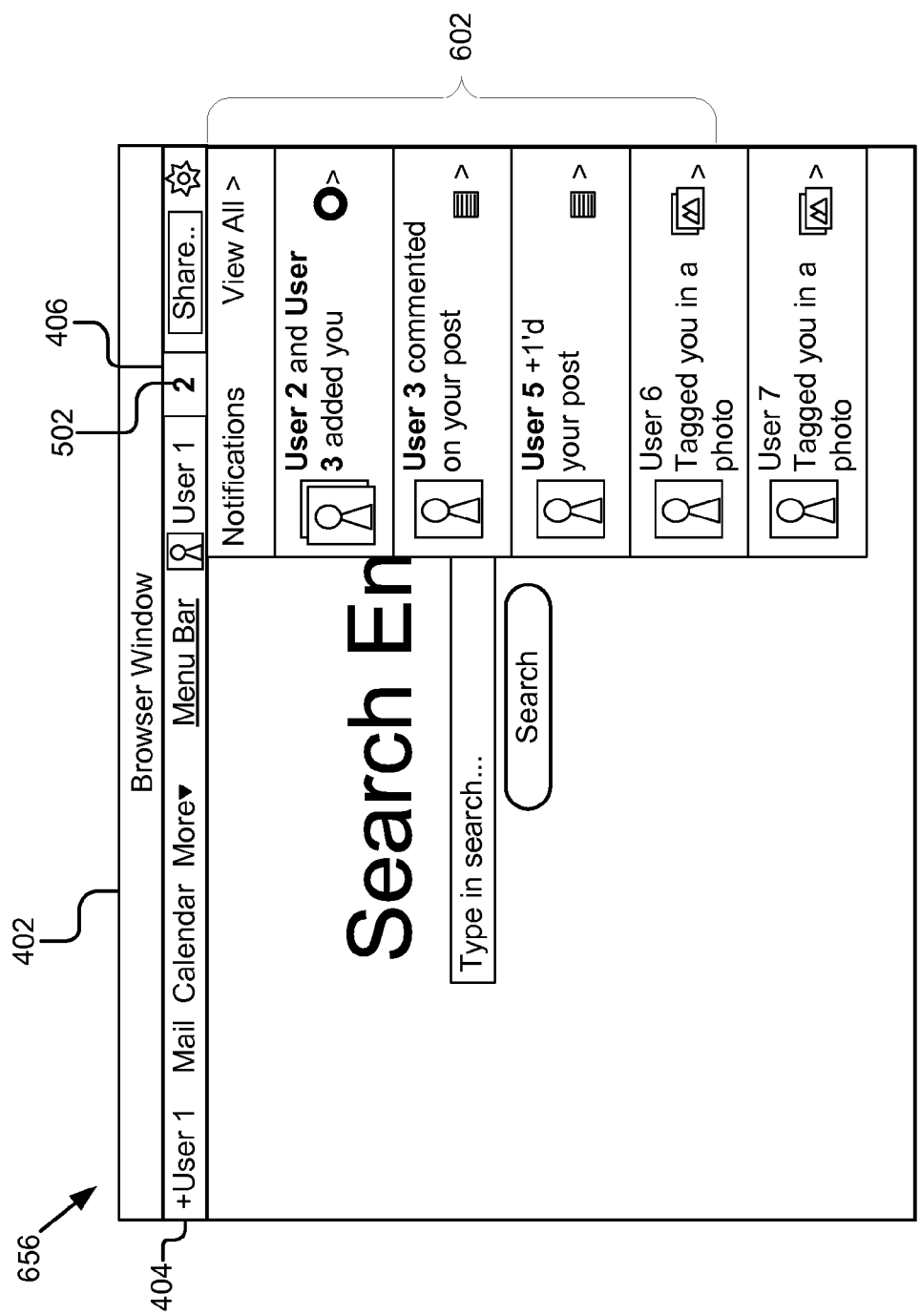

Referring now to FIG. 6E, another implementation of the list view user interface 656 over a landing a page of a search engine is shown.

Figure 6F:
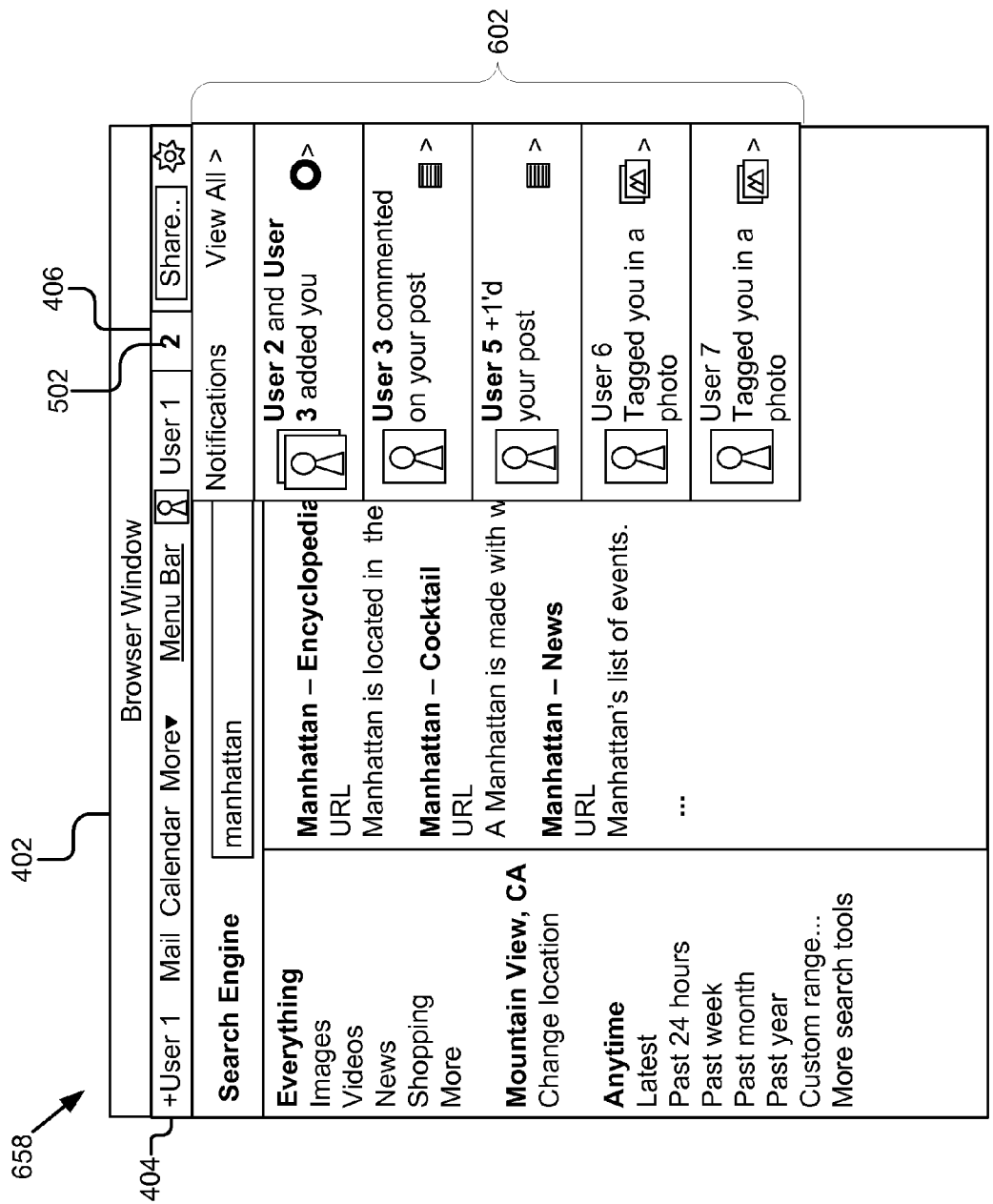

Referring now to FIG. 6F, another implementation of the list view user interface 658 over a web page showing search results is shown.

Referring now to FIG. 7A, some implementations of a user interface 700 for presenting detailed notification information according to the present disclosure is shown. The notification button 406 can be included on a header bar that is present across multiple systems and has been described above with reference to FIG. 5. The user interface 700 of FIG. 7A is presented after a transition from user interface 600 of FIG. 6A. The user interface 700 replaces the notification item list 602 with a detailed notifications and action window 702. Depending on the type of notification, the detailed notifications and action window 702 will present: 1) more detailed information specific to the type of notification; 2) users related to the notification; and 3) links or buttons to actions that can be taken in response to the notification. For example, if the notification is about a social network, the window 702 will include the information that was posted, who posted it, other users that viewed it and a button posting a reply. Similarly, if the notification is about a photo, the full photo will be displayed in the window 702. More detailed information specific to the type of notification may be customized to be based upon the additional detail that is retrievable from the notification sources 160. One example of types of notifications includes: posts in a social network, photo sharing and social network, friending in a social network, other actions in a social network, e-mail notifications, instant message notifications, text messaging notifications, SMS notifications, calendar notifications, etc. As has been noted above, depending on the type of notification, different actions may be performed. For example, if the type of notification is a post in a social network, possible actions include commenting on the post, reposting the post, calling out the post, etc. Similarly, if the type of the notification is a photo in a social network, the possible actions include sharing the photo with others, tagging the photo, requesting removal of the photo, etc. The detailed notifications and action window 702 includes links, buttons or fields to input information and instructions to perform responses or actions. Furthermore, it should be understood that the detailed notifications and action window 702 includes any number of additional links to other users related to the notification, links to users that matter to the user, a link to comments since the user's last post, a link to retrieve similar notifications based on topic or type, a link to posts related to the notification, a link to similar material, etc.

Referring now to FIGS. 7B-7I, additional implementations of the user interface 750-770 for presenting detailed information about notifications and interactions with other different types of notification sources 160 are shown. The notification system 100 is particularly advantageous because it allows the user to take actions with regard to any of the notification sources 160 without having to open additional windows or tabs or transition to other applications. From the web browser 150, and using the interface of FIG. 7B-7I, the user can take action with regard to any type of messaging. For example, regardless of whether the user is interacting with any e-mail program, calendar program, a social network, a document program or Internet search program, the user can take action with regard to notifications from those systems using the standard interface shown in FIGS. 7B-7I.

Figure 7B:
Figure 7D:
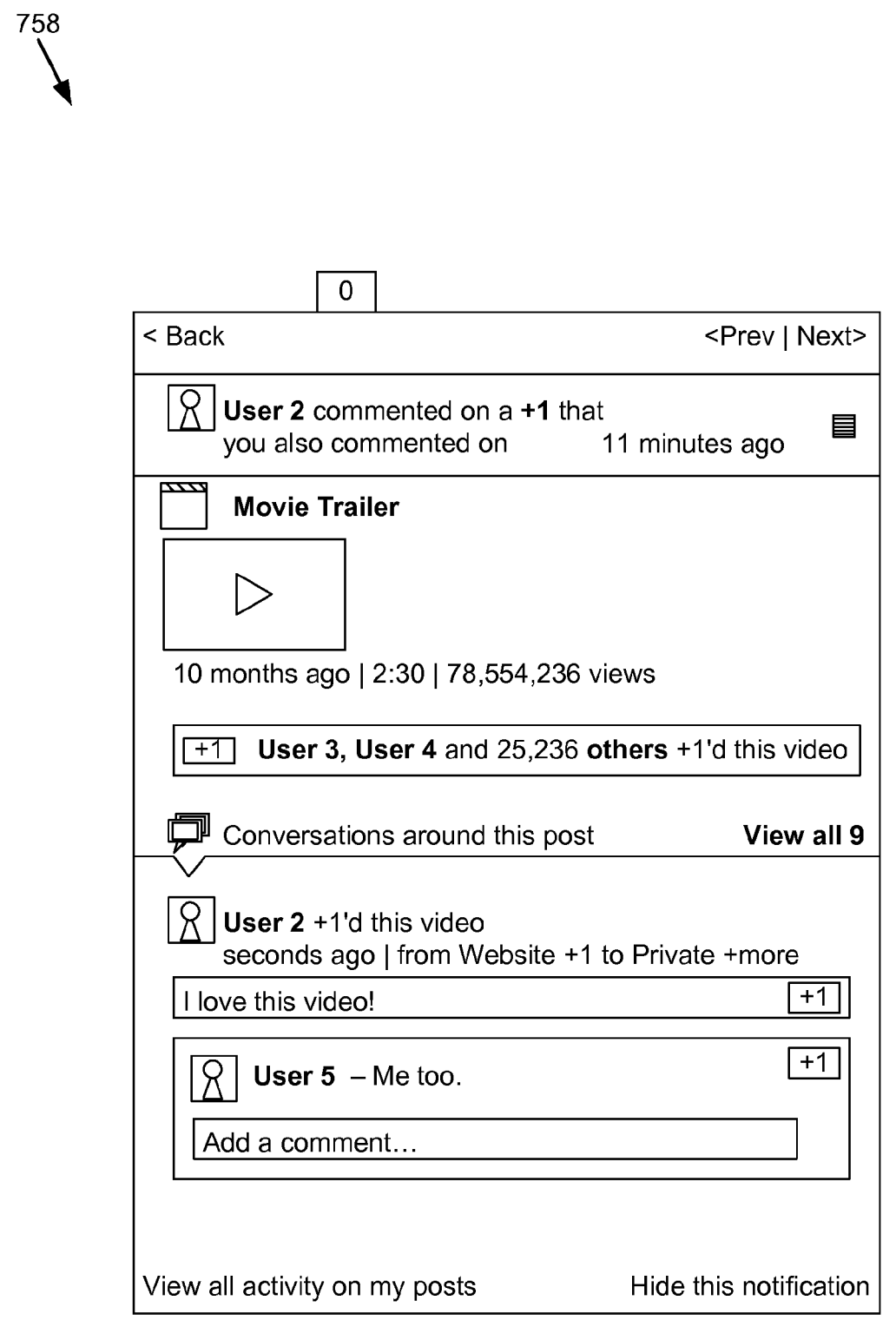

FIGS. 7B-7D show additional implementations of user interfaces 750-758 for presenting detailed information. It should be noted that each user interfaces 750-758 has a different format depending on the type of notification and a different set of actions that can be taken directly from the detailed view.

Figure 7E:
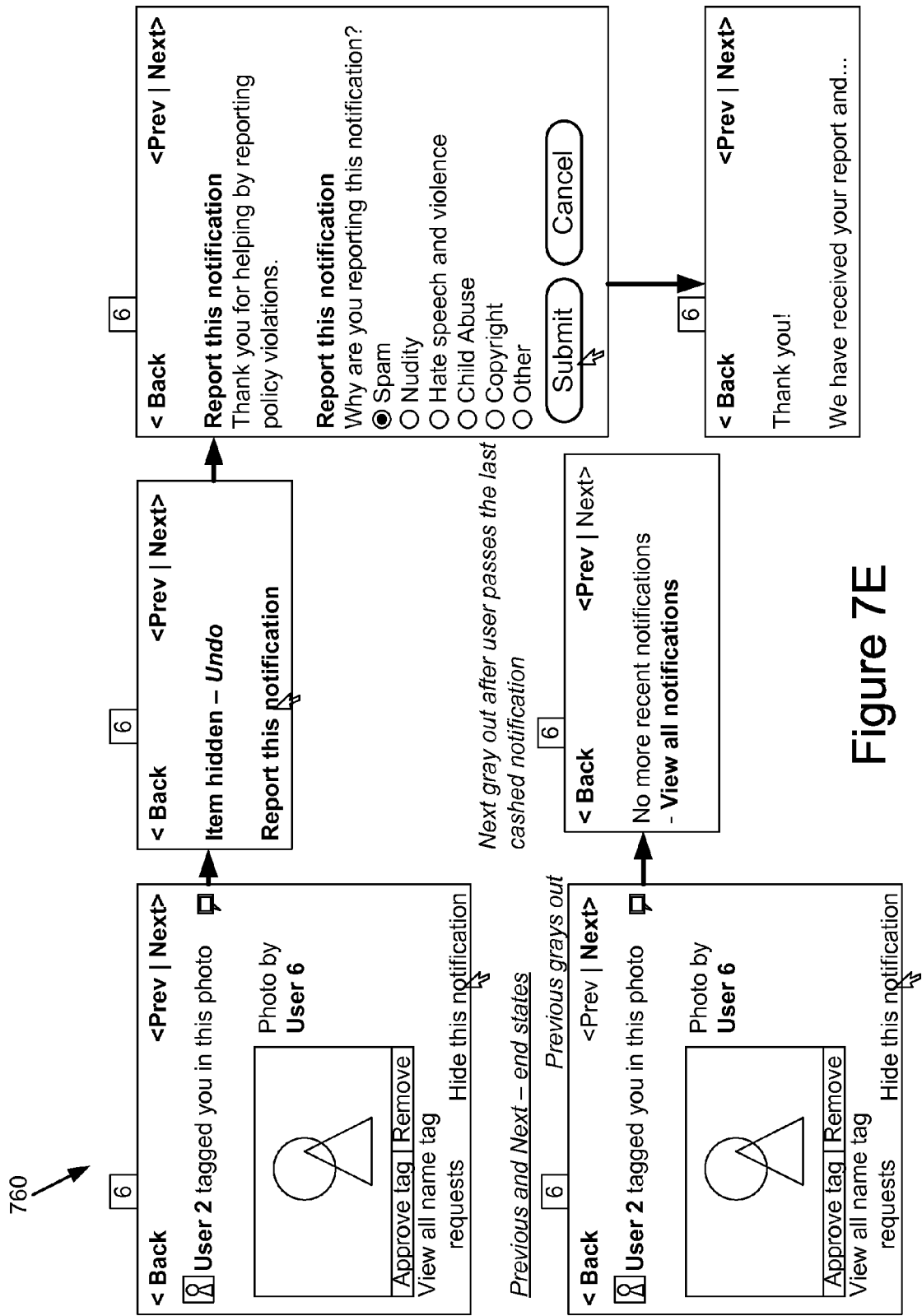

FIG. 7E shows an implementation of a user interface 760 that shows the detailed views when the user wants to report abuse or hide a notification.

Figure 7F:
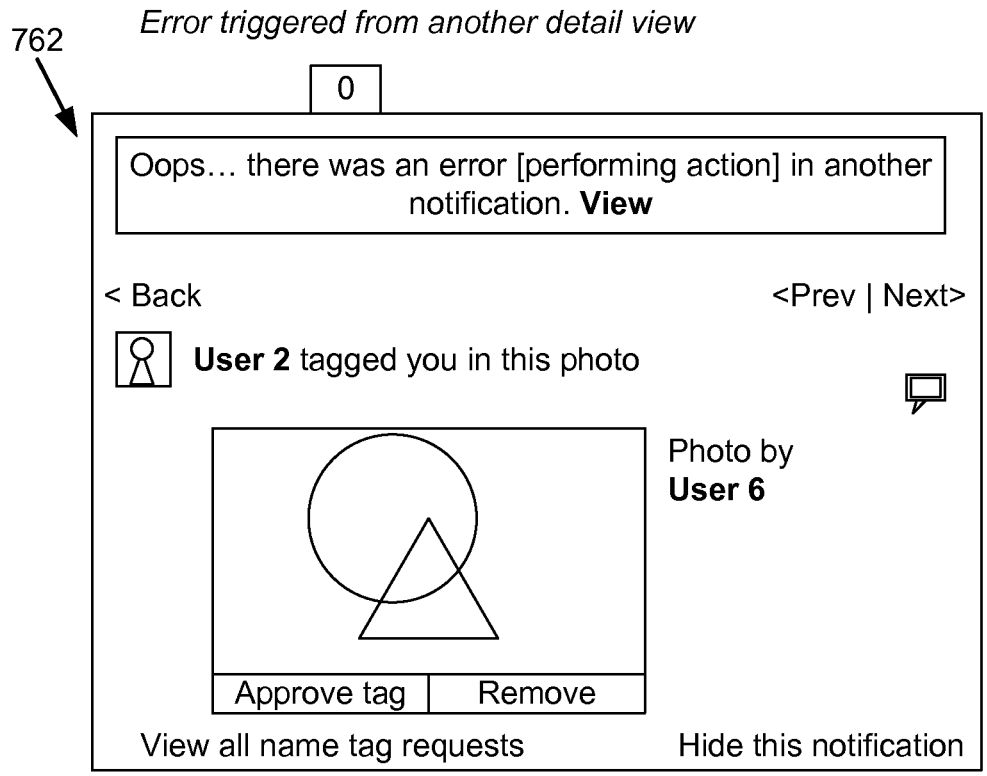
Figure 7G:
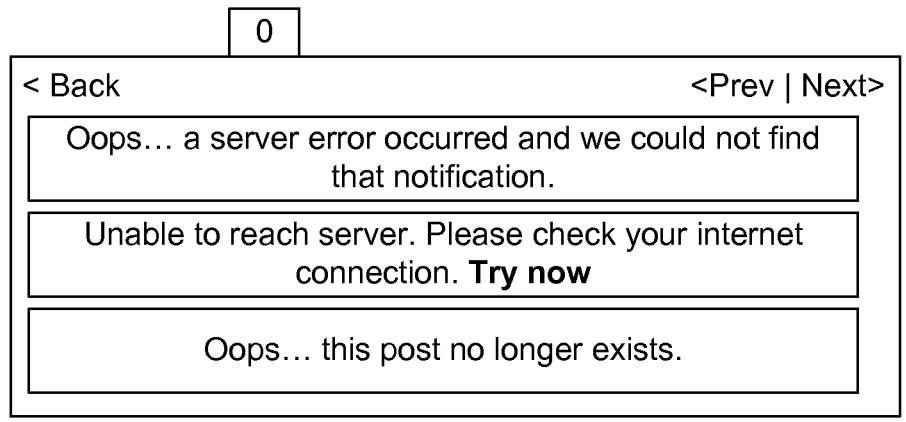
Figure 7G:
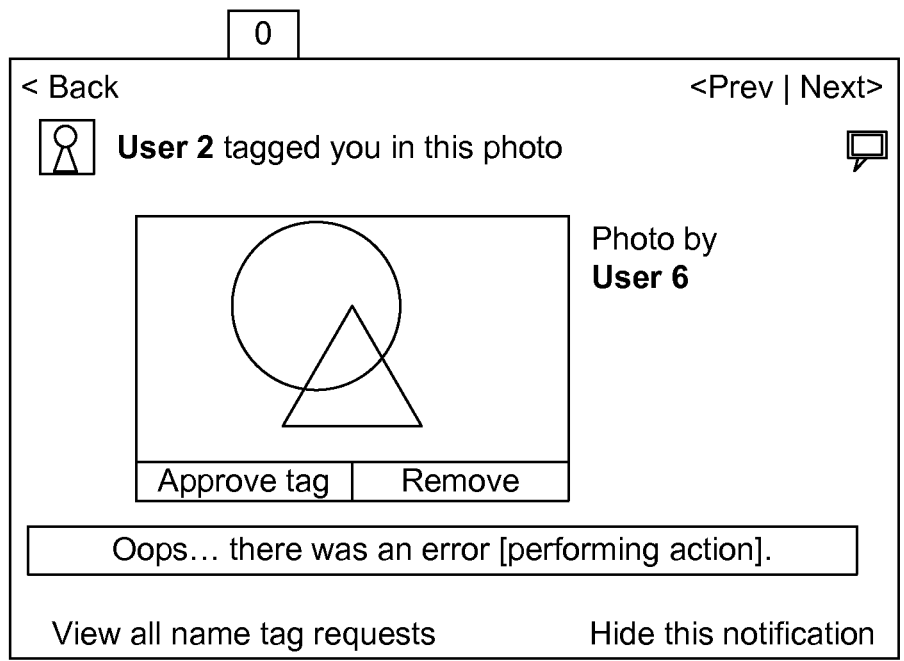

FIGS. 7F and 7G show example detailed view user interfaces 762, 764, 766 for cases where the action selected by the user is not possible and results in an error condition.

Figure 7H:
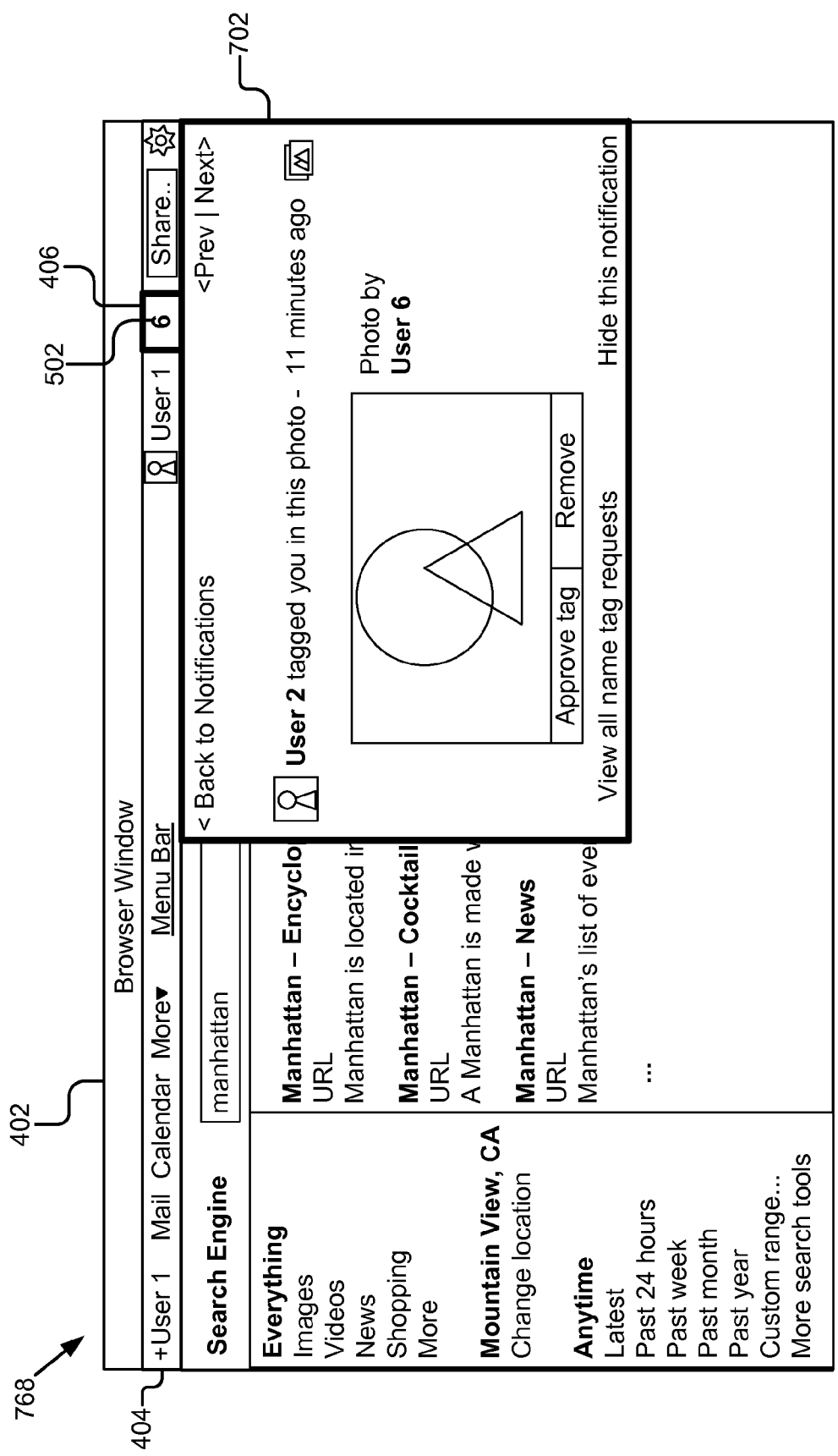
Figure 7I:
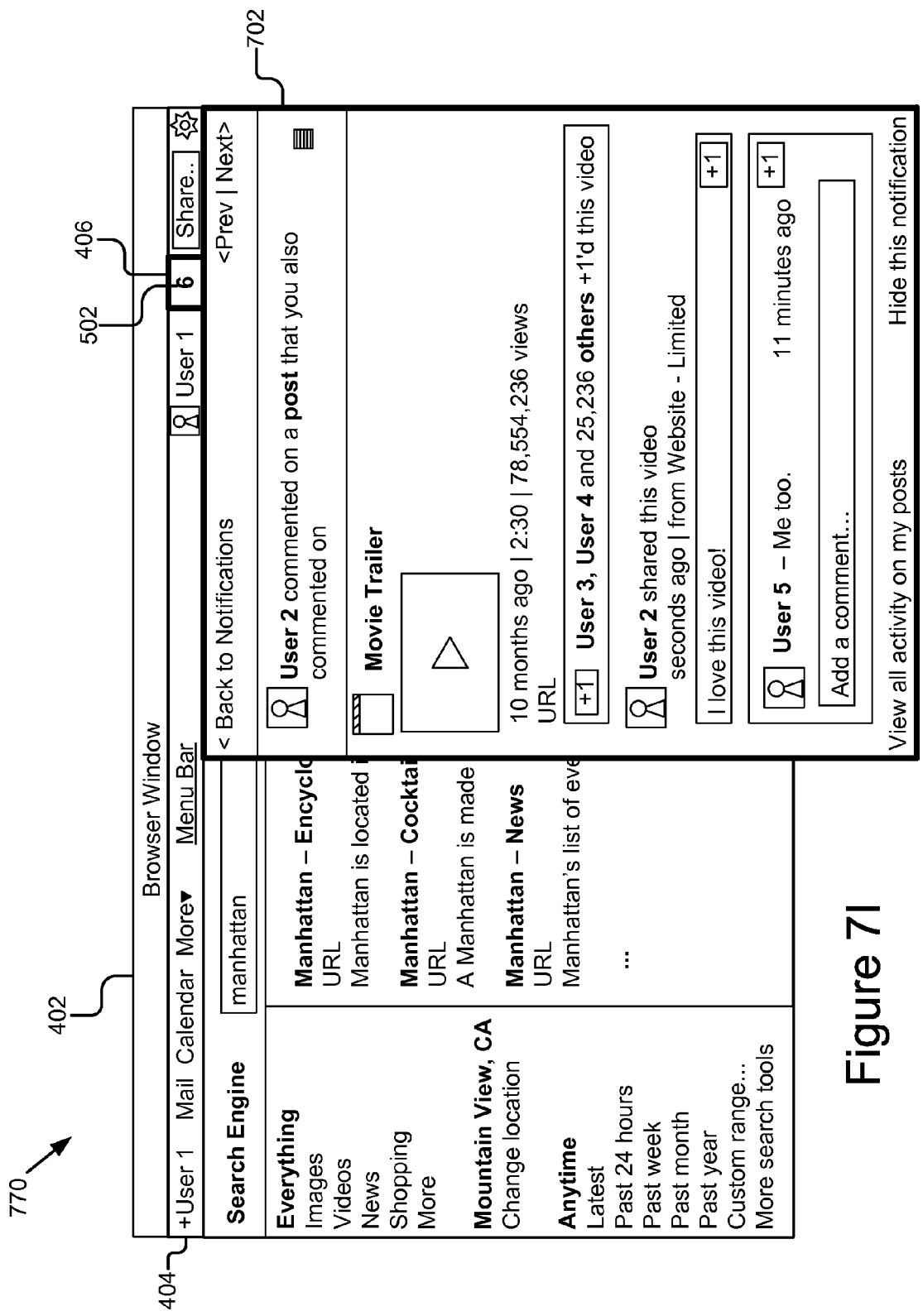

FIGS. 7H and 7I show example different detailed view user interfaces 768, 770 for different types of notifications over search results presented by a search engine.

Figure 8A:
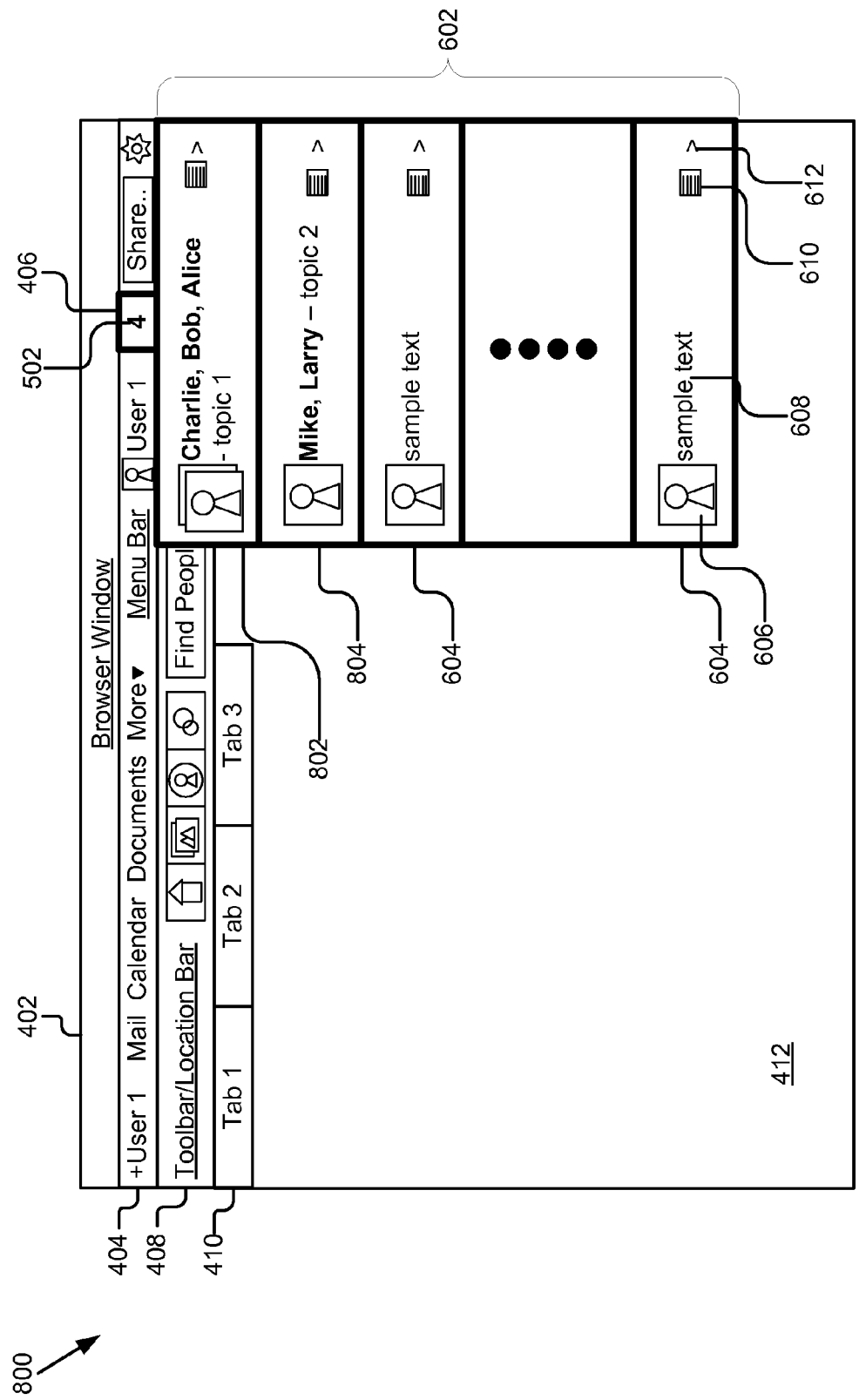
FIGS. 8A and 8B are graphic representations of example user interfaces for presenting notification lists at different times and with different emphasis.
Figure 8B:
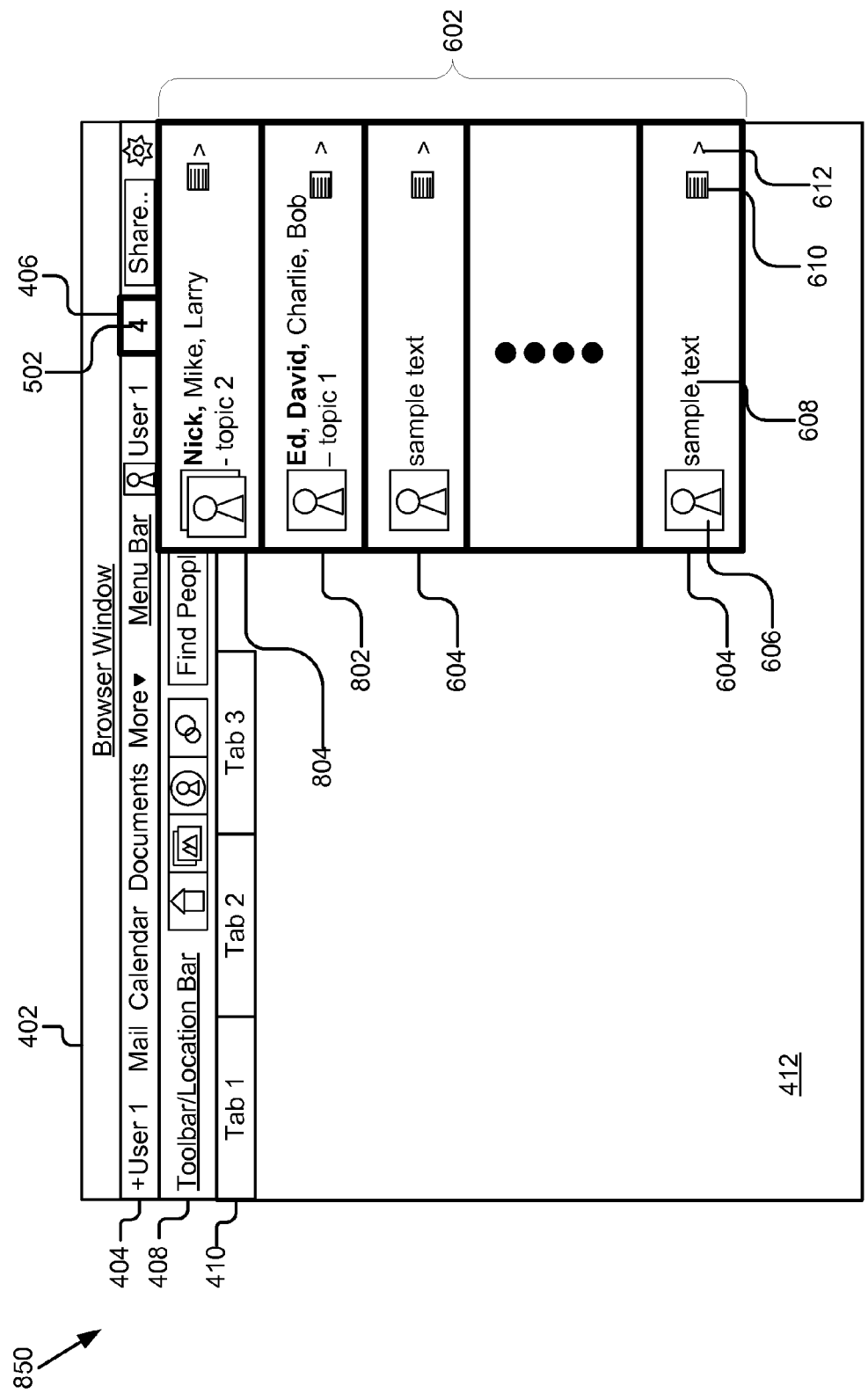

Referring now to FIGS. 8A and 8B, the user interface 800 and 850 for presenting notification item lists 602 at different times and with different emphasis according to the present disclosure will be described. FIG. 8A shows the user interface 800 with four unread notifications, including a first notification 802 indicating that other users Charlie, Bob and Alice have commented on a post on topic 1; a second notification 804 indicating that other users Mike and Larry have commented on a post on topic 2; and two other notifications 604. The user accessible notification item list 602 is shown FIG. 8A with the first notification 802 and the second notification 804 in bold or other visually distinct presentation to indicate the messages are unread. When the user accessible notification item list 602 is presented to the user, the system 100 changes the status of the notifications to read. Some time elapses and additional notifications are received and the notification button 406 is updated. At some later time, the user selects the notification button 406 and the notification item list 602 is presented in user interface 850 as shown in FIG. 8B. FIG. 8B shows the user interface 850 with four unread notifications, including the second notification 804 indicating that other users Nick, Mike and Larry have commented on a post on topic 2, the first notification 802 indicates that other users Ed, David and Charlie have commented on a post on topic 1; and two other notifications 604. By comparing the differences between the user interface 800 of FIG. 8A and the user interface 850 of FIG. 8B, a number of novel features of the present disclosure are shown. First, the order of the first and second notifications 802 and 804 in the notification item list 602 is reversed as reflected by a change in the importance or recentness of the notifications 802 and 804. Thus, the system 100 presents the message notifications in order from top to bottom based on likely relevance or importance to the user. Second, the names of other users associated with notifications are modified. Comparing the second notification 804 from FIG. 8A to FIG. 8B illustrates that not only does the notification item indicate the number of notifications that have been grouped but also highlights the names of users in bold indicating that the notifications from the users with their names in bold have not been read. For example in FIG. 8A, the second notification 804 is related to two posts from Mike and Larry on topic 2, neither of which has been reviewed by the user. However, sometime later as shown in FIG. 8B, the second notification 804 has the highest priority ranking as it is at the top of the notification item list 602, and also indicates that the user Nick has posted a response which has not been reviewed by the user since Nick's name is in bold. Also since the user already reviewed the second notification 804 from Mike and Larry when the interface of FIG. 8A was displayed to the user, the names of Mike and Larry are no longer in bold in the second notification 804 of FIG. 8B. There is similar formatting on the first notification 802 to signal to the user which users have added new posts on topic 1. The differences between FIGS. 8A and 8B show that after the initial review of the first notification 802 additional users Ed and David have commented on topic 1 since their names are in bold in FIG. 8B. The first notification 802 also shows how only few most recent users are shown in the notification item since Alice's and Bob's names are removed from the notification in FIG. 8B. The indications of what users are related to a notification may be shown in other ways. For example, the new notifications items 604, 802 and 804 may be highlighted in a different color format from other notification items. Furthermore, rather than showing the names of users in field 608, the user's photos may be stacked in field 606 in order from the person who most recently commented to the person that originally commented on the post so that when the user hovers over the stack the photos of the different users are displayed.

Figure 9:
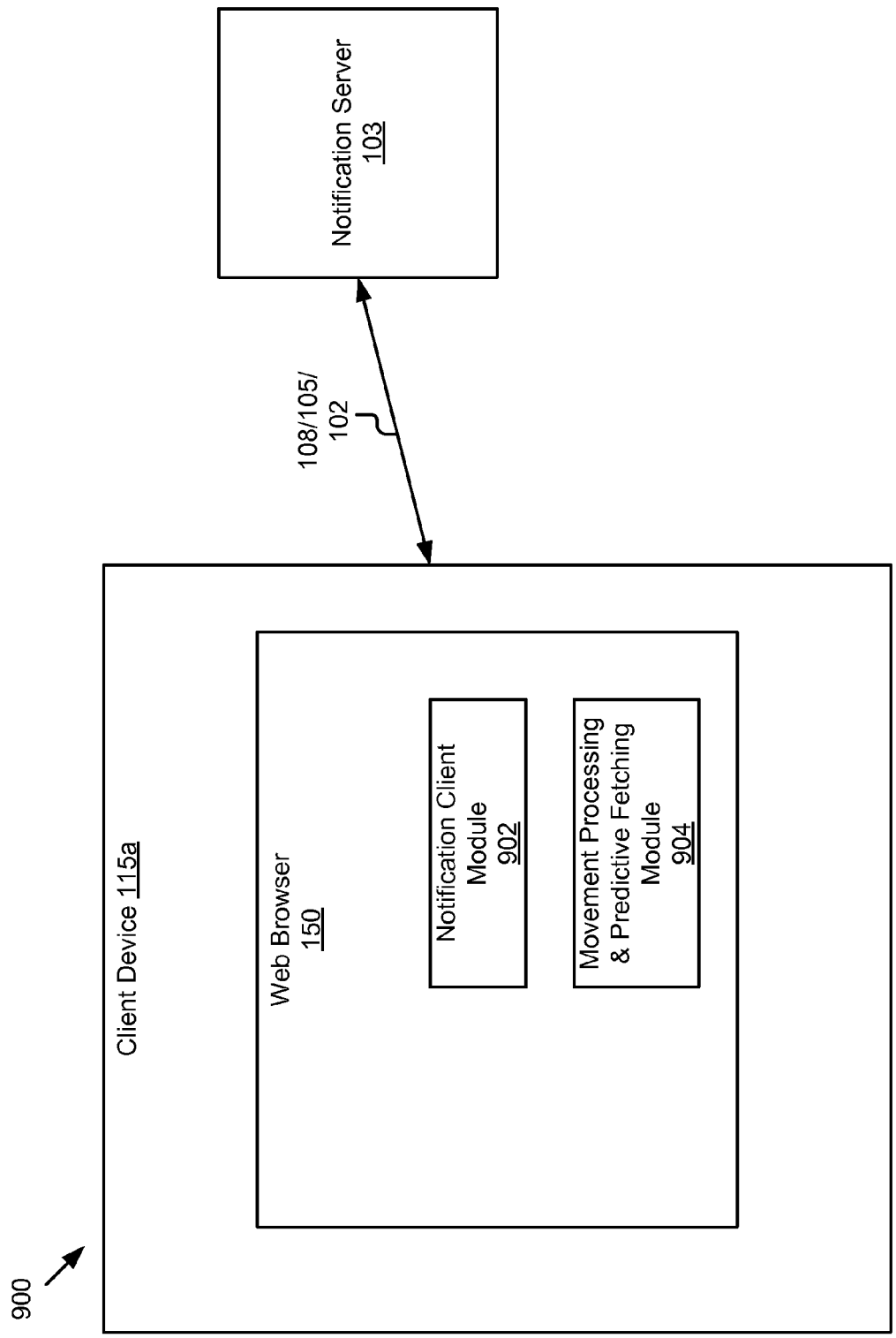
FIG. 9 is a high-level block diagram illustrating an example system for processing cursor movements for predictive fetching.

Referring now to FIG. 9, some implementations of a system 900 for processing cursor movements for predictive fetching will be described. The system 900 for processing cursor movements for predictive fetching includes the notification server 103 and the client device 115a having a web browser 150. The web browser 150 includes a notification client module 902 and a movement processing and predictive fetching module 904.

The notification server 103 can be coupled for communication and interaction with the client device 115a by signal lines 102, 108 and network 105. More specifically, the notification server 103 interacts with the notification client module 902 operable as part of the web browser 150. The movement processing and predictive fetching module 904 can be also operable as part of the web browser 150.

The notification client module 902 can be software and routines for generating and presenting the user interfaces described above with reference to FIGS. 4-8A. In particular, the notification client module 902 generates a notification button 406, the notification item list 602 and the detailed notifications and action window 702. The notification client module 902 also sends requests and commands to the notification server 103 and receives and processes information received from the notification server 103. More specifically, the notification client module 902 sends requests and commands to the request processing module 214 of the notification response server 152. The notification client module 902 also interacts with the request processing module 214 and the data formatting module 216 of the notification response server 152 to receive information that is utilized for the user interfaces that are described above. Finally, the notification client module 902 receives signals from the movement processing and predictive fetching module 904 and in response generates signals to pre-fetch data for the notification item list 602 before presenting to the user. The operation of the notification client module 902 for predictive fetching is described in more detail below with reference to FIGS. 12A and 12B.

The movement processing and predictive fetching module 904 can be software and routines for processing the movement of the cursor by the user and generating a signal to pre-fetch information necessary for the notification item list 602. The movement processing and predictive fetching module 904 is coupled to the web browser 150 and the client device 115a to detect the movement of an input device 906 by the user. In some implementations, the movement processing and predictive fetching module 904 performs the operations for detecting mouse or cursor movement as will be described below with reference to FIGS. 12A and 12B. The movement processing and predictive fetching module 904 generates a signal that is sent to the notification client module 902 to fetch information for the notification item list 602 before the notification button 406 has been selected by the user.

Figure 10:
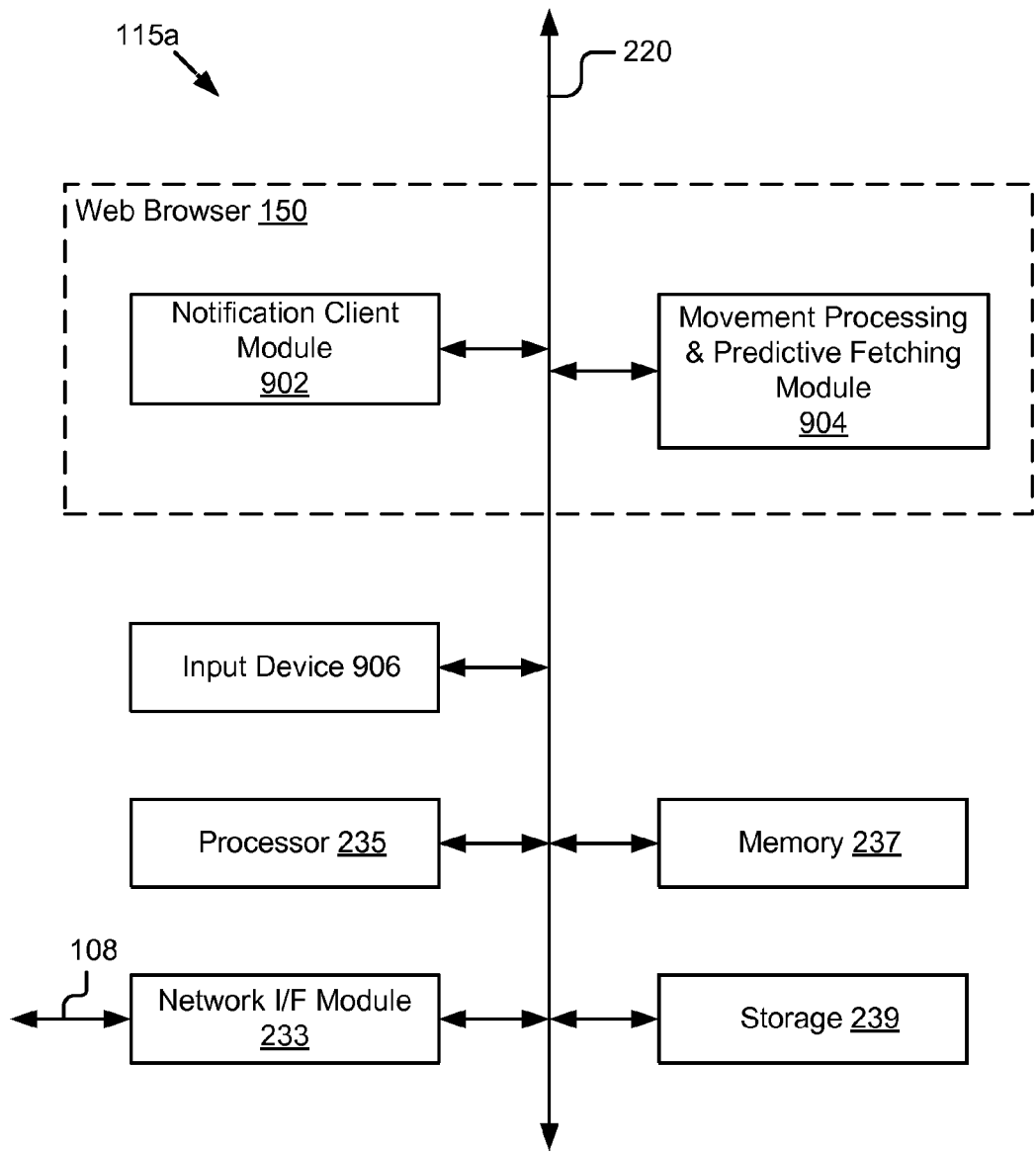
FIG. 10 is a high-level block diagram illustrating a client device including the example system for processing cursor movements for predictive fetching.

Referring now to FIG. 10, some implementations of the client device 115a including the system 900 for processing cursor movements for predictive fetching is described. This implementation of the client device 115a includes the processor 235, the memory 237, the storage 239, the network interface module 233, the input device 906 and the web browser 150. The web browser 150 further includes the notification client module 902 and the movement processing and predictive fetching module 904. These components are coupled for communication with each other and the network by the bus 220. The processor 235, the memory 237, the storage 239, the network interface module 233, the web browser 150, the notification client module 902 and the movement processing and predictive fetching module 904 have been described above so that description will not be repeated here. In some implementations, the input device 906 can be a touch screen, keyboard, keypad or input buttons. The touch screen can be any conventional touch screen, sensors, digitizing tablet or graphics pad. The keyboard can be a QWERTY keyboard, a key pad, or representations of a keyboard created on a touch screen. The input device 906 includes cursor control to communicate positional data as well as command selections to processor 235. Cursor control may include a mouse, a trackball, a stylus, a pen, a touch screen, cursor direction keys or other mechanisms to cause movement of a cursor. The input device 906 is coupled by the bus 220 for communication with the processing and predictive fetching module 904.

Figure 11A:
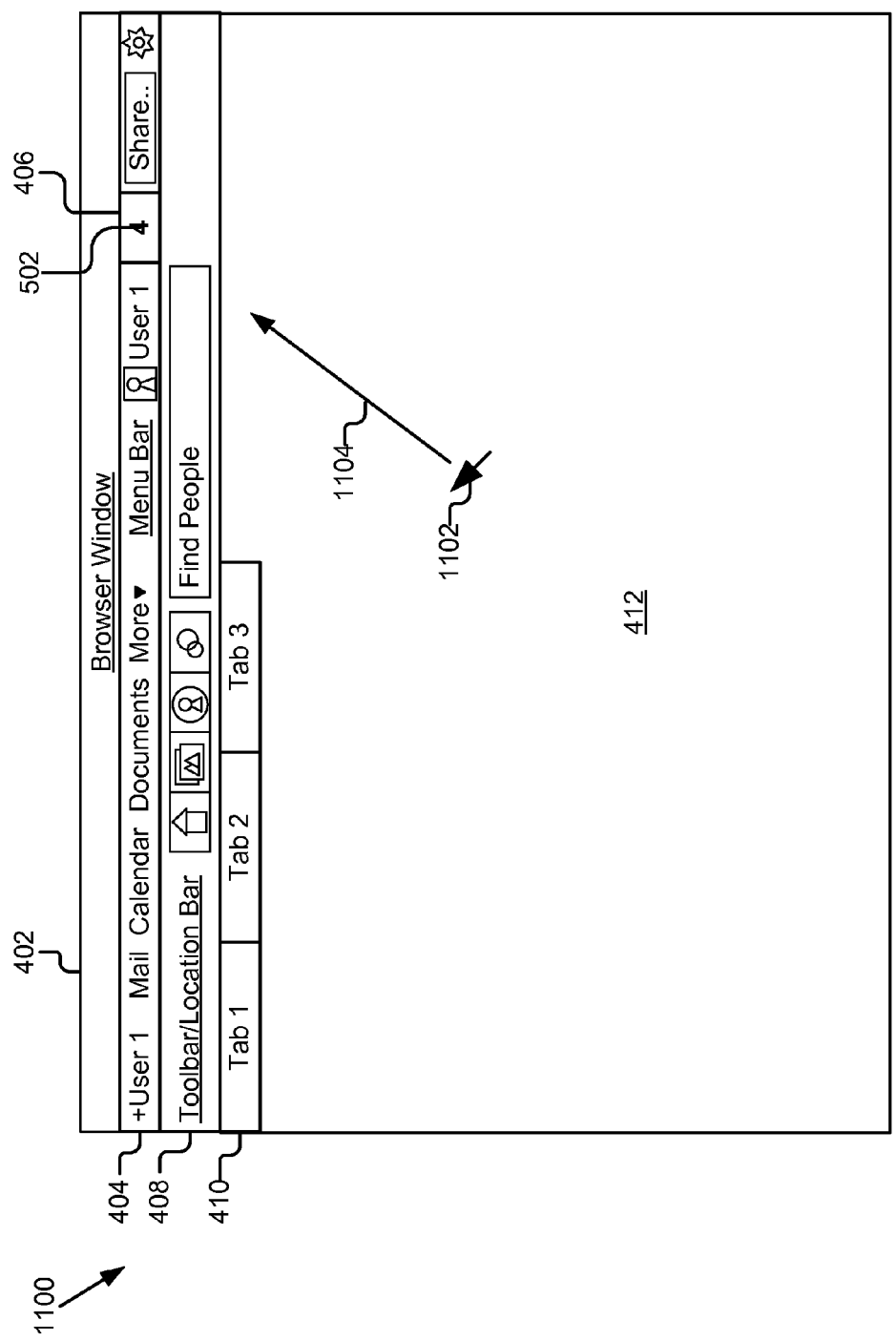
FIGS. 11A-11D are graphic representations of example user interfaces for presenting notification information at various times of different cursor movement and pre-fetching.
Figure 11B:
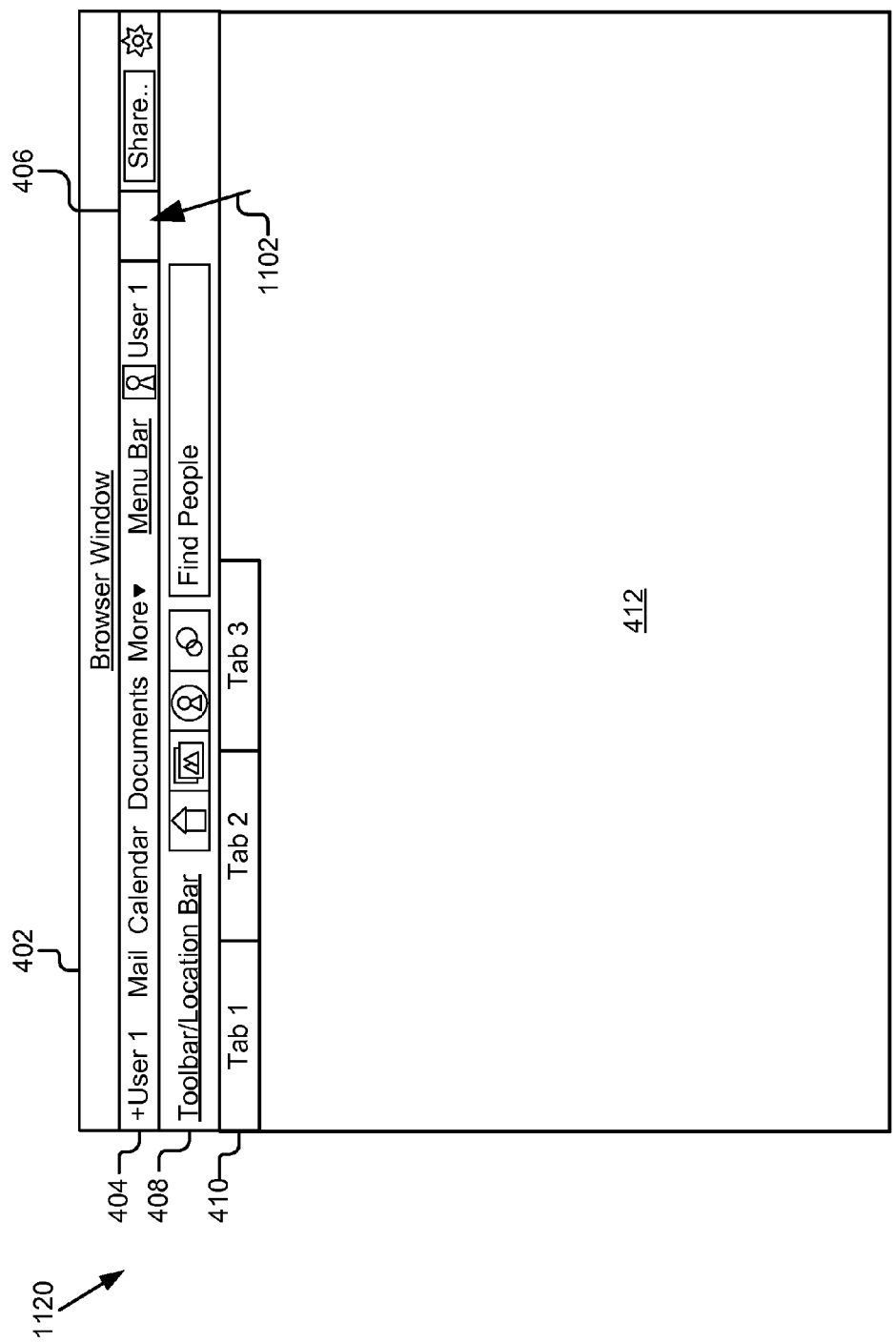
Figure 11C:
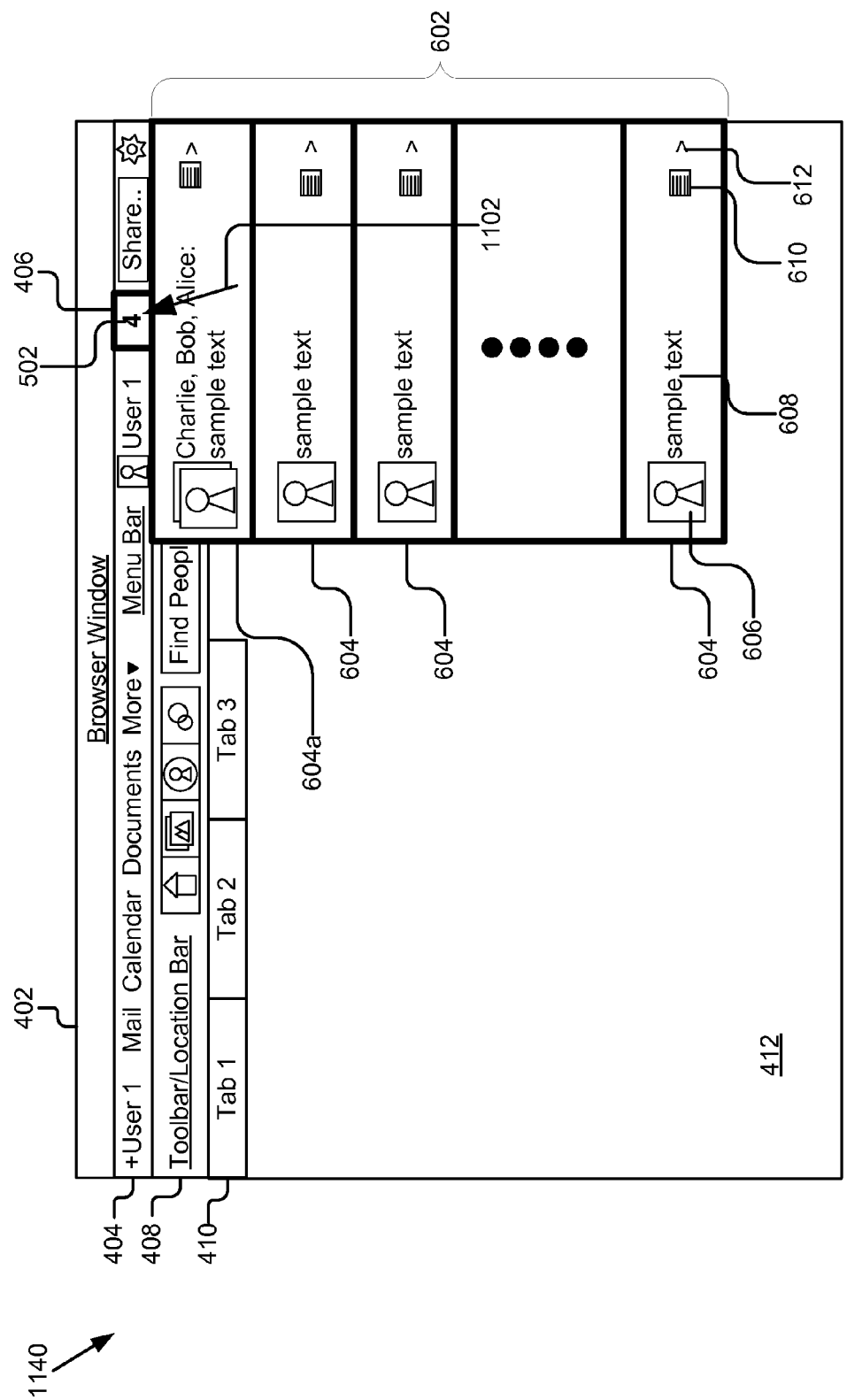
Figure 11D:
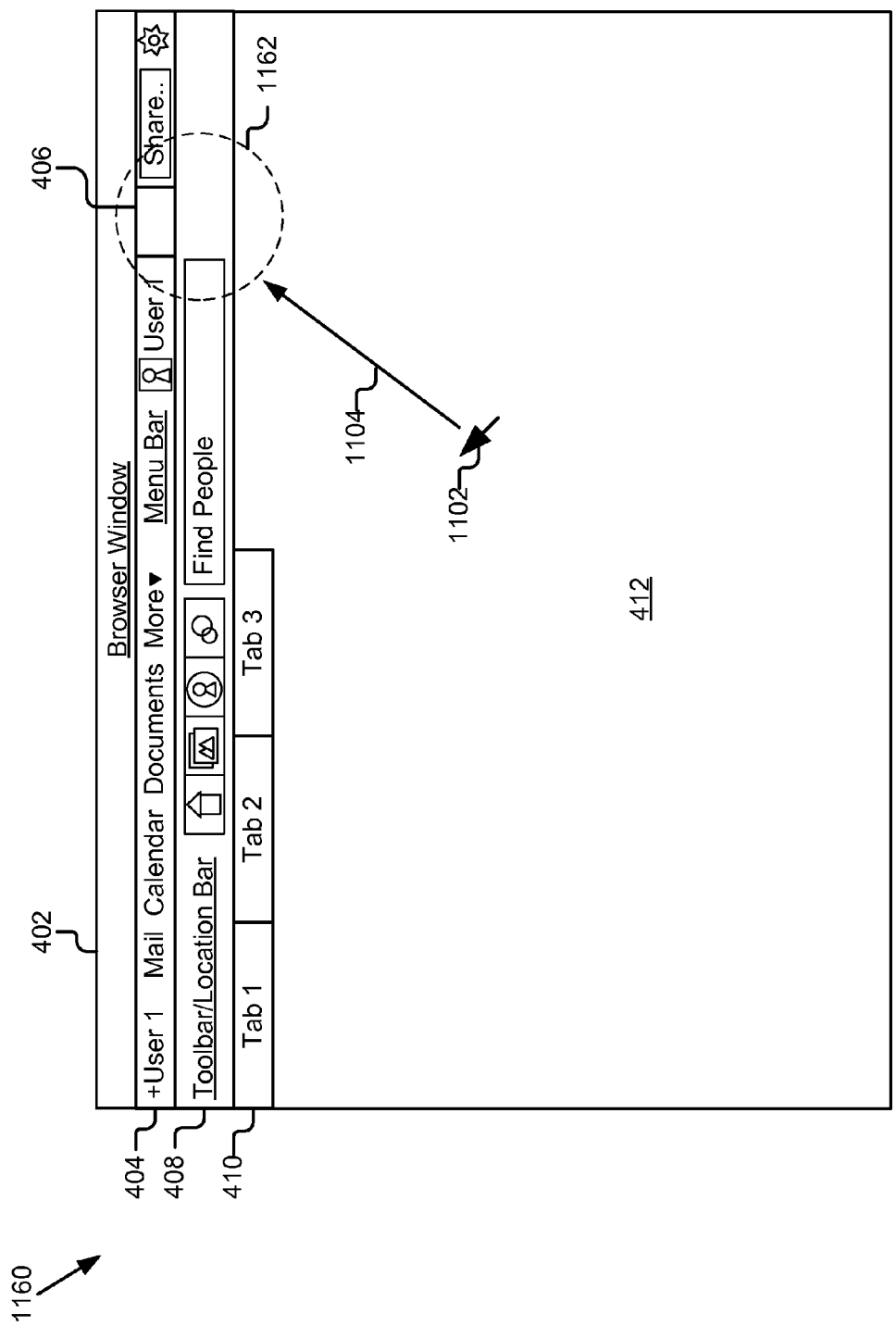

Referring now to FIGS. 11A-11D, the cursor movements and pre-fetching according to the present disclosure will be described. FIG. 11A shows some implementations of the user interface 1100 similar to that described above with reference to FIG. 5A. FIG. 11A depicts the user interface 1100 at a first point in time. When the user has an unread notification, the system 100 indicates it on the browser window 402 in the top right corner in the notification button 406. The interface includes a cursor 1102. The user is inputting signals to manipulate the cursor 1102 towards the notification button 406 as represented by line 1104. The movement processing and predictive fetching module 904 receives signals from the input device 906 and processes them as described below with reference to FIGS. 12A and 12B. FIG. 11B depicts the interface 1120 at a second point in time after the user has manipulated the cursor 1102 to a position where it is over the notification button 406. When the user clicks on the notification button 406, the system 100 updates the user interface 1140 to that shown in FIG. 11C. FIG. 11C shows the interface 1140 at a third point in time after the user selected the notification button 406 and the interface 1140 has been updated. The system 900 operates so that the interaction for the user is as close to instant as possible so the user is not left waiting for the notifications to be displayed. The system 900 processes mouse movements across the page. If movement processing and predictive fetching module 904 detects that the mouse is moving closer to the notification button 406, then it signals to the notification client module 902 to start pre-loading the data to display. That way the data will be readily rendered before the user clicks on the notification button 406. To prevent over fetching data from the notification server 103 (and overloading the server 103), the system 900 will only fetch when the unread count is not 0, and when the time since the last fetch is significant. The movement processing and predictive fetching module 904 also processes for mouse velocity to see if the user is decelerating as he gets closer to the notification button 406. Deceleration is an indication that the user will click on the notification button 406. FIG. 11D depicts the user interface 1160 at yet another point in time and considering other factors, for example, cursor position. FIG. 11D shows an area 1162 as indicated by dashed lines proximate the notification button 406 and within a predetermined distance of the notification button 406 that can also be used to determine whether to fetch data before the notification button 406 has been selected.

Figure 12A:
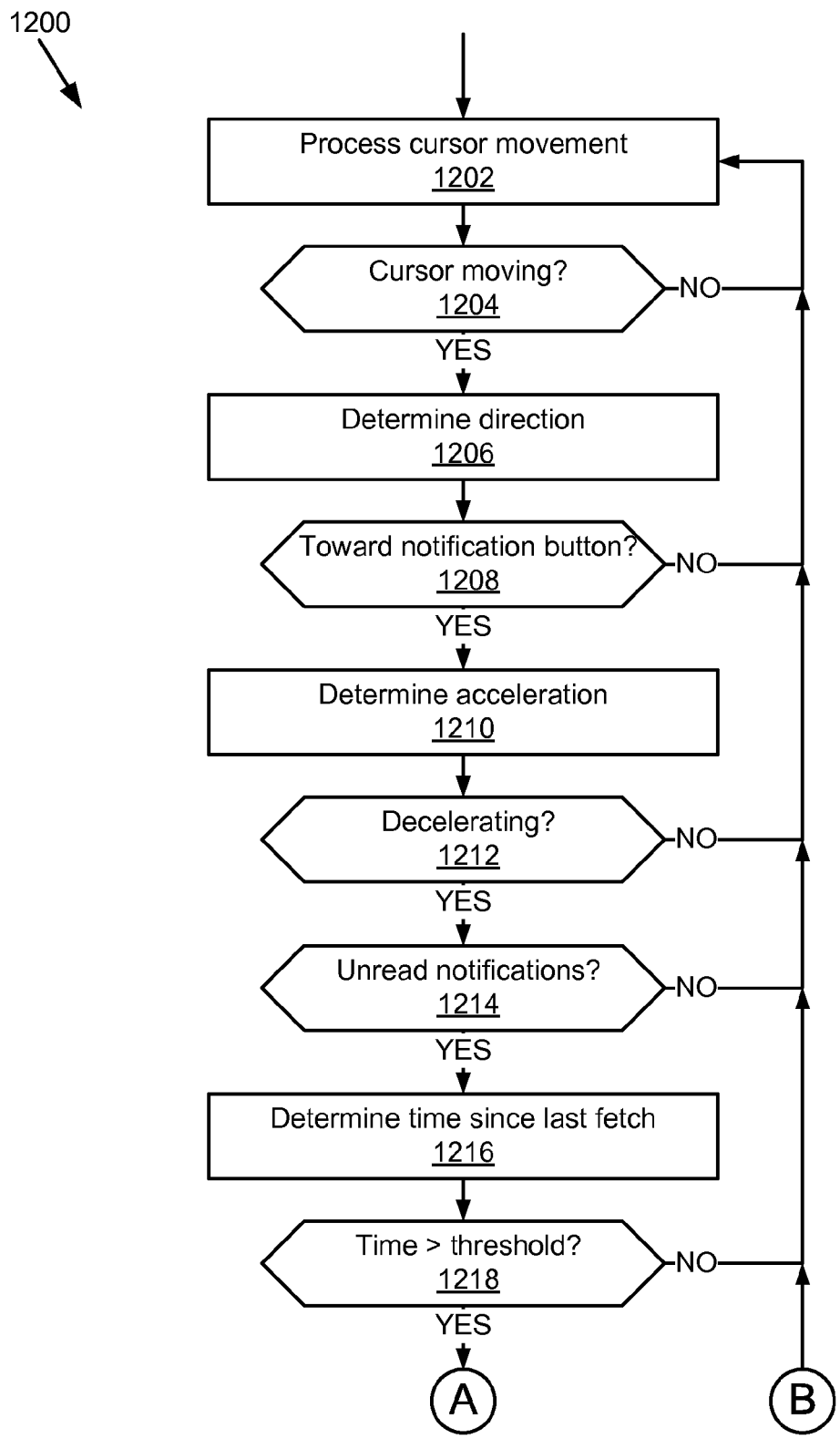
FIGS. 12A and 12B are a flowchart of an example method for processing cursor movements for predictive fetching.
Figure 12B:
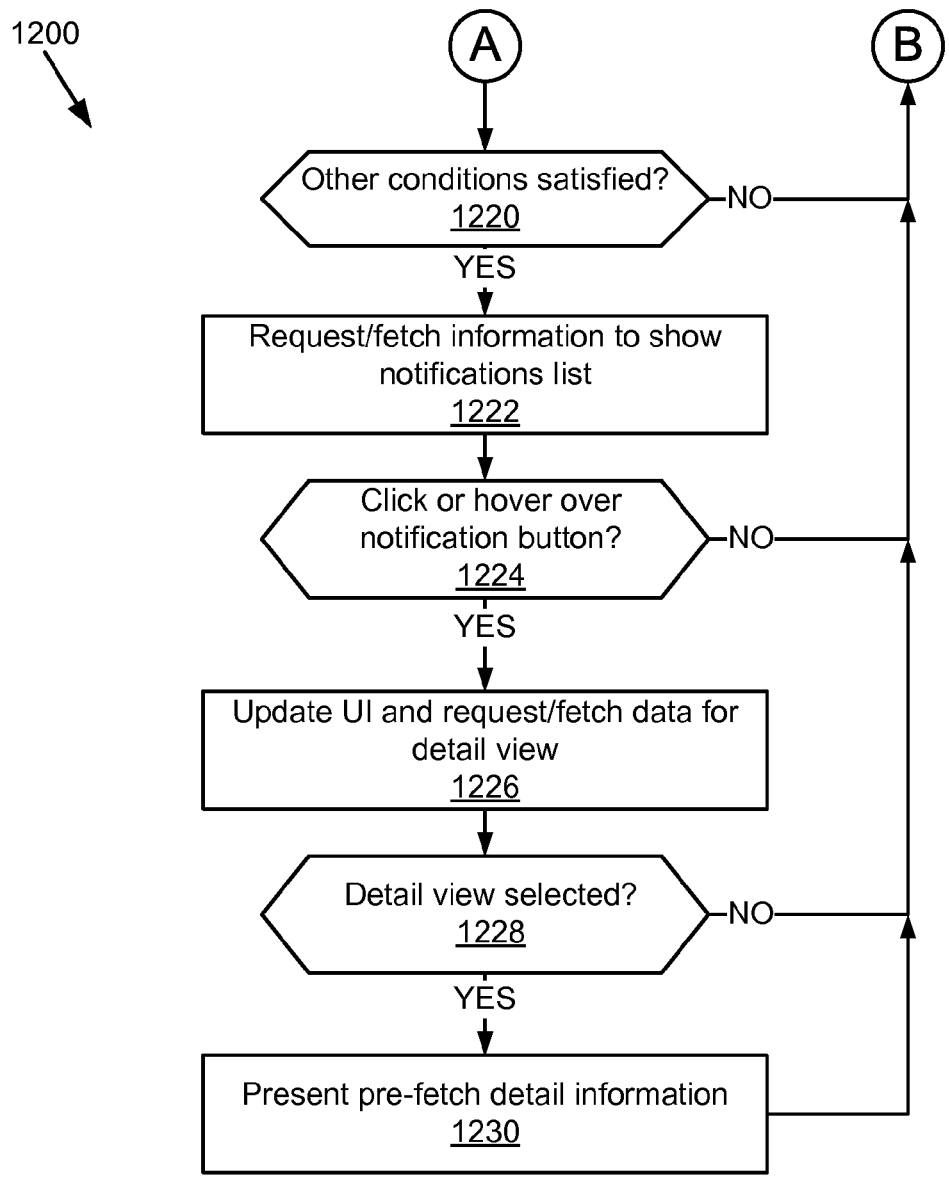

Referring now to FIGS. 12A and 12B, a method 1200 for processing cursor movements for predictive fetching is described. While the present method 1200 is described with a number of determining steps, the determining steps could be reordered in a variety of other orders without departing from the spirit and scope of the present disclosure. The method 1200 can include processing 1202 for cursor movement. For example, the movement processing and predictive fetching module 904 receives cursor movement signals from the input device 906. The method 1200 can include determining 1204 whether the cursor is moving. If not, the method 1200 returns to step 1202 and continues to process cursor movement. On the other hand, if in step 1204 it was determined that the cursor was moving, the method 1200 can determine 1206 the direction of movement. The method 1200 can include determining 1208 whether the direction of movement was toward the notification button 406. If not, the method 1200 returns to step 1202 and continues to process cursor movement. However, if the direction of movement of cursor was toward the notification button 406, the method 1200 can determine 1210 the acceleration of the cursor movement. The method 1200 can include testing 1212 whether the cursor was decelerating, since this is a good indication that the user is going to click on the notification button 406 because the method 1200 already knows the direction the cursor is traveling. Moreover, using deceleration provides the notification client module 902 with more than 100 ms to pre-fetch the notification information for the notification item list 602. If not, the method 1200 returns to step 1202 and continues to process additional cursor movements. If the cursor is decelerating, the method 1200 can include testing 1214 whether the user has any unread notifications. The notification client module 902 has information as to whether there are any unread notifications because the notification server 103 routinely updates the notification button 406 to indicate the number of unread notifications. By checking whether there are any unread notifications, the method 1200 advantageously reduces the number of requests from the notification client module 902 to the notification server 103. If there are not any unread notifications, no data is pre-fetched and a method 1200 returns to step 1202. However if there are unread notifications, the method 1200 can determine 1216 the amount of time that has elapsed since the notification item list 602 was retrieved. The method 1200 can include testing 1218 whether the amount of time since the last request to the notification server 103 is above the predefined threshold. The threshold is customizable by the system administrator. For example, the threshold may be between 10 and 45 seconds. The present method 1200 advantageously prevents too many requests for the notification information from being generated before the user has selected the notification button 406. Referring now also to FIG. 12B, the method 1200 can determine 1220 whether other conditions are satisfied. It should be understood that this step is optional for other conditions, for example, the position of the cursor. If the other conditions are not satisfied, the method 1200 returns to step 1202. If the other conditions are satisfied, the movement processing and predictive fetching module 904 generates 1222 and sends a signal to the notification client module 902 to request or fetch notification information for the notification item list 602 from the notification server 103. The method 1200 can include determining 1224 whether the user clicked or hovered over the notification button 406. If not, the method 1200 returns to step 1202 of FIG. 12A. However, if the user has selected the notification button 406, the user interface is updated 1226 to display the notification item list 602 using the pre-fetched data. The method 1200 also can request or fetch the data for the detailed notification view. The method 1200 can include determining 1228 whether the user has selected the detailed view. If not, the method 1200 returns to step 1202 otherwise the method 1200 updates the user interface and presents 1230 the pre-fetched detail notification information. After step 1230, the method 1200 returns to step 1202 to process additional input from the user.

Figure 13:
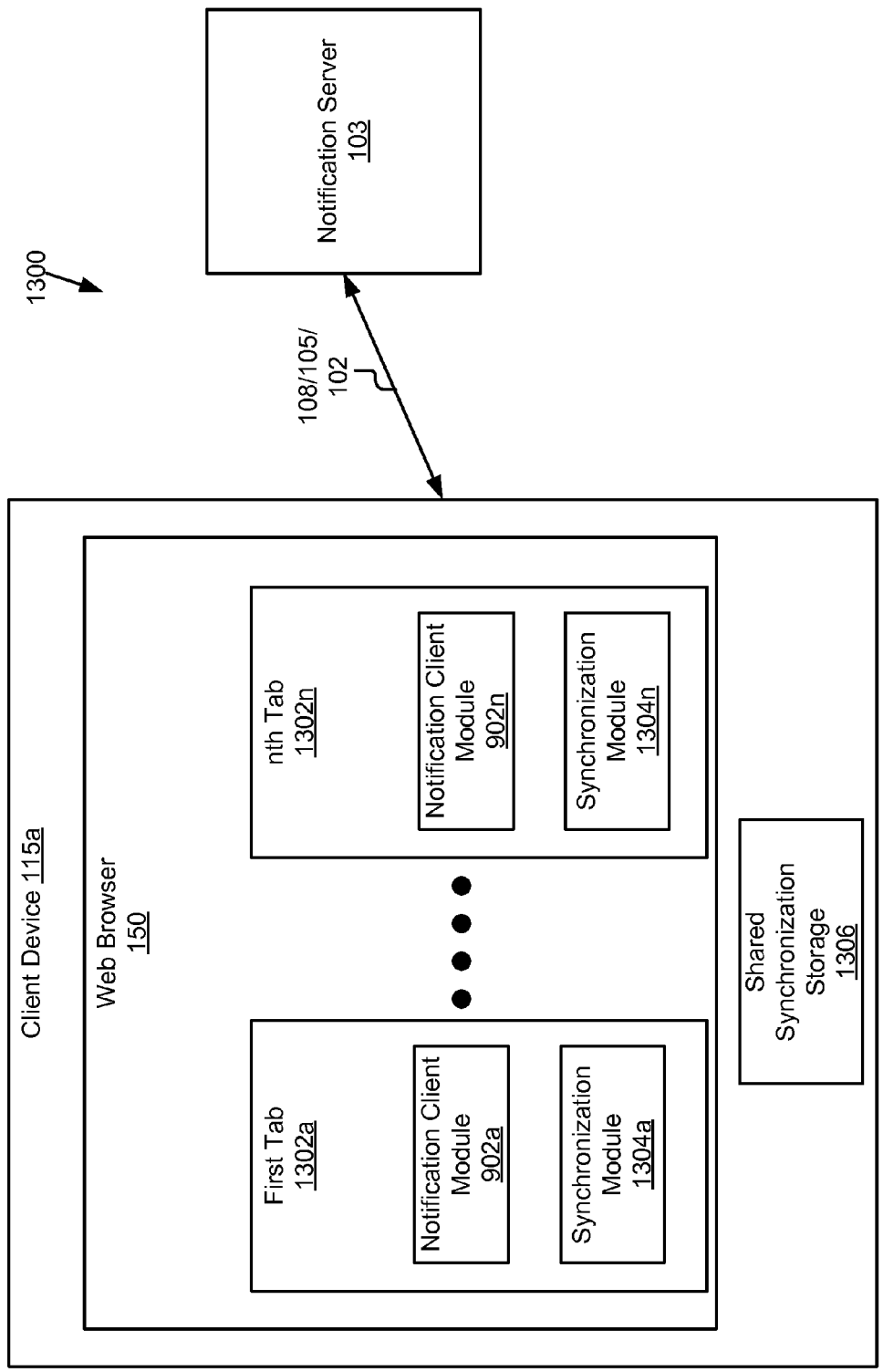
FIG. 13 is a high-level block diagram illustrating an example system for synchronizing data across multiple browser tabs or windows.

Referring now to FIG. 13, some implementations of a system 1300 for synchronizing data across multiple browser tabs or windows will be described. The system 1300 for synchronizing data across multiple browser tabs or windows includes: the notification server 103 and the client device 115a having one or more web browsers 150 and a shared synchronization storage 1306. The web browser 150 includes one or more tabs 1302a-1302n, one or more notification client modules 902a-902n and one or more synchronization modules 1304a-1304n.

The notification server 103 is coupled for communication and interaction with the client device 115a by signal lines 102, 108 and network 105. More specifically, the notification server 103 interacts with the notification client module 902 operable as part of the web browser 150. The notification server 103, the client device 115a, and the web browser 150 have been described above and they have similar functionality in the system 1300.

FIG. 13 shows some implementations for the system 1300 in which the web browser 150 has a plurality of tabs 1302a-1302n open. The tabs 1302a-1302n are part of a tabbed document interface of the web browser 150 that allows multiple documents to be contained within a single browser window. The tabs 1302a-1302n are used to navigate between different documents. As shown in FIG. 13, each of the tabs 1302a-1302n includes a corresponding notification client module 902a-902n and a synchronization module 1304a-1304n. More specifically, a first tab 1302a has a corresponding notification client module 902a and a synchronization module 1304a. Similarly, a second tab 1302n has a corresponding notification client module 902n and a synchronization module 1304n. In the implementation shown in FIG. 13, the synchronization modules 1304a-1304n cooperate with the shared synchronization storage 1306 for synchronizing notification data across multiple browser tabs. While the standardization of data across multiple browser tabs or windows is described herein in the context of synchronizing notification data, the system and methods for synchronization of data can be applied to various other information that needs to be synchronized across multiple browser tabs and windows.

The one or more notification client modules 902a-902n are configured for communication with notification server 103, a respective synchronization module 1304a-1304n and the shared synchronization storage 1306.

The one or more synchronization modules 1304a-1304n are also operable as part of the web browser 150. The one or more synchronization modules 1304a-1304n are software and routines for synchronizing notification information across multiple tabs 1302a-1302n or web browsers 150a-150n. In some implementations, the synchronization modules are implemented using JavaScript that stores notification information into HTML5 local storage. The operation of the synchronization modules 1304a-1304n is described in more detail below with reference to FIGS. 16 and 17. Each synchronization module 1304 operates in conjunction with its respective notification client module 902 to retrieve information related to notifications. In response to receipt of information from the notification server 103, the synchronization module 1304 causes that notification information to be stored in the shared synchronization storage 1306. Before requesting information from the notification server 103, the synchronization module 1304 determines whether the information is available in the shared synchronization storage 1306; and if so, retrieves the information from the shared synchronization storage 1306. If the information is not in the shared synchronization storage 1306 the synchronization module 1304 cooperates with the notification client module 902 to request information from the notification server 103. The synchronization module 1304 is coupled for communication with the corresponding communication client module 902, tab 1302, and shared synchronization storage 1306.

The shared synchronization storage 1306 can be data storage for storing information from the notification server 103, the synchronization modules 1304, and the notification client modules 902. In some implementations, the shared synchronization storage 1306 is HTML5 local storage. In some implementations, the shared synchronization storage 1306 are a series of cookies that are sent with requests back to the notification server 103. In some implementations, the shared synchronization storage 1306 is operable across different types of web browsers 150. The shared synchronization storage 1306 may be a temp file in Adobe Flash format or similar storage.

Figure 14:
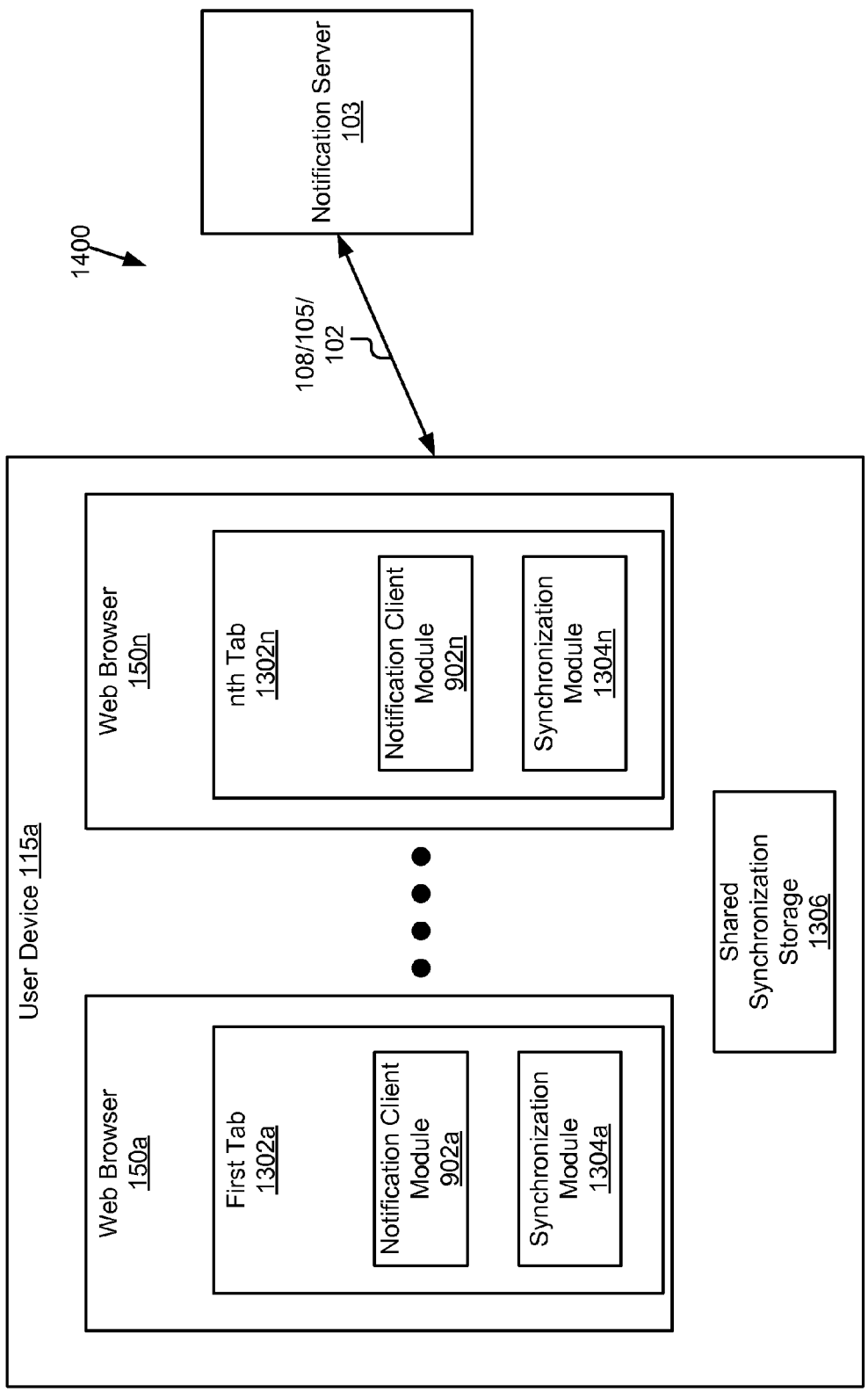
FIG. 14 is a high-level block diagram illustrating another example system for synchronizing data across multiple browser tabs or windows.

FIG. 14 shows a second implementation for the system 1400 in which the client device 115a has a plurality of web browser windows 150a-150n open. Each of the web browser windows 150a-150n has at least one tab 1302a-1302n open. More specifically, the first web browser window 150a has a first tab 1302a open. In accordance with the present disclosure, the first tab 1302a has a first notification client module 902a and a corresponding synchronization module 1304a. The second web browser window 150n has a second tab 1302n open, and the second tab 1302n has a corresponding notification client module 902n and a synchronization module 1304n. As with the prior implementation, the client device 115a includes shared synchronization storage 1306. While each web browser window 150a-150n has only a single tab 1302a-1302n open, each web browser window 150a-150n can have any number of tabs 1302a-1302n open. Furthermore, while there are only two web browser windows 150a-150n shown, the client device 115a could have any number of web browser windows open. Regardless of the number of tabs 1302a-1302n or web browser windows 150a-150n, they share the shared synchronization storage 1306. FIG. 14 is provided to illustrate how present disclosure allows information to be shared across multiple web browsers 150, multiple tabs 1302 or between any combination of tabs 1302 and web browsers 150.

Figure 15:
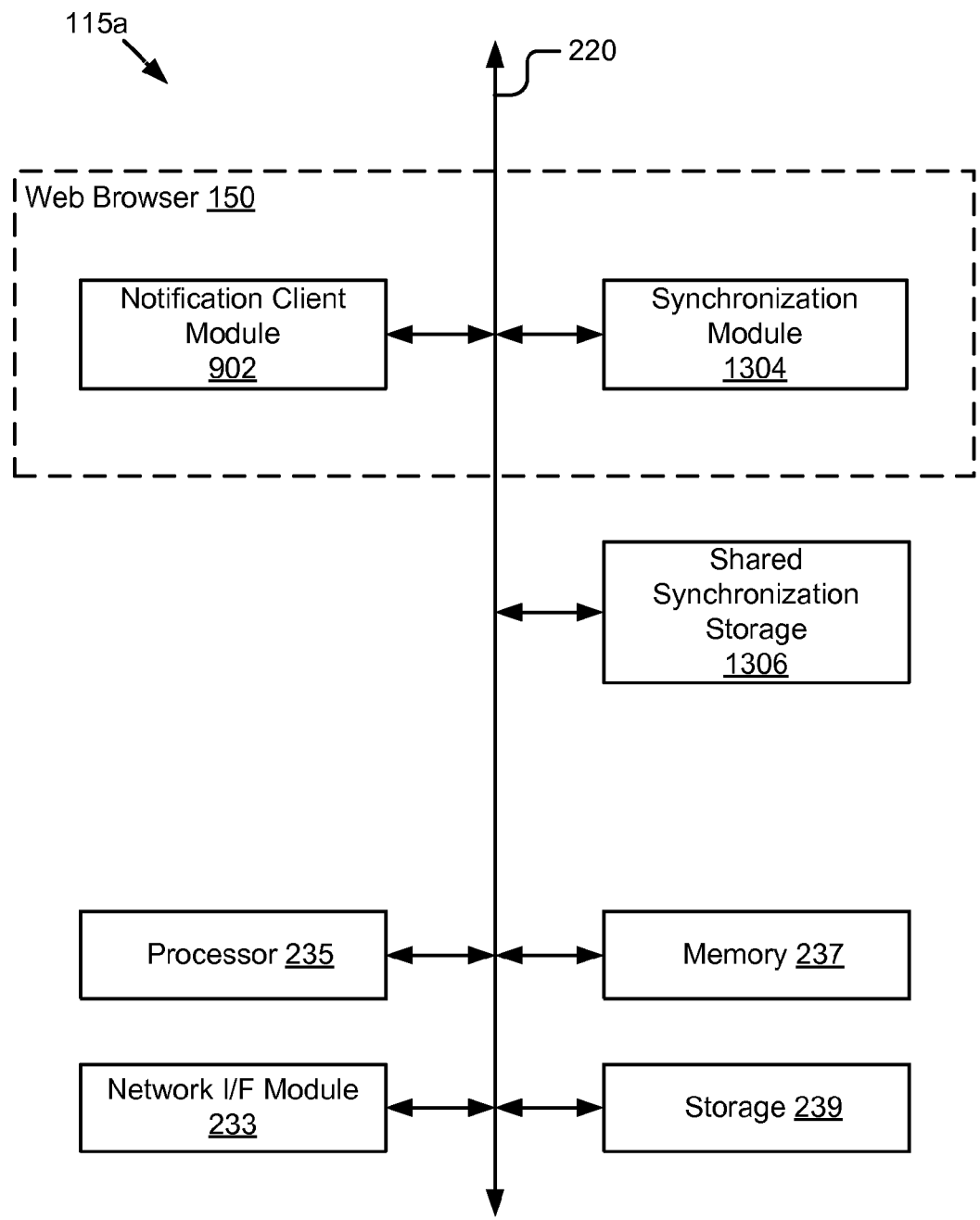
FIG. 15 is high-level block diagram illustrating a client device including an example system for synchronizing data across multiple browser tabs or windows.

Referring now to FIG. 15, some implementations of the client device 115a including the systems 1300 and 1400 for synchronizing data across multiple web browsers 150 or multiple tabs 1302 is described. This implementation of the client device 115a includes the processor 235, the memory 237, the storage 239, the network interface module 233 and the web browser 150. The web browser 150 further includes the notification client module 902 and the synchronization module 1304. The client device 115a also includes the shared synchronization storage 1306. While the shared synchronization storage 1306 is shown as a separate component in FIG. 15, in some implementations the shared synchronization storage 1306 could be a dedicated portion of memory 237 or a dedicated portion of storage 239. These components are coupled for communication with each other and the network 105 by the bus 220. The processor 235, the memory 237, the storage 239, the network interface module 233, the web browser 150, the notification client module 902, the synchronization module 1304 and the shared synchronization storage 1306 have been described above so that description will not be repeated here.

Figure 16:
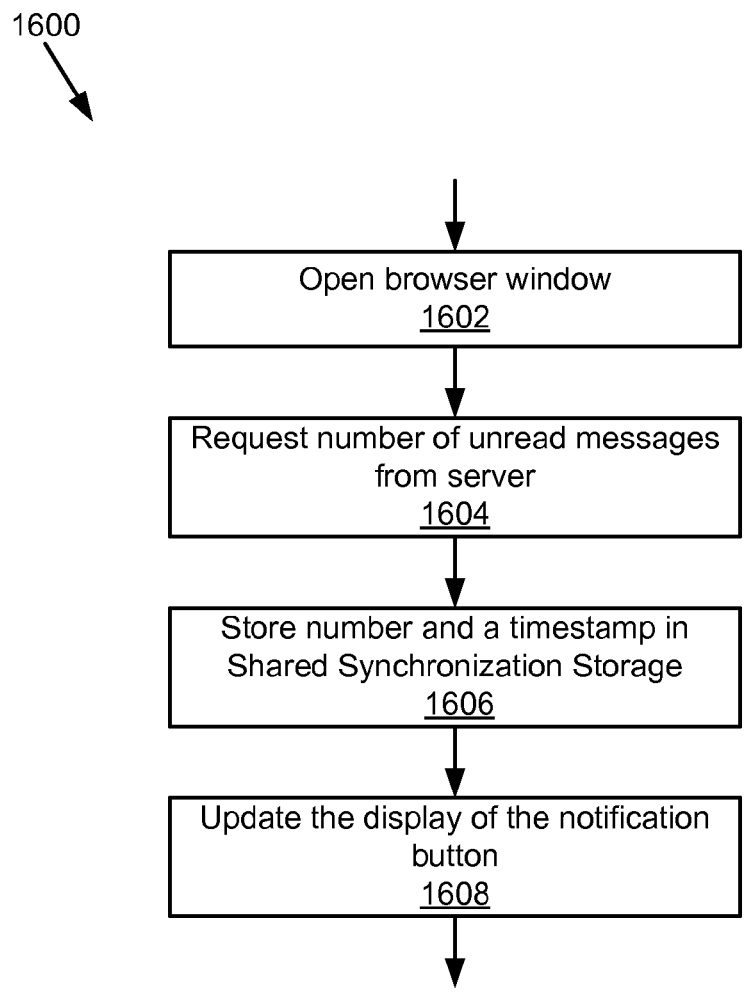
FIG. 16 is a flowchart of an example method for initializing a shared synchronization storage.

Referring now to FIG. 16, a method 1600 for initializing the shared synchronization storage 1306 according to some implementations will be described. The method 1600 can include opening 1602 a browser window including at least one tab 1302. Once browser window is open, the notification client module 902 corresponding to the tab 1302 can send 1604 a request to the notification server 103 for the number of unread notifications for this user. The request can be processed by the notification server 103 which responds to the notification client module 902 with a number representing the number of notifications for the user. The synchronization module 1304 cooperates with the notification client module 902 and processes communications between the notification client module 902 and the notification server 103. Any notification information is detected by the synchronization module 1304, and can be processed by storing 1606 it in the shared synchronization storage 1306. In some implementations, the synchronization module 1304 also assigns and stores a time stamp of when the notification information was received from the notification server 103. The method 1600 can include providing or updating 1608 the user interface so that the notification button 406 can show the number of unread notifications there are for the user. It should be noted that the present disclosure is particularly advantageous because the shared synchronization storage 1306 stores data segregated by user. Thus, even if two users are using the same client device 115a, the notification information for each user will not be shared between them.

Figure 17:
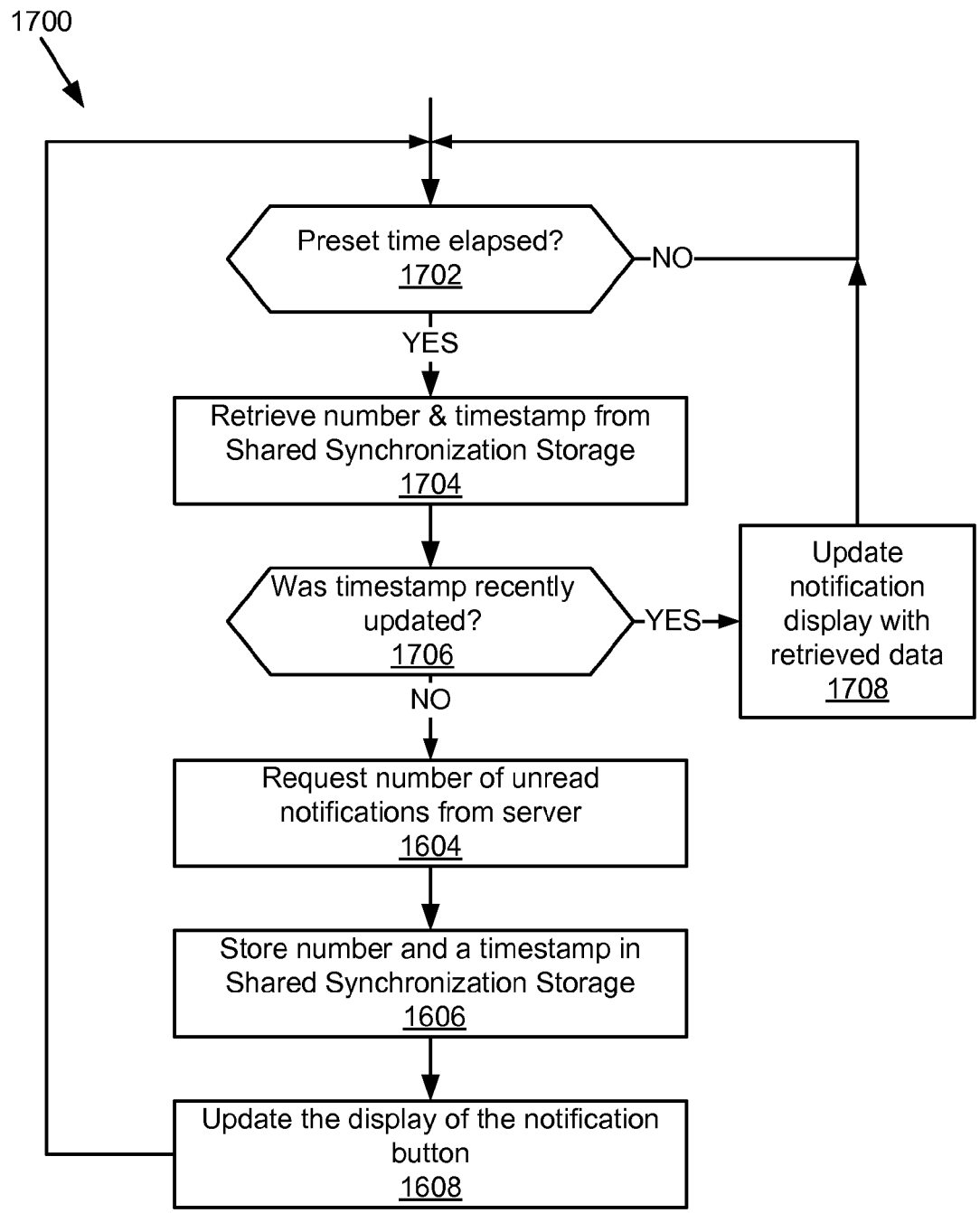
FIG. 17 is a flowchart of an example method for synchronizing data across multiple browser tabs or windows.

Referring now to FIG. 17, a method 1700 for synchronizing data across multiple browser tabs or windows according to some implementations will be described. The method 1700 can include determining 1702 whether a preset time has elapsed. In some implementations, the preset time ranges from 5 to 180 seconds. This effectively says the rate at which the synchronization module 1304 polls the shared synchronization storage 1306 or the notification server 103 for notification information updates. If the preset time has not elapsed, the method 1700 can loop back and re-performs step 1702. On the other hand, if the predetermined amount of time has elapsed, the method 1700 can continue by retrieving 1704 the number of notifications and the timestamp from the shared synchronization storage 1306. The method 1700 can include determining 1706 whether the timestamp was recently updated. In some implementations, the timestamp is considered recently updated if less than 30 seconds have elapsed since the timestamp. If the timestamp is recently updated, the method 1700 does not contact the notification server 103 and instead just updates 1708 displays of the notification information from the shared synchronization storage 1306. In particular, the display is updated with information retrieved in step 1704. This advantageously ensures that only one tab 1302 polls the notification server 103 and there are not multiple tabs 1302 attempting to poll the notification server 103 for information. If in step 1706, the timestamp was not recently updated, the method 1700 can include requesting 1604 the number of unread messages from the notification server 103. For example, the synchronization module 1304 cooperates with the notification client module 902 to request information from the notification server 103. The information is then received by notification client module 902. The synchronization module 1304 can store 1606 the received number of unread notifications and the time and a timestamp in the shared synchronization storage 1306. The notification client module 902 can then update 1608 the notification button 406 with the information received from the notification server 103. After step 1608, the method 1700 returns to 1702 and loops until a predetermined amount of time has elapsed. Some of the steps discussed above can be performed in different order than that shown in FIG. 17.

Systems and methods for generating and presenting notifications, processing cursor movements for predictive fetching, and synchronizing data across multiple browser tabs or windows have been described above. In the preceding description, for purposes of explanation, numerous specific details are set forth in order to provide a thorough understanding of the disclosure. It will be apparent, however, that the disclosure can be practiced without these specific details. In other instances, structures and devices have been shown in block diagram form in order to avoid obscuring the disclosure. For example, the present disclosure has been described in some implementations above with reference to user interfaces and particular hardware. However, the present disclosure applies to any type of computing device that can receive data and commands, and any devices providing services. Moreover, the present disclosure is described above primarily in the context of notifications; however, it should be understood that the present disclosure applies to any type of messaging and can be used for other applications beyond notifications. In particular, processing cursor movements for predictive fetching and synchronizing data across multiple browser tabs or windows are operable in other contexts beyond processing notification information.

Reference in the specification to "one implementation" or "an implementation" means that a particular feature, structure, or characteristic described in connection with the implementation is included in at least one implementation of the disclosure. The appearances of the phrase "in one implementation" or "in some implementations" in various places in the specification are not necessarily all referring to the same implementation.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other information storage, transmission or display devices.

The present disclosure also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosure can take the form of an entirely hardware implementation, an entirely software implementation or an implementation containing both hardware and software elements. In some implementations, the disclosure is implemented in software, which includes but is not limited to firmware, resident software, microcode, etc.

Furthermore, the disclosure can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Finally, the foregoing description of the implementations of the present disclosure has been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Likewise, the particular naming and division of the modules, routines, features, attributes, methodologies and other aspects are not mandatory or significant, and the mechanisms that implement the present disclosure or its features may have different names, divisions and/or formats. Furthermore, the relevant art, the modules, routines, features, attributes, methodologies and other aspects of the present disclosure can be implemented as software, hardware, firmware or any combination of the three. Also, wherever a component, an example of which is a module, of the present disclosure is implemented as software, the component can be implemented as a standalone program, as part of a larger program, as a plurality of separate programs, as a statically or dynamically linked library, as a kernel loadable module, as a device driver, and/or in every and any other way known now or in the future in the art of computer programming. Additionally, the present disclosure is in no way limited to implementation in any specific programming language, or for any specific operating system or environment. Accordingly, the disclosure of the present disclosure is intended to be illustrative, but not limiting, of the scope of the present disclosure, which is set forth in the following claims.

What is claimed is:

1. A method comprising:
opening a first browser window, the first browser window including a first browser tab accessing a first application;
requesting unread notification information from a server for the first browser window;
determining a total number of unread notifications for the first application and a second application;
initializing a shared synchronized storage portion of a local storage at a client device with the requested unread notification information and the total number of unread notifications, the shared synchronized storage portion being used by the first browser window and a second browser window;
updating the first browser tab with the total number of unread notifications;
retrieving the requested unread notification information and a timestamp from the local storage at the client device for use in the first browser tab;
determining whether the timestamp is recently updated;

opening the second browser window, the second browser window including a second browser tab accessing the second application;

updating the second browser tab with the total number of unread notifications from the shared synchronized storage portion at the client device if the timestamp was recently updated; and if the timestamp was not recently updated:

requesting new unread notification information from the server;

storing the new unread notification information and a second timestamp in the shared synchronized storage portion of the local storage at the client device; and updating the second browser tab with the new unread notification information.

2. The method of claim 1, wherein the unread notification information is a number of unread notifications for a user.

3. The method of claim 1, wherein the timestamp was recently updated if less than 30 seconds have elapsed since the timestamp.

4. The method of claim 1 wherein the shared synchronized storage portion is a temporary file stored in the local storage at the client device.

5. The method of claim 1, wherein initializing the shared synchronized storage portion of the local storage at the client device comprises:

storing the requested unread notification information in the local storage at the client device;

assigning the requested unread notification information the timestamp; and storing the time stamp in the local storage at the client device.

6. The method of claim 1, further comprising providing an updated user interface showing the requested unread notification information from the server.

7. The method of claim 1 further comprising:

opening a third browser window, the third browser window including a third browser tab accessing a third application;

retrieving the requested unread notification information and the timestamp from the shared synchronized storage portion of the local storage at the client device;

determining whether the timestamp is recently updated;

updating the third browser tab with the requested unread notification information if the timestamp was recently updated; and if the timestamp was not recently updated:

requesting additional information from the server;

storing the additional information and a third timestamp in the shared synchronized storage portion of the local storage at the client device; and updating the third browser tab with the additional information.

8. The method of claim 1 wherein the first browser tab is open as part of a first browser window, and the method further comprises:

opening the second browser window;

retrieving the requested unread notification information and its timestamp from the shared synchronized storage portion of the local storage at the client device;

determining whether the timestamp is recently updated;

updating the second browser window with the requested unread notification information if the timestamp was recently updated; and if the timestamp was not recently updated:

requesting additional information from the server;

storing the additional information and a third timestamp in the shared synchronized storage portion of the local storage at the client device; and updating the second browser window with the additional information.

9. A computer program product comprising a non-transitory computer usable medium including a computer readable program, wherein the computer readable program when executed on a computer causes the computer to:

open a first browser window, the first browser window including a first browser tab accessing a first application;

request unread notification information from a server for the first browser window;

determine a total number of unread notifications for the first application and a second application;

initialize a shared synchronized storage portion of a local storage at a client device with the requested unread notification information and the total number of unread notifications, the shared synchronized storage portion being used by the first browser window and a second browser window;

update the first browser tab with the total number of unread notifications;

retrieve the requested unread notification information and a timestamp from the shared synchronized storage portion of the local storage at the client device for use in the first browser tab;

determine whether the timestamp is recently updated;

open the second browser window, the second browser window including a second browser tab accessing the second application;

update the second browser tab with the total number of unread notifications from the shared synchronized storage portion at the client device if the timestamp was recently updated; and if the timestamp was not recently updated:

request new unread notification information from the server;

store the new unread notification information and a second timestamp in the shared synchronized storage portion of the local storage at the client device; and update the second browser tab with the new unread notification information.

10. The computer program product of claim 9, wherein the unread notification information is a number of unread notifications for a user.

11. The computer program product of claim 9, wherein the timestamp was recently updated if less than 30 seconds have elapsed since the timestamp.

12. The computer program product of claim 9, wherein the shared synchronized storage portion is a temporary file stored in the local storage at the client device.

13. The computer program product of claim 9, wherein the computer readable program when executed on the computer also causes the computer to:

store the requested unread notification information in the shared synchronized storage portion of the local storage at the client device;

assign the requested unread notification information the timestamp; and store the time stamp in the shared synchronized storage portion of the local storage at the client device.

14. The computer program product of claim 9, wherein the computer readable program when executed on the computer causes the computer to provide an updated user interface showing the requested unread notification information from the server.

15. The computer program product of claim 9, wherein the computer readable program when executed on the computer causes the computer to:
  open a third browser window, the third browser window including a third browser tab accessing a third application;
  retrieve the requested unread notification information and the timestamp from the shared synchronized storage portion of the local storage at the client device;
  determine whether the timestamp is recently updated;
  update the third browser tab with the requested unread notification information if the timestamp was recently updated; and
  if the timestamp was not recently updated:
    request additional information from the server;
    store the additional information and a third timestamp in the shared synchronized storage portion of the local storage at the client device; and
    update the third browser tab with the additional information.

16. The computer program product of claim 9, wherein the first browser tab is open as part of a first browser window, and wherein the computer readable program when executed on the computer causes the computer to:
  open the second browser window;
  retrieve the requested unread notification information and its timestamp from the shared synchronized storage portion of the local storage at the client device;
  determine whether the timestamp is recently updated;
  update the second browser window with the requested unread notification information if the timestamp was recently updated; and
  if the timestamp was not recently updated:
    request additional information from the server;
    store the additional information and a third timestamp in the shared synchronized storage portion of the local storage at the client device; and
    update the second browser window with the additional information.

17. A system comprising:
  a processor, and;
  a memory storing instructions that, when executed, cause the system to:
    open a first browser window, the first browser window including a first browser tab accessing a first application;
    request unread notification information from a server for the first browser window;
    determine a total number of unread notifications for the first application and a second application;
    initialize a shared synchronized storage portion of a local storage at a client device with the requested unread notification information and the total number of unread notifications, the shared synchronized storage portion being used by the first browser window and a second browser window;
    update the first browser tab with the total number of unread notifications;
    retrieve the requested unread notification information and a timestamp from the shared synchronized storage portion of the local storage at the client device for use in the first browser tab;
    determine whether the timestamp is recently updated;
    open the second browser window, the second browser window including a second browser tab accessing the second application;
    update the second browser tab with the total number of unread notifications from the shared synchronized storage portion at the client device if the timestamp was recently updated; and
    if the timestamp was not recently updated:
      request new unread notification information from the server;
      store the new unread notification information and a second timestamp in the shared synchronized storage portion of the local storage at the client device; and
      update the second browser tab with the new unread notification information.

18. The system of claim 17, wherein the unread notification information is a number of unread notifications for a user.

19. The system of claim 17, wherein the timestamp was recently updated if less than 30 seconds have elapsed since the timestamp.

20. The system of claim 17, wherein the shared synchronized storage portion is a temporary file stored in the local storage at the client device.

21. The system of claim 17, wherein the memory also stores instructions that, when executed, cause the system to:
  store the requested unread notification information in the shared synchronized storage portion of the local storage at the client device;
  assign the requested unread notification information the timestamp; and
  store the time stamp in the shared synchronized storage portion of the local storage at the client device.

22. The system of claim 17, wherein the memory also stores instructions that, when executed, cause the system to provide an updated user interface showing the requested unread notification information from the server.

23. The system of claim 17, wherein the memory also stores instructions that, when executed, cause the system to:
  open a third browser window, the third browser window including a third browser tab accessing a third application;
  retrieve the requested unread notification information and the timestamp from the shared synchronized storage portion of the local storage at the client device;
  determine whether the timestamp is recently updated;
  update the third browser tab with the requested unread notification information if the timestamp was recently updated; and
  if the timestamp was not recently updated:
    request additional information from the server;
    store the additional information and a third timestamp in the shared synchronized storage portion of the local storage at the client device; and
    update the third browser tab with the additional information.

24. The system of claim 17, wherein the first browser tab is open as part of a first browser window, and wherein the memory also stores instructions that, when executed, cause the system to:
  open the second browser window;
  retrieve the requested unread notification information and its timestamp from the shared synchronized storage portion of the local storage at the client device;
  determine whether the timestamp is recently updated;
  update the second browser window with the requested unread notification information if the timestamp was recently updated; and
  if the timestamp was not recently updated:
    request additional information from the server;

store the additional information and a third timestamp in the shared synchronized storage portion of the local storage at the client device; and update the second browser window with the additional information.

\* \* \* \* \*